(12) United States Patent
Nayar et al.

(10) Patent No.: US 10,181,800 B1
(45) Date of Patent: Jan. 15, 2019

(54) POWER CONVERSION SYSTEMS FOR ENERGY STORAGE DEVICES

(71) Applicant: Ambri Inc., Cambridge, MA (US)

(72) Inventors: Hari Nayar, Woburn, MA (US); Matthew Clayton Such, Neptune Beach, FL (US); David J. Bradwell, Arlington, MA (US)

(73) Assignee: AMBRI INC., Marlborough, MA (US)

( * ) Notice: Subject to any disclaimer, the term of this patent is extended or adjusted under 35 U.S.C. 154(b) by 327 days.

(21) Appl. No.: 15/057,732

(22) Filed: Mar. 1, 2016

Related U.S. Application Data

(60) Provisional application No. 62/127,223, filed on Mar. 2, 2015.

(51) Int. Cl.
| | |
|---|---|
| *H01M 4/36* | (2006.01) |
| *H01M 4/48* | (2010.01) |
| *H01M 6/20* | (2006.01) |
| *H02M 7/00* | (2006.01) |
| *H01M 10/42* | (2006.01) |
| *H02M 7/797* | (2006.01) |
| *H02M 1/14* | (2006.01) |
| *H02M 1/42* | (2007.01) |

(52) U.S. Cl.
CPC ......... *H02M 7/003* (2013.01); *H01M 10/425* (2013.01); *H02M 1/14* (2013.01); *H02M 1/4208* (2013.01); *H02M 7/797* (2013.01); *H01M 2010/4271* (2013.01)

(58) Field of Classification Search
USPC .................................................. 429/102–104
See application file for complete search history.

(56) References Cited

U.S. PATENT DOCUMENTS

| | | | |
|---|---|---|---|
| 11,374 | A | 7/1854 | Leue |
| 2,587,443 | A | 2/1952 | Crabtree |
| 3,057,946 | A | 10/1962 | Eidensohn |
| 3,238,437 | A | 3/1966 | Foster et al. |
| 3,245,836 | A | 4/1966 | Agruss |
| 3,419,432 | A | 12/1968 | Hesson |

(Continued)

FOREIGN PATENT DOCUMENTS

| | | |
|---|---|---|
| AU | 2014229643 A1 | 9/2015 |
| AU | 2016225020 A1 | 9/2017 |

(Continued)

OTHER PUBLICATIONS

Advisory Action Before Filing of Appeal Brief dated May 10, 2012 for U.S. Appl. No. 12/839,130.

(Continued)

*Primary Examiner* — Adam Houston
(74) *Attorney, Agent, or Firm* — Wilson Sonsini Goodrich & Rosati

(57) ABSTRACT

Disclosed herein are systems and methods for electrically coupling energy storage devices to an external load or power source. Examples of such coupling include connecting energy storage devices to an electric power grid using a power conversion system with suitable characteristics including, for example, active/real power and reactive power control capabilities, response time, current, voltage, phase, frequency, fault protection and/or information exchange protocols. The power conversion system can include an inverter.

20 Claims, 12 Drawing Sheets

(56) References Cited

U.S. PATENT DOCUMENTS

| | | | |
|---|---|---|---|
| 3,488,221 A | 1/1970 | Hiroshi et al. |
| 3,507,703 A | 4/1970 | Laszlo |
| 3,535,214 A | 10/1970 | Rene |
| 3,607,405 A | 9/1971 | Christopher |
| 3,607,407 A | 9/1971 | Adams |
| 3,635,765 A | 1/1972 | Greenberg |
| 3,663,295 A | 5/1972 | Baker |
| 3,716,409 A | 2/1973 | Cairns et al. |
| 3,770,506 A | 11/1973 | Rightmire et al. |
| 3,775,181 A | 11/1973 | Ryerson |
| 3,833,420 A | 9/1974 | Will |
| 3,833,421 A | 9/1974 | Rubischko et al. |
| 3,833,422 A | 9/1974 | Will et al. |
| 3,837,918 A | 9/1974 | Nakabayashi |
| 3,870,561 A | 3/1975 | Charbonnier et al. |
| 3,877,984 A | 4/1975 | Werth |
| 3,878,296 A | 4/1975 | Vine et al. |
| 3,884,715 A | 5/1975 | Gay et al. |
| 3,887,396 A | 6/1975 | Walsh et al. |
| 3,898,096 A | 8/1975 | Heredy et al. |
| 3,907,589 A | 9/1975 | Gay et al. |
| 3,915,742 A | 10/1975 | Battles et al. |
| 3,926,673 A | 12/1975 | Saridakis |
| 3,930,888 A | 1/1976 | Bowser et al. |
| 3,933,521 A | 1/1976 | Vissers et al. |
| 3,941,612 A | 3/1976 | Steunenberg et al. |
| 3,947,291 A | 3/1976 | Yao et al. |
| 3,954,504 A | 5/1976 | Zellhoefer |
| 3,959,012 A | 5/1976 | Liang et al. |
| 3,960,594 A | 6/1976 | Fritz et al. |
| 3,969,139 A | 7/1976 | Lai |
| 3,980,495 A | 9/1976 | Roche et al. |
| 3,988,164 A | 10/1976 | Liang et al. |
| 4,002,807 A | 1/1977 | Ludwig |
| 4,011,374 A | 3/1977 | Kaun |
| 4,015,054 A | 3/1977 | Cleaver et al. |
| 4,018,969 A | 4/1977 | Fischer et al. |
| 4,029,860 A | 6/1977 | Vissers et al. |
| 4,032,614 A | 6/1977 | Lewis |
| 4,044,194 A | 8/1977 | Evans et al. |
| 4,060,667 A | 11/1977 | Askew et al. |
| 4,061,841 A | 12/1977 | Sharma et al. |
| 4,065,602 A | 12/1977 | Roche et al. |
| 4,069,372 A | 1/1978 | Voinov |
| 4,107,401 A | 8/1978 | Goodson et al. |
| 4,125,683 A | 11/1978 | Beckford et al. |
| 4,130,500 A | 12/1978 | Melendres et al. |
| 4,164,608 A | 8/1979 | Coetzer |
| 4,169,120 A | 9/1979 | Miller |
| 4,189,529 A | 2/1980 | Birt et al. |
| 4,195,123 A | 3/1980 | Jumel |
| RE30,353 E | 7/1980 | Ripley |
| 4,216,273 A | 8/1980 | Cadart et al. |
| 4,238,553 A | 12/1980 | Gerlach et al. |
| 4,265,984 A | 5/1981 | Kaye |
| 4,287,268 A | 9/1981 | Coetzer |
| 4,287,269 A | 9/1981 | Coetzer et al. |
| 4,299,890 A | 11/1981 | Rea et al. |
| 4,338,380 A | 7/1982 | Erickson et al. |
| 4,367,159 A | 1/1983 | Mrazek et al. |
| 4,405,433 A | 9/1983 | Payne |
| 4,407,912 A | 10/1983 | Virkar et al. |
| 4,457,989 A | 7/1984 | Coetzer |
| 4,510,210 A | 4/1985 | Hunt |
| 4,565,751 A | 1/1986 | Faust et al. |
| 4,582,553 A | 4/1986 | Buchta |
| 4,588,663 A | 5/1986 | Mason et al. |
| 4,596,637 A | 6/1986 | Kozarek et al. |
| 4,622,111 A | 11/1986 | Brown et al. |
| 4,657,830 A | 4/1987 | Kagawa |
| 4,692,390 A | 9/1987 | Roy |
| 4,764,437 A | 8/1988 | Kaun |
| 4,800,143 A | 1/1989 | Harbach et al. |
| 4,818,638 A | 4/1989 | Roy |
| 4,833,046 A | 5/1989 | Roy |
| 4,849,682 A | 7/1989 | Bauer et al. |
| 4,877,695 A | 10/1989 | Cipriano et al. |
| 4,886,715 A | 12/1989 | McCullough, Jr. et al. |
| 4,929,521 A | 5/1990 | Cipriano et al. |
| 4,945,012 A | 7/1990 | Bugga et al. |
| 4,945,257 A | 7/1990 | Marrocco, III |
| H816 H | 9/1990 | Carder et al. |
| 4,954,403 A | 9/1990 | Plichta et al. |
| 4,965,146 A * | 10/1990 | McCullough, Jr. ...... H01M 4/13 429/102 |
| 4,975,344 A | 12/1990 | Wedlake et al. |
| 4,999,097 A | 3/1991 | Sadoway |
| 5,011,748 A | 4/1991 | Shacklette et al. |
| 5,024,737 A | 6/1991 | Claus et al. |
| 5,039,351 A | 8/1991 | Cooper et al. |
| 5,139,895 A | 8/1992 | Roy et al. |
| 5,185,068 A | 2/1993 | Sadoway |
| 5,254,232 A | 10/1993 | Sadoway |
| 5,284,562 A | 2/1994 | Beck et al. |
| 5,286,359 A | 2/1994 | Richards et al. |
| 5,369,547 A | 11/1994 | Evans |
| 5,380,406 A | 1/1995 | Horton et al. |
| 5,392,191 A | 2/1995 | Thomas et al. |
| 5,407,119 A | 4/1995 | Churchill et al. |
| 5,429,895 A | 7/1995 | Lian et al. |
| 5,469,325 A | 11/1995 | Evans |
| 5,476,733 A | 12/1995 | Coetzer et al. |
| 5,491,037 A | 2/1996 | Kawakami |
| 5,532,078 A | 7/1996 | Redey et al. |
| 5,536,600 A | 7/1996 | Kaun |
| 5,538,813 A | 7/1996 | Li |
| 5,549,989 A | 8/1996 | Anani |
| 5,559,667 A | 9/1996 | Evans |
| 5,563,765 A | 10/1996 | Lian et al. |
| 5,578,389 A | 11/1996 | Tsuchimoto et al. |
| 5,587,872 A | 12/1996 | Lian et al. |
| 5,597,331 A | 1/1997 | Gable et al. |
| 5,604,053 A | 2/1997 | Coetzer et al. |
| 5,658,447 A | 8/1997 | Watson et al. |
| 5,661,403 A | 8/1997 | Mackenzie |
| 5,687,056 A | 11/1997 | Harshe et al. |
| 5,688,613 A | 11/1997 | Li et al. |
| 5,688,614 A | 11/1997 | Li et al. |
| 5,693,434 A | 12/1997 | Li et al. |
| 5,714,283 A | 2/1998 | Briscoe et al. |
| 5,735,933 A | 4/1998 | Yokoyama et al. |
| 5,737,181 A | 4/1998 | Evans |
| 5,763,117 A | 6/1998 | Wright et al. |
| 5,807,412 A | 9/1998 | Li et al. |
| 5,856,041 A | 1/1999 | Inoue et al. |
| 5,874,183 A | 2/1999 | Uematsu |
| 5,939,221 A | 8/1999 | Tsuchimoto et al. |
| 5,972,533 A | 10/1999 | Coetzer et al. |
| 5,982,609 A | 11/1999 | Evans |
| 6,007,943 A | 12/1999 | Coetzer |
| 6,083,296 A | 7/2000 | Innes et al. |
| 6,143,054 A | 11/2000 | Dry |
| 6,180,284 B1 | 1/2001 | Shah et al. |
| 6,218,055 B1 | 4/2001 | Shah et al. |
| 6,221,513 B1 | 4/2001 | Lasater |
| 6,267,799 B1 | 7/2001 | Innes et al. |
| 6,270,553 B1 | 8/2001 | Innes |
| 6,289,034 B1 | 9/2001 | Bates |
| 6,322,745 B1 | 11/2001 | Leigh et al. |
| 6,328,783 B1 | 12/2001 | Bates |
| 6,368,486 B1 | 4/2002 | Thompson et al. |
| 6,379,422 B1 | 4/2002 | Dry |
| 6,379,424 B1 | 4/2002 | Dry |
| 6,379,840 B2 | 4/2002 | Kitoh et al. |
| 6,387,153 B1 | 5/2002 | Burke |
| 6,402,808 B1 | 6/2002 | Dry |
| 6,419,812 B1 | 7/2002 | Beck et al. |
| 6,419,813 B1 | 7/2002 | Brown et al. |
| 6,423,114 B1 | 7/2002 | Burke |
| 6,423,115 B1 | 7/2002 | McCarthy et al. |
| 6,428,603 B1 | 8/2002 | Batterham |
| 6,440,195 B1 | 8/2002 | Dry |
| 6,475,264 B1 | 11/2002 | Dry |
| 6,478,848 B1 | 11/2002 | McCarthy et al. |

(56) References Cited

U.S. PATENT DOCUMENTS

| | | | |
|---|---|---|---|
| 6,498,406 B1 | 12/2002 | Hoeriuchi et al. |
| 6,517,605 B1 | 2/2003 | Bates et al. |
| 6,548,212 B1 | 4/2003 | Heider et al. |
| 6,549,423 B1 | 4/2003 | Brodnick |
| 6,558,525 B1 | 5/2003 | Bradford et al. |
| 6,579,817 B2 | 6/2003 | Harada et al. |
| 6,585,929 B1 | 7/2003 | Bates et al. |
| 6,602,321 B2 | 8/2003 | Dry et al. |
| 6,692,620 B2 | 2/2004 | Duruz et al. |
| 6,692,631 B2 | 2/2004 | Bergsma |
| 6,692,870 B2 | 2/2004 | Miyake et al. |
| 6,706,239 B2 | 3/2004 | Haack et al. |
| 6,719,889 B2 | 4/2004 | Brown |
| 6,723,222 B2 | 4/2004 | Bergsma et al. |
| 6,730,210 B2 | 5/2004 | Thompson et al. |
| 6,733,924 B1 | 5/2004 | Skotheim et al. |
| 6,906,436 B2 | 6/2005 | Jenson et al. |
| 6,924,164 B2 | 8/2005 | Jenson |
| 6,962,613 B2 | 11/2005 | Jenson |
| 6,963,186 B2 | 11/2005 | Hobbs |
| 6,986,965 B2 | 1/2006 | Jenson et al. |
| 7,055,733 B2 | 6/2006 | Weil et al. |
| 7,077,945 B2 | 7/2006 | Bergsma et al. |
| 7,131,189 B2 | 11/2006 | Jenson |
| 7,144,655 B2 | 12/2006 | Jenson et al. |
| 7,157,187 B2 | 1/2007 | Jenson |
| 7,184,903 B1 | 2/2007 | Williams et al. |
| 7,194,801 B2 | 3/2007 | Jenson et al. |
| 7,211,351 B2 | 5/2007 | Klaassen |
| 7,250,233 B2 | 7/2007 | Choi et al. |
| 7,274,118 B2 | 9/2007 | Jenson et al. |
| 7,294,209 B2 | 11/2007 | Shakespeare |
| 7,328,831 B1 | 2/2008 | Topolski |
| 7,344,804 B2 | 3/2008 | Klaassen |
| 7,373,222 B1 | 5/2008 | Wright et al. |
| 7,389,189 B2 | 6/2008 | Williams et al. |
| 7,389,580 B2 | 6/2008 | Jenson et al. |
| 7,433,655 B2 | 10/2008 | Jacobs et al. |
| 7,504,017 B2 | 3/2009 | Cardarelli |
| 7,513,219 B2 | 4/2009 | Louden |
| 7,568,537 B2 | 8/2009 | King et al. |
| 7,603,144 B2 | 10/2009 | Jenson et al. |
| 7,612,537 B2 | 11/2009 | Wynne et al. |
| 7,632,604 B2 | 12/2009 | Iacovangelo et al. |
| 7,678,484 B2 | 3/2010 | Tao et al. |
| 7,776,190 B2 | 8/2010 | Hiltmann et al. |
| 7,776,191 B2 | 8/2010 | Hiltmann et al. |
| 7,776,478 B2 | 8/2010 | Klaassen |
| 7,808,131 B2 | 10/2010 | Hurst et al. |
| 7,877,120 B2 | 1/2011 | Jacobs et al. |
| 7,883,796 B2 | 2/2011 | Kida et al. |
| 7,931,989 B2 | 4/2011 | Klaassen |
| 7,939,205 B2 | 5/2011 | Klaassen |
| 7,943,270 B2 | 5/2011 | Blake et al. |
| 8,034,484 B2 | 10/2011 | Inatomi et al. |
| 8,044,508 B2 | 10/2011 | Jenson et al. |
| 8,080,326 B2 | 12/2011 | Chan et al. |
| 8,101,293 B2 | 1/2012 | Chan et al. |
| 8,110,301 B2 | 2/2012 | Iacovangelo et al. |
| 8,142,569 B2 | 3/2012 | Kalynushkin et al. |
| 8,178,231 B2 | 5/2012 | Soloveichik et al. |
| 8,202,641 B2 | 6/2012 | Winter et al. |
| 8,219,140 B2 | 7/2012 | Jacobs et al. |
| 8,221,912 B2 | 7/2012 | Fujiwara |
| 8,236,440 B2 | 8/2012 | Bendert |
| 8,237,407 B2 | 8/2012 | Hurst et al. |
| 8,268,471 B2 | 9/2012 | Sadoway et al. |
| 8,281,877 B2 | 10/2012 | Shahin et al. |
| 8,298,701 B2 | 10/2012 | Whitacre et al. |
| 8,306,671 B1 | 11/2012 | Marcus |
| 8,311,681 B1 | 11/2012 | Marcus |
| 8,313,719 B2 | 11/2012 | Barker et al. |
| 8,323,816 B2 | 12/2012 | Bradwell et al. |
| 8,329,336 B2 | 12/2012 | Soloveichik et al. |
| 8,334,053 B2 | 12/2012 | Shapiro et al. |
| 8,343,646 B1 | 1/2013 | Wilkins et al. |
| 8,409,744 B2 | 4/2013 | Ijaz et al. |
| 8,436,489 B2 | 5/2013 | Stahlkopf et al. |
| 8,457,800 B2 | 6/2013 | Marcus |
| 8,460,814 B2 | 6/2013 | Deane et al. |
| 8,471,520 B2 | 6/2013 | Coe et al. |
| 8,475,954 B2 | 7/2013 | Ijaz et al. |
| 8,504,214 B2 | 8/2013 | Genc et al. |
| 8,537,581 B2 | 9/2013 | Wagoner et al. |
| 8,539,763 B2 | 9/2013 | McBride et al. |
| 8,568,915 B2 | 10/2013 | Fuhr et al. |
| 8,642,201 B2 | 2/2014 | Cheng et al. |
| 8,643,500 B2 | 2/2014 | Lee et al. |
| 8,652,672 B2 | 2/2014 | Whitacre et al. |
| 8,722,226 B2 | 5/2014 | Carter et al. |
| 8,764,962 B2 | 7/2014 | Allanore et al. |
| 8,766,642 B2 | 7/2014 | Bogdan, Jr. et al. |
| 8,806,866 B2 | 8/2014 | McBride et al. |
| 8,815,445 B2 | 8/2014 | Sugiura et al. |
| 9,000,713 B2 | 4/2015 | Boysen et al. |
| 9,076,996 B2 | 7/2015 | Bradwell et al. |
| 9,106,980 B2 | 8/2015 | Parakulam et al. |
| 9,153,803 B2 | 10/2015 | Valentin Chung et al. |
| 9,312,522 B2 | 4/2016 | Bradwell et al. |
| 9,502,737 B2 | 11/2016 | Bradwell et al. |
| 9,520,618 B2 | 12/2016 | Bradwell et al. |
| 9,559,386 B2 | 1/2017 | Bradwell et al. |
| 9,728,814 B2 | 8/2017 | Bradwell et al. |
| 9,735,450 B2 | 8/2017 | Bradwell et al. |
| 9,787,119 B2 * | 10/2017 | Yamauchi ............. H01M 10/44 |
| 9,825,265 B2 | 11/2017 | Bradwell et al. |
| 9,876,258 B2 | 1/2018 | Bradwell et al. |
| 9,893,385 B1 * | 2/2018 | Nayar ................. H01M 10/425 |
| 9,925,881 B2 * | 3/2018 | Manotas, Jr. ....... B60L 11/1816 |
| 2002/0009649 A1 | 1/2002 | Sato et al. |
| 2002/0012833 A1 | 1/2002 | Gow et al. |
| 2002/0051912 A1 | 5/2002 | Fitter et al. |
| 2002/0064704 A1 | 5/2002 | Thackeray et al. |
| 2003/0008212 A1 | 1/2003 | Akashi et al. |
| 2003/0044686 A1 | 3/2003 | Bushong et al. |
| 2003/0186111 A1 | 10/2003 | Tamakoshi |
| 2003/0196908 A1 | 10/2003 | Brown |
| 2003/0203279 A1 | 10/2003 | Tsukamoto et al. |
| 2003/0207161 A1 | 11/2003 | Rusta-Sallehy et al. |
| 2003/0228520 A1 | 12/2003 | Kaun |
| 2004/0061841 A1 | 4/2004 | Black et al. |
| 2004/0076885 A1 | 4/2004 | Sato et al. |
| 2004/0229116 A1 | 11/2004 | Malinski et al. |
| 2004/0258953 A1 | 12/2004 | Kido et al. |
| 2005/0079411 A1 | 4/2005 | Kairawicz et al. |
| 2005/0237029 A1 | 10/2005 | Takezawa et al. |
| 2006/0127735 A1 | 6/2006 | Sabin et al. |
| 2006/0151333 A1 | 7/2006 | Banek |
| 2007/0215483 A1 | 9/2007 | Johansen et al. |
| 2007/0252556 A1 | 11/2007 | West et al. |
| 2008/0023321 A1 | 1/2008 | Sadoway |
| 2008/0044725 A1 | 2/2008 | Sadoway et al. |
| 2008/0050295 A1 | 2/2008 | Uchida et al. |
| 2008/0053838 A1 | 3/2008 | Yamaguchi et al. |
| 2008/0118428 A1 | 5/2008 | Awano et al. |
| 2008/0145755 A1 | 6/2008 | Iacovangelo et al. |
| 2008/0264565 A1 | 10/2008 | Sun et al. |
| 2008/0308415 A1 | 12/2008 | Hiltmann et al. |
| 2009/0011331 A1 | 1/2009 | Stringer et al. |
| 2009/0014320 A1 | 1/2009 | Chiang et al. |
| 2009/0029236 A1 | 1/2009 | Mailley et al. |
| 2009/0162736 A1 | 6/2009 | Vallance et al. |
| 2009/0208836 A1 | 8/2009 | Fuhr et al. |
| 2009/0212743 A1 | 8/2009 | Hagiwara et al. |
| 2009/0253017 A1 | 10/2009 | Larsen et al. |
| 2009/0297892 A1 | 12/2009 | Ijaz et al. |
| 2010/0028723 A1 | 2/2010 | Haba |
| 2010/0047671 A1 | 2/2010 | Chiang et al. |
| 2010/0058578 A1 | 3/2010 | Vallance et al. |
| 2010/0068610 A1 | 3/2010 | Sudworth |
| 2010/0089547 A1 * | 4/2010 | King ................. B60L 3/0046 165/42 |
| 2010/0119847 A1 * | 5/2010 | Wu ...................... C03C 8/02 428/428 |

(56) References Cited

U.S. PATENT DOCUMENTS

| | | |
|---|---|---|
| 2010/0154205 A1 | 6/2010 | Nakagawa et al. |
| 2010/0178532 A1* | 7/2010 | Shapiro .................. C03C 3/064 429/7 |
| 2010/0233518 A1 | 9/2010 | Kwon et al. |
| 2010/0240517 A1 | 9/2010 | Ashkin et al. |
| 2010/0243017 A1 | 9/2010 | Normann et al. |
| 2010/0291443 A1 | 11/2010 | Farmer |
| 2011/0014503 A1 | 1/2011 | Bradwell et al. |
| 2011/0014505 A1* | 1/2011 | Bradwell ............ H01M 2/0252 429/51 |
| 2011/0027624 A1 | 2/2011 | Deane et al. |
| 2011/0027627 A1 | 2/2011 | Deane et al. |
| 2011/0027633 A1 | 2/2011 | Deane et al. |
| 2011/0027637 A1 | 2/2011 | Deane et al. |
| 2011/0027638 A1 | 2/2011 | Deane et al. |
| 2011/0027639 A1 | 2/2011 | Deane et al. |
| 2011/0048066 A1 | 3/2011 | Gielda et al. |
| 2011/0050235 A1 | 3/2011 | Bogdan, Jr. et al. |
| 2011/0052968 A1* | 3/2011 | Venkataramani ..... H01M 2/052 429/158 |
| 2011/0086258 A1 | 4/2011 | Yaginuma et al. |
| 2011/0104570 A1 | 5/2011 | Galloway et al. |
| 2011/0111296 A1 | 5/2011 | Berdichevsky et al. |
| 2011/0135975 A1 | 6/2011 | Fuhr et al. |
| 2011/0177413 A1 | 7/2011 | Tao et al. |
| 2011/0189520 A1 | 8/2011 | Carter et al. |
| 2011/0200848 A1 | 8/2011 | Chiang et al. |
| 2011/0262794 A1 | 10/2011 | Yoon |
| 2012/0003508 A1 | 1/2012 | Narbonne et al. |
| 2012/0003513 A1 | 1/2012 | Fuhr |
| 2012/0015235 A1 | 1/2012 | Fuhr et al. |
| 2012/0077095 A1 | 3/2012 | Roumi et al. |
| 2012/0104990 A1 | 5/2012 | Boysen et al. |
| 2012/0107675 A1 | 5/2012 | Kim |
| 2012/0125784 A1 | 5/2012 | Berlin et al. |
| 2012/0129056 A1 | 5/2012 | Majima et al. |
| 2012/0146585 A1 | 6/2012 | Darcy |
| 2012/0161083 A1 | 6/2012 | Jha et al. |
| 2012/0183838 A1 | 7/2012 | An et al. |
| 2012/0191262 A1 | 7/2012 | Marcus |
| 2012/0194140 A1 | 8/2012 | Rijssenbeek et al. |
| 2012/0196170 A1 | 8/2012 | Ijaz et al. |
| 2012/0217032 A1 | 8/2012 | Beaupre et al. |
| 2012/0244404 A1 | 9/2012 | Obasih et al. |
| 2012/0244418 A1 | 9/2012 | Cheng et al. |
| 2012/0263988 A1 | 10/2012 | Obasih et al. |
| 2012/0264021 A1 | 10/2012 | Sugiura et al. |
| 2012/0265397 A1 | 10/2012 | Aliberti et al. |
| 2012/0282501 A1 | 11/2012 | Haynes et al. |
| 2012/0282508 A1 | 11/2012 | Bendert |
| 2012/0297772 A1 | 11/2012 | McBride et al. |
| 2012/0319653 A1* | 12/2012 | Kumar .................. H02J 7/0013 320/118 |
| 2012/0328910 A1 | 12/2012 | La O' et al. |
| 2013/0009602 A1 | 1/2013 | Hoff et al. |
| 2013/0017417 A1 | 1/2013 | Whitacre et al. |
| 2013/0022845 A1 | 1/2013 | Davis et al. |
| 2013/0022852 A1 | 1/2013 | Chang et al. |
| 2013/0029195 A1 | 1/2013 | Peace |
| 2013/0045408 A1 | 2/2013 | Sadoway et al. |
| 2013/0049466 A1 | 2/2013 | Adams |
| 2013/0049478 A1 | 2/2013 | Wagoner et al. |
| 2013/0055559 A1 | 3/2013 | Slocum et al. |
| 2013/0057220 A1 | 3/2013 | Whitacre |
| 2013/0059176 A1 | 3/2013 | Stefani et al. |
| 2013/0059185 A1 | 3/2013 | Whitacre et al. |
| 2013/0065122 A1 | 3/2013 | Chiang et al. |
| 2013/0069001 A1 | 3/2013 | Luo et al. |
| 2013/0071306 A1 | 3/2013 | Camp et al. |
| 2013/0074485 A1 | 3/2013 | McBride et al. |
| 2013/0074488 A1 | 3/2013 | McBride et al. |
| 2013/0074940 A1 | 3/2013 | McBride et al. |
| 2013/0074941 A1 | 3/2013 | McBride et al. |
| 2013/0074949 A1 | 3/2013 | McBride et al. |
| 2013/0084474 A1 | 4/2013 | Mills |
| 2013/0119937 A1 | 5/2013 | Arseneault et al. |
| 2013/0130085 A1* | 5/2013 | Choi .................... H01M 4/364 429/105 |
| 2013/0136980 A1 | 5/2013 | Bartling |
| 2013/0143139 A1 | 6/2013 | Tao et al. |
| 2013/0145764 A1 | 6/2013 | McBride et al. |
| 2013/0166085 A1 | 6/2013 | Cherian et al. |
| 2013/0183544 A1 | 7/2013 | Yoshioka et al. |
| 2013/0295435 A1 | 11/2013 | Vu |
| 2014/0000251 A1 | 1/2014 | McBride et al. |
| 2014/0038012 A1 | 2/2014 | Alimario et al. |
| 2014/0038038 A1* | 2/2014 | Vallance ............... H01M 4/661 429/211 |
| 2014/0099522 A1 | 4/2014 | Spatocco et al. |
| 2014/0113181 A1* | 4/2014 | Bradwell ................ H01M 2/10 429/163 |
| 2014/0162090 A1 | 6/2014 | Whitacre et al. |
| 2014/0220428 A1 | 8/2014 | Zinck et al. |
| 2014/0248521 A1 | 9/2014 | Chiang et al. |
| 2014/0272481 A1 | 9/2014 | Chung et al. |
| 2014/0272508 A1 | 9/2014 | Musetti |
| 2014/0349159 A1* | 11/2014 | Bartling ............... H01M 10/39 429/103 |
| 2015/0004455 A1* | 1/2015 | Bradwell ................ H01M 2/18 429/103 |
| 2015/0010792 A1* | 1/2015 | Amendola .......... H01M 10/399 429/52 |
| 2015/0015210 A1 | 1/2015 | Bradwell et al. |
| 2015/0037670 A1 | 2/2015 | Tanaka et al. |
| 2015/0132627 A1 | 5/2015 | Bradwell et al. |
| 2015/0132628 A1 | 5/2015 | Bradwell et al. |
| 2015/0214579 A1 | 7/2015 | Boysen et al. |
| 2015/0249273 A1* | 9/2015 | Bradwell ............. H01M 10/399 429/61 |
| 2015/0249274 A1 | 9/2015 | Bradwell et al. |
| 2015/0303525 A1 | 10/2015 | Bradwell et al. |
| 2015/0318586 A1* | 11/2015 | Rahmane ............. H01M 4/661 429/104 |
| 2015/0325821 A1* | 11/2015 | Bradwell .............. H01M 2/024 429/101 |
| 2015/0380713 A1 | 12/2015 | Kimura et al. |
| 2016/0006090 A1* | 1/2016 | Licht .................... H01M 12/08 429/406 |
| 2016/0156068 A1 | 6/2016 | Burke et al. |
| 2016/0172714 A1 | 6/2016 | Ouchi et al. |
| 2016/0211555 A9 | 7/2016 | Bradwell et al. |
| 2016/0254512 A1 | 9/2016 | Yin et al. |
| 2016/0301038 A1* | 10/2016 | Modest ................ H01M 10/39 |
| 2016/0336623 A1* | 11/2016 | Nayar ..................... H01M 4/38 |
| 2016/0344066 A1* | 11/2016 | Sudworth ........... H01M 10/399 |
| 2016/0365612 A1* | 12/2016 | Bradwell ............... H01M 10/63 |
| 2016/0372763 A1* | 12/2016 | Lu ...................... H01M 8/04007 |
| 2017/0018811 A1* | 1/2017 | Bradwell ............... H01M 2/065 |
| 2017/0104244 A1* | 4/2017 | Bull ...................... H01M 4/364 |
| 2017/0149095 A1* | 5/2017 | Amendola .......... H01M 10/399 |
| 2017/0222273 A1 | 8/2017 | Bradwell et al. |
| 2017/0248041 A1* | 8/2017 | Lenk .................. H01M 10/3909 |
| 2017/0263951 A1* | 9/2017 | Kanno .................... H01M 8/188 |
| 2017/0338451 A9* | 11/2017 | Bradwell ............... H01M 2/10 |
| 2018/0034110 A1* | 2/2018 | Sudworth ........... H01M 10/399 |
| 2018/0083274 A1* | 3/2018 | Martin .................. H01M 4/381 |
| 2018/0090726 A1* | 3/2018 | Thompson ............. H01M 2/06 |
| 2018/0097259 A1* | 4/2018 | Bradwell ................ H01M 2/18 |

FOREIGN PATENT DOCUMENTS

| | | | |
|---|---|---|---|
| CA | 2767920 | A1 | 1/2011 |
| CA | 2811218 | A1 | 3/2012 |
| CA | 2887201 | A1 | 4/2014 |
| CH | 703320 | B1 | 12/2011 |
| CN | 1429417 | A | 7/2003 |
| CN | 101436780 | A | 5/2009 |
| CN | 101828285 | A | 9/2010 |
| CN | 101942676 | A | 1/2011 |
| CN | 201809448 | U | 4/2011 |
| CN | 201908137 | U | 7/2011 |
| CN | 102181883 | A | 9/2011 |
| CN | 102498589 | A | 6/2012 |

(56) References Cited

FOREIGN PATENT DOCUMENTS

| | | |
|---|---|---|
| CN | 102646808 A | 8/2012 |
| CN | 103001239 A | 3/2013 |
| CN | 202797170 U | 3/2013 |
| CN | 105190984 A | 12/2015 |
| CN | 105659415 A | 6/2016 |
| DE | 3239964 A1 | 5/1984 |
| DE | 19618609 A1 | 11/1997 |
| EP | 0078404 A2 | 5/1983 |
| EP | 0078404 A3 | 10/1985 |
| EP | 0327959 A1 | 8/1989 |
| EP | 0343333 A1 | 11/1989 |
| EP | 1096593 A2 | 5/2001 |
| EP | 1469536 A1 | 10/2004 |
| EP | 1548912 A1 | 6/2005 |
| EP | 2408083 A1 | 1/2012 |
| EP | 2416464 A2 | 2/2012 |
| EP | 2499507 A1 | 9/2012 |
| EP | 2709188 A1 | 3/2014 |
| GB | 2062939 A | 5/1981 |
| JP | S4933815 B1 | 9/1974 |
| JP | S5268929 A | 6/1977 |
| JP | S55053877 A1 | 4/1980 |
| JP | S61114664 A | 6/1986 |
| JP | H06223872 A | 8/1994 |
| JP | H06310171 A | 11/1994 |
| JP | H1012270 A | 1/1998 |
| JP | H117923 A | 1/1999 |
| JP | 2001115369 A | 4/2001 |
| JP | 2001243994 A | 9/2001 |
| JP | 3355377 B2 | 12/2002 |
| JP | 2007157373 A | 6/2007 |
| JP | 2010535942 A | 11/2010 |
| JP | 2011508379 A | 3/2011 |
| JP | 2012124009 A | 6/2012 |
| JP | 2012226866 A | 11/2012 |
| JP | 2012533865 A | 12/2012 |
| JP | 2013537361 A | 9/2013 |
| JP | 2014154337 A | 8/2014 |
| JP | 2016510936 A | 4/2016 |
| JP | 2016535392 A | 11/2016 |
| KR | 20120059106 A | 6/2012 |
| RU | 2013111960 A | 10/2014 |
| SG | 188400 A1 | 4/2013 |
| WO | WO-9965642 A1 | 12/1999 |
| WO | WO-0005774 A1 | 2/2000 |
| WO | WO-2008045996 A2 | 4/2008 |
| WO | WO-2008105807 A2 | 9/2008 |
| WO | WO-2008105811 A2 | 9/2008 |
| WO | WO-2008045996 A3 | 10/2008 |
| WO | WO-2008105811 A3 | 12/2008 |
| WO | WO-2009046533 A1 | 4/2009 |
| WO | WO-2009151639 A1 | 12/2009 |
| WO | WO-2010130583 A2 | 11/2010 |
| WO | WO-2011011056 A2 | 1/2011 |
| WO | WO-2011014242 A1 | 2/2011 |
| WO | WO-2011014243 A1 | 2/2011 |
| WO | WO-2011022390 A2 | 2/2011 |
| WO | WO-2011025574 A1 | 3/2011 |
| WO | WO-2011047067 A2 | 4/2011 |
| WO | WO-2011022390 A3 | 5/2011 |
| WO | WO-2011050924 A1 | 5/2011 |
| WO | WO-2011079548 A1 | 7/2011 |
| WO | WO-2011082659 A1 | 7/2011 |
| WO | WO-2011047067 A3 | 8/2011 |
| WO | WO-2011100686 A1 | 8/2011 |
| WO | WO-2011116236 A2 | 9/2011 |
| WO | WO-2011148347 A1 | 12/2011 |
| WO | WO-2011153312 A2 | 12/2011 |
| WO | WO-2012003649 A1 | 1/2012 |
| WO | WO-2012009145 A2 | 1/2012 |
| WO | WO-2012033692 A2 | 3/2012 |
| WO | WO-2012040176 A1 | 3/2012 |
| WO | WO-2011153312 A3 | 4/2012 |
| WO | WO-2012009145 A3 | 4/2012 |
| WO | WO-2012051790 A1 | 4/2012 |
| WO | WO-2012033692 A3 | 6/2012 |
| WO | WO-2012129827 A1 | 10/2012 |
| WO | WO-2012138576 A1 | 10/2012 |
| WO | WO-2012145314 A2 | 10/2012 |
| WO | WO-2012158751 A1 | 11/2012 |
| WO | WO-2012158781 A2 | 11/2012 |
| WO | WO-2013025608 A1 | 2/2013 |
| WO | WO-2013032667 A1 | 3/2013 |
| WO | WO-2013048704 A1 | 4/2013 |
| WO | WO-2013052494 A1 | 4/2013 |
| WO | WO-2014055873 A1 | 4/2014 |
| WO | WO-2014062702 A1 | 4/2014 |
| WO | WO-2014062706 A1 | 4/2014 |
| WO | WO-2014140792 A2 | 9/2014 |
| WO | WO-2014190318 A1 | 11/2014 |
| WO | WO-2015042295 A1 | 3/2015 |
| WO | WO-2015058010 A1 | 4/2015 |
| WO | WO-2015058165 A1 | 4/2015 |
| WO | WO-2015063588 A2 | 5/2015 |
| WO | WO-2015066359 A1 | 5/2015 |
| WO | WO-2016138499 A1 | 9/2016 |

OTHER PUBLICATIONS

Advisory Action Before Filing of Appeal Brief dated Jun. 8, 2012 for U.S. Appl. No. 12/839,130.
Agruss. The Thermally Regenarative Liquid-Metal Cell, J. Electrochem. Soc. Nov. 1963; 110(11):1097-1103.
Allanore, A. Features and Challenges of Molten Oxide Electrolytes for Metal Extraction. Journal of the Electrochemical Society, 162 (1): E13-E22 (2015). Published Nov. 25, 2014.
Allanore, et al. A new anode material for oxygen evolution in molten oxide electrolysis. Nature, vol. 497, May 16, 2013, pp. 353-356 and Online Methods Section. Published online May 8, 2013.
Atthey. A Mathematical Model for Fluid Flow in a Weld Pool at High Currents. J. Fluid Mech. 1980; 98(4):787-801.
Biswas, et al. Towards Implementation of Smart Grid: An Updated Review on Electrical Energy Storage Systems. Smart Grid and Renewable Energy. 2013; 4:122-132. Published online Feb. 2013.
Bradwell, et al. Magnesium-antimony liquid metal battery for stationary energy storage. J Am Chem Soc. Feb. 1, 2012;134(4):1895-7. doi: 10.1021/ja209759s. Published on web Jan. 6, 2012.
Bradwell, et al. Recycling ZnTe, CdTe, and Other Compound Semiconductors by Ambipolar Electrolysis. J. Am. Chem. Soc., 2011, 133, 19971-19975. Published Oct. 28, 2011.
Bradwell, et al. Supporting Information: Recycling ZnTe, CdTe, and other compound semiconductors by ambipolar electrolysis. J. Am. Chem. Soc., 2011, 133, S1-S8. Published Oct. 28, 2011.
Bradwell, et al. Supporting Material: Magnesium-antimony liquid metal battery for stationary energy storage. J Am Chem Soc. Feb. 1, 2012;134(4):S1-S11. doi: 10.1021/ja209759s. Published on web Jan. 6, 2012.
Bradwell. Liquid metal batteries: ambipolar electrolysis and alkaline earth electroalloying cells. Thesis. Massachusetts Institute of Technology. Dept. of Materials Science and Engineering. 2011.
Bradwell. Technical and economic feasibility of a high-temperature self-assembling battery. Thesis. Department of Material Science and Engineering. MIT. 2006.
Cairns, et al. Galvanic Cells with Fused-Salt Electrolytes. AEC Research and Development. 220 pages, Nov. 1967.
Cairns, et al. High Temperature Batteries Research in high-temperature electrochemistry reveals compact, powerful energy-storage cells. Science. Jun. 20, 1969; 164(3886):1347-1355.
Cerablak™ technology. Atfi Surface Science Solutions. http://www.atfinet.com/index.php/technology. Accessed Feb. 24, 2016.
Chuang. Floating capacitor active charge balancing for PHEV application. Thesis. Ohio State University. 2010.
Co-pending U.S. Appl. No. 15/063,842, filed Mar. 8, 2016.
Co-pending U.S. Appl. No. 15/130,129, filed Apr. 15, 2016.
Co-pending U.S. Appl. No. 15/130,292, filed Apr. 15, 2016.
Co-pending U.S. Appl. No. US15/140,434, filed Apr. 27, 2016.

(56) References Cited

OTHER PUBLICATIONS

Crowley, B. New battery could be solar power's BFF video. http://money.cnn.com/video/technology/2012/08/16/bsg-liquid-metal-battery-energy.cnnmoney. CNN Money, 2012. Accessed Jun. 29, 2015.

Cubicciotti, et al. Metal-Salt Interactions at High Temperatures: The Solubilities of Some alkaline Earth Metals in their Halides. J. Am. Chem. Soc. 1949; 71(6):2149-2153.

Donald Sadoway: The Colbert Report video. http://thecolbertreport.cc.com/videos/8uddyg/donald-sadoway. The Colbert Report, Oct. 22, 2012. Accessed Jun. 29, 2015.

Donald Sadoway: The missing link to renewable energy Youtube Video. https://www.youtube.com/watch?v=Sddb0Khx0yA. TED, Mar. 2012. Accessed Jun. 29, 2015.

Dworkin, et al. The Electrical Conductivity of Solutions of Metals in their Molten Halides. VIII. alkaline Earth Metal Systems. J. Phys. Chem. Jul. 1966; 70(7):2384.

Electroville: Grid-Scale Batteries. MIT Electroville: High Amperage Energy Storage Device—Energy for the Neighborhood. http://arpa-e.energy.gov/?q=slick-sheet-project/electroville-grid-scale-batteries. Accessed Jul. 2, 2015.

Electroville: High-Amperage Energy Storage Device—Energy Storage for the Neighborhood Project. U.S. Department of Energy Categorical Exclusion Determination Form. http://arpa-e.energy.gov/sites/default/files/25A1089%20MIT%20-%20Electroville.pdf. Accessed Jul. 2, 2015.

Energy 2064 with Professor Donald R. Sadoway Youtube Video. https://www.youtube.com/watch?v=0iwG32R2R5o. Alger, Oct. 7, 2014. Accessed Jun. 29, 2015.

European search report and search opinion dated Feb. 12, 2014 for EP Application No. 13196841.4.

Gay, et al. Lithium/Chalcogen Secondary Cells for Components in Electric Vehicular-Propulsion Generating Systems. Argonne National Laboratory, Argonne, Illinois, ANL-7863, 62 pages, Jan. 1972.

GE Energy Storage Durathon Battery Durathon E620 Battery Module Technical Specifications. Available at http://www.geenergystorage.com/images/ge/PDF/DurathonGridE620ModuleSpecSheet.pdf. 2012, Accessed on Oct. 18, 2012.

GE Energy Storage Durathon DC System Technical Specifications—MWh Series, 2014. Accessed Apr. 7, 2015. https://renewables.gepower.com/content/dam/gepower-renewables/global/en_US/documents/Durathon_DCMWh_Spec_Sheet_GEA-988123002A.pdf.

Hall-heroult cell. Wikimedia Commons. Accessed Nov. 10, 2014. http://commons.wikimedia.org/wiki/File:Hall-heroult-kk-2008-12-31.png. Dec. 30, 2008.

Intermetallic—Wikipedia Website. https://en.wikipedia.org/wiki/Intermetallic. Accessed Jul. 2, 2015.

International preliminary report on patentability and written opinion dated Jan. 24, 2012 for PCT Application No. US2010/002035.

International preliminary report on patentability and written opinion dated Feb. 17, 2009 for PCT Application No. US2007/018168.

International preliminary report on patentability and written opinion dated Mar. 26, 2013 for PCT Application No. US2011/052316.

International preliminary report on patentability and written opinion dated Apr. 7, 2015 for PCT Application No. US2013/063472.

International preliminary report on patentability and written opinion dated Apr. 21, 2015 for PCT Application No. US2013/065086.

International preliminary report on patentability and written opinion dated Apr. 21, 2015 for PCT Application No. US2013/065092.

International preliminary report on patentability and written opinion dated Sep. 15, 2015 for PCT Application No. IB2014/000617.

International preliminary report on patentability and written opinion dated Nov. 24, 2015 for PCT Application No. US2014/039439.

International preliminary report on patentability dated Mar. 31, 2016 for PCT Application No. PCT/US2014/056367.

International search report and written opinion dated Jan. 22, 2015 for PCT Application No. US2014/061266.

International search report and written opinion dated Jan. 23, 2015 for PCT Application No. PCT/US2014/056367.

International search report and written opinion dated Jan. 24, 2014 for PCT/US2013/065086.

International search report and written opinion dated Jan. 27, 2014 for PCT Application No. US2013/063472.

International search report and written opinion dated Jan. 29, 2015 for PCT Application No. US2014/060979.

International search report and written opinion dated Feb. 7, 2011 for PCT/US2010/002035.

International search report and written opinion dated Jun. 11, 2015 for PCT Application No. IB2014/002608.

International search report and written opinion dated Sep. 18, 2008 for PCT/US2007/018168.

International search report and written opinion dated Oct. 20, 2014 for PCT Application No. US2014/039439.

International search report and written opinion dated Dec. 26, 2013 for PCT Application No. US2013/065092.

International search report and written opinion dated Dec. 29, 2011 for PCT/US2011/052316.

International search report and written opnion dated Feb. 13, 2015 for PCT Application No. US2014/063222.

International search report dated Oct. 15, 2014 for PCT Application No. IB2014/000617.

Jarret, et al. Advances in the Smelting of aluminum. Metallurgical Treatises, pp. 137-157, 1981.

Javadekar, et al. Energy Storage in Electrochemical Cells with Molten Sb Electrodes. Journal of the Electrochemical Society, 159 (4) A386-A389 (2012); Jan. 24, 2012 http://repository.upenn.edu/cgi/viewcontent.cgi?article=1170&context=cbe_papers.

Jungblut, et al. Diffusion of lithium in highly oriented pyrolytic graphite at low concentrations and high temperatures. Phys Rev B Condens Matter. Dec. 1, 1989;40(16):10810-10815.

Kane, et al. Electrochemical Determination of the Thermodynamic Properties of Lithium-Antimony Alloys. Journal of the Electrochemical Society, 162 (3) A421-A425 (2015). Published Dec. 31, 2014.

Kelley, et al. Mixing in a liquid metal electrode. Physics of Fluids 26, 2014, 057102, pp. 1-12. Published online May 20, 2014.

Kim, et al. Calcium-bismuth electrodes for large-scale energy storage (liquid metal batteries). Journal of Power Sources, vol. 241, 2013, pp. 239-248. Available online Apr. 19, 2013.

Kim, et al. Electrolysis of Molten Iron Oxide with an Iridium Anode: The Role of Electrolyte Basicity. Journal of the Electrochemical Society, 158 (10) E101-E105 (2011). Published Aug. 5, 2011.

Kim, et al. Liquid Metal Batteries: Past, Present, and Future. Chemical Reviews, vol. 113, No. 3, Mar. 13, 2013, pp. 2075-2099. Published on web Nov. 27, 2012.

Kipouros, et al. Toward new technologies for the production of Lithium. JOM, May 1998, pp. 24-26.

Lalau, et al. Sodium-bismuth-lead low temperature liquid metal battery. Journal for Electrochemistry and Plating Technology, Jun. 2015, pp. 1-7.

Liquid Metal Battery Research Company website. http://www.lmbrc.com/. 2015. Accessed Jul. 7, 2015.

Liquid-metal batteries get boost from molten lead. Nature news website. Sep. 21, 2014. Accessed Dec. 9, 2014. http://www.nature.com/news/liquid-metal-batteries-get-boost-from-molten-lead-1.15967.

Magnuski, H. Innovations in Energy Storage—Professor Sadoway Video. https://vimeo.com/20906061. MIT Club of Northern California, Mar. 8, 2011. Accessed Jun. 29, 2015.

Merriam-Webster's Medical Dictionary Website. http://merriam-webster.com/medical/room%20temperature. Apr. 2009.

MIT Electroville—Liquid Metal Battery wesite. http://www.ct-si.org/events/EnergyInnovation/showcase/popt.html?id=198. 2011. Accessed Jul. 2, 2015.

Molten metal batteries aimed at the grid. BBC News website. Sep. 21, 2014. Accessed Dec. 9, 2014. http://www.bbc.com/news/science-environment-29284934.

NAS Sodium Sulfur Battery Energy Storage System website, accessed Jul. 13, 2015. https://www.ngk.co.jp/nas/specs/#topto_specs.

(56) References Cited

OTHER PUBLICATIONS

Ning, et al. Self-healing Li-Bi liquid metal battery for grid-scale energy storage. Journal of Power Sourches 275 (2015) 370-376. Available online Oct. 29, 2014.
Notice of allowance dated Jan. 6, 2015 for U.S. Appl. No. 13/237,215.
Notice of allowance dated Mar. 8, 2016 for U.S. Appl. No. 13/801,333.
Notice of allowance dated Mar. 12, 2015 for U.S. Appl. No. 12/839,130.
Notice of allowance dated Apr. 6, 2015 for U.S. Appl. No. 13/801,333.
Notice of allowance dated Apr. 20, 2012 for U.S. Appl. No. 12/505,937.
Notice of allowance dated Apr. 22, 2014 for U.S. Appl. No. 12/839,130.
Notice of allowance dated Apr. 30, 2015 for U.S. Appl. No. 13/801,333.
Notice of allowance dated Jul. 13, 2012 for U.S. Appl. No. 11/839,413.
Notice of allowance dated Jul. 31, 2015 for U.S. Appl. No. 13/801,333.
Notice of allowance dated Aug. 2, 2012 for U.S. Appl. No. 12/505,937.
Notice of allowance dated Sep. 18, 2015 for U.S. Appl. No. 13/801,333.
Notice of allowance dated Dec. 11, 2015 for U.S. Appl. No. 13/801,333.
Nuvation BMS—Grid Energy Storage. Battery Management System for Grid Energy Storage. Accessed Nov. 11, 2015. http://www.nuvation.com/battery-management-system/bms-for-grid-energy-storage-platforms.
Nuvation BMS A Scalable and highly configurable battery management system for grid energy storage systems, 2014. http://nuvation.wpengine.netdna-cdn.com/img/nuvation-bms-web/downloads/NuvationBMS_Grid-Energy_20140922.pdf. Accessed Feb. 4, 2015.
Nuvation BMS Battery Management Systems. http://www.nuvation.com/battery-management-system. Accessed Feb. 4, 2015.
Nuvation BMS. Grid Battery Controller Battery Management Solution for Multi-Stack Grid-Scale Energy Storage Systems. 2015.
Nuvation Engineering Electronic Product Design Newsletter dated Jul. 9, 2014. http://us4.campaign-archive1.com/?u=d41c6a8dd772177f8c2976a94&id=d288872315&e=724575b634. Accessed Feb. 4, 2015.
Nuvation Engineering Electronic Product Design Newsletter dated Sep. 9, 2014. http://us4.campaign-archive1.com/?u=d41c6a8dd772177f8c2976a94&id=610713e05f&e=e9700170fc. Accessed Feb. 4, 2015.
Office action—Requirement for Restriction Election dated Aug. 13, 2015 for U.S. Appl. No. 14/045,967.
Office action dated Jan. 5, 2012 for U.S. Appl. No. 12/839,130.
Office action dated Jan. 10, 2014 for U.S. Appl. No. 12/839,130.
"Office action dated Feb. 5, 2016 for U.S. Appl. No. 14/536,549.".
Office action dated Mar. 14, 2014 for U.S. Appl. No. 13/237,215.
Office action dated Mar. 16, 2012 for U.S. Appl. No. 12/839,130.
Office action dated May 13, 2011 for U.S. Appl. No. 11/839,413.
Office action dated Aug. 21, 2014 for U.S. Appl. No. 12/839,130.
Office action dated Sep. 3, 2014 for U.S. Appl. No. 13/801,333.
Office action dated Oct. 4, 2011 for U.S. Appl. No. 11/839,413.
Office action dated Nov. 5, 2015 for U.S. Appl. No. 14/178,806.
Office action dated Nov. 9, 2015 for U.S. Appl. No. 14/286,369.
Office action dated Nov. 24, 2015 for U.S. Appl. No. 14/045,967.
Office action dated Dec. 5, 2014 for U.S. Appl. No. 12/839,130.
Office action dated Dec. 11, 2012 for U.S. Appl. No. 13/588,741.
Ouchi, et al. Calcium-Antimony Alloys as Electrodes for Liquid Metal Batteries. Journal of The Electrochemical Society. 2014; 161(12):A1898-A1904. Published Sep. 9, 2014.
"Spatocco, et al. Low-Temperature Molten Salt Electrolytes for Membrane-Free Sodium Metal Batteries. Published Oct. 20, 2015, available at http://jes.ecsdl.org/content/162/14/A2729.full.pdf+html".
Pflanz, K. A Liquid Layer Solution for the Grid. http://energy.gov/articles/liquid-layer-solution-grid. Sep. 15, 2011. Accessed Jul. 2, 2015.

Pongsaksawad, et al. Phase-Field Modeling of Transport-Limited Electrolysis in Solid and Liquid States. Journal of the Electrochemical Society, 154 (6) pp. F122-F133, 2007. Available electronically Apr. 18, 2007.
Powell, et al. Modeling electrochemistry in metallurgical processes. Chemistry and Materials Science; JOM Journal of the Minerals, Metals and Materials Society vol. 59, No. 5 (2007), 35-43, DOI: 10.1007/s11837-007-0063-y http://lyre.mit.edu/~powell/papers/jom-0705-35-43.pdf.
Response After Final Rejection dated Apr. 27, 2012 for U.S. Appl. No. 12/839,130.
Sadoway, D. The Electrochemical Processing of Refractory Metals. JOM, Jul. 1991, pp. 15-19.
Sadoway, Donald R. A Technical Feasibility Study of Steelmaking by Molten Oxide Electrolysis Presentation. Presented at 9th AISI/DOE TRP Industry Briefing Session, Oct. 10, 2007, Salt Lake City. http://steeltrp.com/Briefing07slides/09-TRP9956_MIT-07IBS.pdf.
Sadoway, Donald R. Electrochemical Pathways Towards Carbon-Free Metals Production Presentation. Presented at GCEP Carbon Management in Manufacturing Industries workshop, Apr. 15-16, 2008, Stanford University. http://gcep.stanford.edu/pdfs/2RK4ZjKBF2f71uM4uriP9g/SadowayGCEP_reduced.pdf.
Sadoway, Donald R. New opportunities for metals extraction and waste treatment by electrochemical processing in molten salts. J. Mater. Res., vol. 10, No. 3, Mar. 1995, pp. 487-492.
Sadoway, Donald R. New opportunities for waste treatment by electrochemical processing in molten salts. Metals and Materials Waste Reduction, Recovery and Remediation, Edited by K.C. Liddell, R.G. Bautista and R.J. Orth, The Minerals, Metals & Materials Society, 1994, pp. 73-76.
Sadoway, et al. Block and graft copolymer electrolytes for high-performance, solid-state, lithium batteries. Journal of Power Sources, Elsevier SA, CH, vol. 129, No. 1, Apr. 15, 2004, pp. 1-3. Available online Jan. 14, 2004.
Sadoway, et al. Innovation in Energy Storage: What I Learned in 3.091 was All I Needed to Know video. http://video.mit.edu/watch/innovation-in-energy-storage-what-i-learned-in-3091-was-all-i-needed-to-know-9601/. MIT Technology Day 2010, Jun. 5, 2010. (Originally posted at http://mitworld.mit.edu/video/800. Archived at http://archive.is/http://mitworld.mit.edu/video/800.) Accessed Jun. 29, 2015.
Salois, Gretchen. Pursuing Metal Purity. Aug. 26, 2013, Modern Metals Website. Accessed Sep. 18, 2015. http://www.modernmetals.com/item/11618-pursuing-metal-purity.html.
Shimotake, et al. Bimetallic Galvanic Cells With Fused-Salt Electrolytes. Advances in Energy Conversion Engineering. pp. 951-962. 1967 Intersociety Energy Conversion Engineering Conference. American Society of Mechanical Engineers, 1967.
Shimotake, et al. Secondary Cells with Lithium Anodes and Immobilized Fused-Salt Electrolytes. I & EC ProcessDesign and Development, vol. 8, No. 1, Jan. 1969, pp. 51-56.
Sodium Sulfur-Battery Definition; Wikipedia website. Accessed Sep. 3, 2015. https://en.wikipedia.org/wiki/Sodium%E2%80%93sulfur_battery.
Spatocco, et al. Cost-based discovery for engineering solutions. pp. 1-43. Adv. in Electrochemical Science and Technology (vol. XV), Feb. 9, 2015.
Staller, A. The Real Science of an Alkali Metal Explosion. The Electrochemical Society, Jan. 28, 2015. Accessed Apr. 20, 2015. http://www.ecsblog.org/uncategorized/the-real-science-behind-an-alkali-metal-explosion/.
Supplemental Amendment After Final Rejection dated May 15, 2012 for U.S. Appl. No. 12/839,130.
The Colbert Report. Donald Sadoway interview. Oct. 22, 2012. http://www.colbertnation.com/full-episodes/mon-october-22/2012-donald-sadoway.
Villar, et al. Assessment of high-temperature self-assembling battery implementation based on the aluminum smelting process. Massachusetts Institute of Technology, Dept. of Materials Science and Engineering, Thesis, 2010. http://hdl.handle.net/1721.1/62677.
Wang, et al. Lithium-antimony-lead liquid metal battery for grid-level energy storage. Nature. Oct. 16, 2014;514(7522):348-50. doi: 10.1038/nature13700. Epub Sep. 21, 2014.

(56) References Cited

OTHER PUBLICATIONS

Weaver, et al. The Sodium1Tin Liquid-Metal Cell. J. Electrochem. Soc., 109 (8), 653-657 (Aug. 1962).
Wesoff, E. Video: MIT's Don Sadoway and Energy Storage on the Colbert Report. http://www.greentechmedia.com/articles/read/Video-MITs-Don-Sadoway-and-Energy-Storage-on-the-Colbert-Report. Oct. 24, 2012. Accessed Jul. 2, 2015.
Written opinion of the International Search Authority dated Oct. 15, 2014 for PCT Application No. IB2014/000617.
Xue, et al. Ionic Liquid Redox Catholyte for high Energy Efficiency, Low-cost Energy Storage. Advanced Energy Materials 2015, vol. 5, Issue 12,1500271, Published online Apr. 17, 2015.
Yu, et al. Determination of the Lithium Ion Diffusion Coefficient in Graphite. J. Electrochem. Soc. 1999 vol. 146, issue 1, 8-14.
Fujiwara, et al. New molten salt systems for high temperature molten salt batteries: Ternary and quaternary molten salt systems based on LiF—LiCl, LiF—LiBr, and LiCl—LiBr. Journal of Power Sources. Apr. 15, 2011; 196(8):4012-4018.
McAlister, A. J. The Al—Li (Aluminum-Lithium) System. Bulletin of Alloy Phase Diagrams, vol. 3, No. 2, 1982, pp. 177-178. doi: 10.1007/BF02892377.
"Office action dated Mar. 27, 2018 for U.S. Appl. No. 15/140,434."
"Office action dated Apr. 18, 2018 for U.S. Appl. No. 14/975,587."
"Office action dated Jun. 7, 2018 for U.S. Appl. No. 14/687,838."
"Office action dated Jun. 25, 2018 for U.S. Appl. No. 15/063,842."
Shannon. Revised effective ionic radii and systematic studies of interatomic distances in halides and chalcogenides. Acta Crystallographica Section A: Crystal Physics, Diffraction, Theoretical and General Crystallography. Mar. 9, 1976; A32:751-767.
Vassiliev, et al. A new proposal for the binary (Sn,Sb) phase diagram and its thermodynamic properties based on a new e.m.f study Journal of Alloys and Compounds 247 (1997) 223-233.
Zhang; et al. Pyrite $FeS_2$ as an efficient adsorbent of lithium polysulfide for improved lithium-sulfur batteries. Journal of Materials Chemistry A, vol. 4, Feb. 23, 2016, pp. 4371-4374. doi: 10.1039/C6TA01214K. With supporting information.
Li, et al. High Performance Liquid Metal Battery with Environmentally Friendly Antimony-Tin Positive Electrode. ACS Appl Mater Interfaces. May 25, 2016;8(20):12830-5. doi: 10.1021/acsami.6b02576. Epub May 5, 2016. With supporting information.
Li, et al. Liquid Metal Electrodes for Energy Storage Batteries. Advanced Energy Materials (2016) 6:1600483-1-19. DOI: 10.1002/aenm.201600483. Published May 31, 2016.
Notice of allowance dated Jul. 5, 2016 for U.S. Appl. No. 14/178,806.
Notice of allowance dated Jul. 25, 2016 for U.S. Appl. No. 14/286,369.
Office action dated Jun. 30, 2016 for U.S. Appl. No. 14/536,563.
Ouchi, et al. Calcium-based multi-element chemistry for grid-scale electrochemical energy storage. Nat Commun. Mar. 22, 2016;7:10999. doi: 10.1038/ncomms10999. With supplementary materials.
European search report and search opinion dated May 6, 2016 for EP Application No. 13847926.
European search report and search opinion dated May 13, 2016 for EP Application No. 13846301.
International preliminary report on patentability dated Apr. 28, 2016 for PCT Application No. PCT/US2014/060979.
International preliminary report on patentability dated Apr. 28, 2016 for PCT Application No. PCT/US2014/061266.
International preliminary report on patentability dated May 12, 2016 for PCT Application No. PCT/US2014/0063222.
Office action dated Jun. 7, 2016 for U.S. Appl. No. 14/045,967.

* cited by examiner

POWER CONVERSION SYSTEMS FOR ENERGY STORAGE DEVICES

CROSS-REFERENCE

This application claims the benefit of U.S. Provisional Application No. 62/127,223, filed Mar. 2, 2015, which is entirely incorporated herein by reference.

BACKGROUND

A battery is a device capable of converting chemical energy into electrical energy. Batteries are used in many household and industrial applications. In some instances, batteries are rechargeable such that electrical energy, which may be converted from non-electrical energy (e.g., mechanical energy), is capable of being stored in the battery as chemical energy.

There are generally two types of batteries: disposable batteries (primary batteries), which are designed to be used once and discarded, and rechargeable batteries (secondary batteries), which are designed to be recharged and used multiple times. There are various shapes and sizes of batteries, such as, for example, miniature cells used to power small electronic devices, and large batteries, which may be used to provide power for computer data centers.

Various devices can be configured for use at elevated temperatures (e.g., greater than about 100° C. or 300° C.). Examples of such devices include liquid metal batteries (e.g., comprising liquid metal electrodes), which are devices capable of converting stored chemical energy into electrical energy.

Energy storage devices (e.g., batteries) may be used within an electric power grid or as part of a standalone system. Batteries may be used in many household and industrial applications. Batteries can be charged from an electric power source (e.g., electric power produced by a renewable energy resource such as wind or solar) for later discharge when there is a demand for electrical energy consumption.

SUMMARY

While energy storage devices (e.g., batteries) are presently available, recognized herein are various limitations associated with such energy storage systems (e.g., batteries). For example, rechargeable batteries may not be able to retain a given energy density after a certain number of charge/discharge cycles, making the long term use of these devices practically infeasible. While some batteries may have longer operating lifetimes than others, such batteries may not have an energy density that is suited for commercial use.

Recognized herein is the need for improved energy storage systems (e.g., batteries) and systems for operating such energy storage systems (e.g., batteries). For example, a need exists for power electronics to enable such energy storage systems (e.g., batteries) to be electrically coupled to a load (e.g., an electronic device, another energy storage device or a power grid (also "electric power grid", "electrical grid" or "grid" herein)) and/or to an external power source (e.g., a generator or an electrical grid).

Provided herein are systems that connect an energy storage device (e.g., a high temperature battery, such as, for example, a liquid metal battery) to the grid using suitable power conversion systems. Power conversion systems may include, for example, power conditioning systems. Systems provided herein can be used, for example, to connect a high temperature battery, such as a liquid metal battery, to the grid using a power conditioning system (e.g., an inverter) with given characteristics (e.g., specific performance characteristics, such as, for example, active/real power (P) and reactive power (Q) signals or control capabilities (also "P & Q" signals or control capabilities herein), response time, current, voltage, phase, frequency, fault protection, information exchange protocols, etc.). A positive and/or negative electrode of the high temperature battery can be connected to the grid.

In an aspect, a power system comprises an energy storage device comprising at least one electrochemical cell having a negative electrode, a positive electrode and an electrolyte between the negative and positive electrodes, and wherein at least one of the negative electrode, positive electrode and electrolyte is in a liquid state at an operating temperature of the energy storage device of at least about 250° C.; and a power conversion system in electrical communication with the energy storage device and an external load or power source, wherein the power conversion system brings the energy storage device in electrical communication with the external load or power source, and wherein the power conversion system includes a bi-directional inverter that converts (i) alternating current (AC) power from the external load or power source to direct current (DC) power usable by the energy storage device, (ii) DC power from the energy storage device to AC power usable by the external load or power source, (iii) DC power from the external load or power source to DC power usable by the energy storage device, or (iv) DC power from the energy storage device to DC power usable by the external load or power source.

In another aspect, a power system comprises an energy storage device comprising at least one electrochemical cell having a negative electrode, a positive electrode and an electrolyte between the negative and positive electrodes; and a power conversion system in electrical communication with the energy storage device and an external load or power source, wherein the power conversion system includes a bi-directional inverter, and wherein the power conversion system brings the energy storage device in electrical communication with the external load or power source such that the energy storage device has a capacity fade rate of less than or equal to about 0.002%/cycle.

In another aspect, a power system comprises an energy storage device comprising at least one electrochemical cell having a negative electrode, a positive electrode and an electrolyte between the negative and positive electrodes, and wherein at least one of the negative electrode, positive electrode and electrolyte is in a liquid state at an operating temperature of the energy storage device of at least about 250° C.; and a power conversion system in electrical communication with the energy storage device and an external load or power source, wherein the power conversion system includes a bi-directional inverter, and wherein the power conversion system brings the energy storage device in electrical communication with the external load or power source such that a terminal voltage of the energy storage device does not exceed about 100 Volts (V).

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "FIG." and "FIGs." herein), of which:

DETAILED DESCRIPTION

Figure 1:
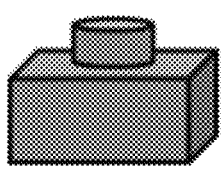
FIG. 1 is an illustration of an electrochemical cell (A) and a compilation (e.g., battery) of electrochemical cells (B and C)
Figure 1:
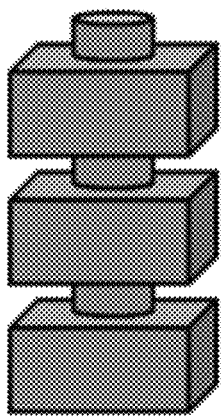
Figure 1:
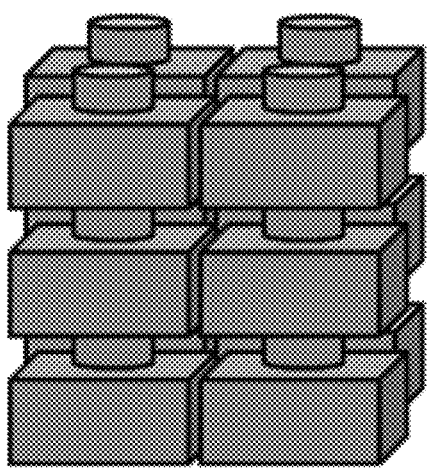

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed. It shall be understood that different aspects of the invention can be appreciated individually, collectively, or in combination with each other.

The term "direct metal-to-metal joining" or "direct metal-to-metal joint," as used herein, generally refers to an electrical connection where two metal surfaces are brought into contact (e.g., by forming a braze or a weld). In some examples, direct metal-to-metal joints do not include wires.

The term "vertical," as used herein, generally refers to a direction that is parallel to the gravitational acceleration vector.

The term "inverter," as used herein, generally refers to a power inverter that includes an electronic device or circuitry that changes direct current (DC) to alternating current (AC). An inverter may be bi-directional (e.g., DC to AC as well as AC to DC).

Electrochemical Cells, Devices and Systems

The present disclosure provides electrochemical energy storage devices (e.g., batteries, such as, for example, liquid metal batteries) and systems. An energy storage device may form or be provided within an energy storage system. The electrochemical energy storage device generally includes at least one electrochemical cell, also "cell" and "battery cell" herein, sealed (e.g., hermetically sealed) within a housing. A cell can be configured to deliver electrical energy (e.g., electrons under potential) to a load, such as, for example, an electronic device, another energy storage device or a power grid.

An electrochemical cell of the disclosure can include a negative electrode, an electrolyte adjacent to the negative electrode, and a positive electrode adjacent to the electrolyte. The negative electrode can be separated from the positive electrode by the electrolyte. The negative electrode can be an anode during discharge. The positive electrode can be a cathode during discharge. A cell can include a negative electrode of material 'A' and a positive electrode of material 'B', denoted as A∥B. The positive and negative electrodes can be separated by an electrolyte. A cell can also include a housing, one or more current collectors, and a seal (e.g., a high temperature electrically isolating seal).

In some examples, an electrochemical cell is a liquid metal battery cell. In some examples, a liquid metal battery cell can include a liquid electrolyte arranged between a negative liquid (e.g., molten) metal electrode and a positive liquid (e.g., molten) metal, metalloid and/or non-metal electrode. In some cases, a liquid metal battery cell has a molten alkaline earth metal (e.g., magnesium, calcium) or alkali metal (e.g., lithium, sodium, potassium) negative electrode, an electrolyte, and a molten metal positive electrode. The molten metal positive electrode can include, for example, one or more of tin, lead, bismuth, antimony, tellurium and selenium. For example, the positive electrode can include Pb or a Pb—Sb alloy. The positive electrode can also include one or more transition metals or d-block elements (e.g., Zn, Cd, Hg) alone or in combination with other metals, metalloids or non-metals, such as, for example, a Zn—Sn alloy or Cd—Sn alloy. In some examples, the positive electrode can comprise a metal or metalloid that has only one stable oxidation state (e.g., a metal with a single or singular oxidation state). Any description of a metal or molten metal positive electrode, or a positive electrode, herein may refer to an electrode including one or more of a metal, a metalloid and a non-metal. The positive electrode may contain one or more of the listed examples of materials. In an example, the molten metal positive electrode can include lead and antimony. In some examples, the molten metal positive electrode may include an alkali or alkaline earth metal alloyed in the positive electrode.

In some examples, an electrochemical energy storage device includes a liquid metal negative electrode, a liquid metal positive electrode, and a liquid salt electrolyte separating the liquid metal negative electrode and the liquid metal positive electrode. The negative electrode can include an alkali or alkaline earth metal, such as lithium, sodium, potassium, rubidium, cesium, magnesium, barium, calcium, sodium, or combinations thereof. The positive electrode can include elements selected from transition metals, d-block elements (e.g., Group 12) or Group IIIA, IVA, VA and VIA of the periodic table of the elements (e.g., zinc, cadmium, mercury, aluminum, gallium, indium, silicon, germanium, tin and lead), pnicogens (e.g., arsenic, bismuth and antimony), chalcogens (e.g., sulfur, tellurium and selenium), or any combination thereof. In some examples, the positive electrode comprises a Group 12 element of the periodic table of the elements, such as one or more of zinc (Zn), cadmium (Cd) and mercury (Hg). In some cases, the positive electrode may form a eutectic or off-eutectic mixture (e.g., enabling lower operating temperature of the cell in some cases). In some examples, the positive electrode comprises a first positive electrode species and a second positive electrode species at a ratio (mol-%) of about 20:80, 40:60, 50:50, 60:40, or 80:20 of the first positive electrode species to the second electrode species. In some examples, the positive electrode comprises Sb and Pb at a ratio (mol-%) of about 20:80, 40:60, 50:50, 60:40, or 80:20 Sb to Pb. In some examples, the positive electrode comprises between about 20 mol % and 80 mol-% of a first positive electrode species mixed with a second positive electrode species. In some cases, the positive electrode comprises between about 20 mol-% and 80 mol-% Sb (e.g., mixed with Pb). In some cases, the positive electrode comprises between about 20 mol-% and 80 mol-% Pb (e.g., mixed with Sb). In some examples, the positive electrode comprises one or more of Zn, Cd, Hg, or such material(s) in combination with other metals, metalloids or non-metals, such as, for example, a Zn—Sn alloy, Zn—Sn alloy, Cd—Sn alloy, Zn—Pb alloy, Zn—Sb alloy, or Bi. In an example, the positive electrode can comprise about 15:85, 50:50, 75:25 or 85:15 mol-% Zn:Sn.

The electrolyte can include a salt (e.g., molten salt), such as an alkali or alkaline earth metal salt. The alkali or alkaline earth metal salt can be a halide, such as a fluoride, chloride, bromide, or iodide of the active alkali or alkaline earth metal, or combinations thereof. In an example, the electrolyte (e.g., in Type 1 or Type 2 chemistries) includes lithium chloride. In some examples, the electrolyte can comprise sodium fluoride (NaF), sodium chloride (NaCl), sodium bromide (NaBr), sodium iodide (NaI), lithium fluoride (LiF), lithium chloride (LiCl), lithium bromide (LiBr), lithium iodide (LiI), potassium fluoride (KF), potassium chloride (KCl), potassium bromide (KBr), potassium iodide (KI), calcium fluoride ($CaF_2$), calcium chloride ($CaCl_2$), calcium bromide ($CaBr_2$), calcium iodide ($CaI_2$), or any combination thereof. In another example, the electrolyte includes magnesium chloride ($MgCl_2$). As an alternative, the salt of the active alkali metal can be, for example, a non-chloride halide, bistriflimide, fluorosulfano-amine, perchlorate, hexaflourophosphate, tetrafluoroborate, carbonate, hydroxide, nitrate, nitrite, sulfate, sulfite, or any combination thereof. In some cases, the electrolyte can comprise a mixture of salts (e.g., 25:55:20 mol-% LiF:LiCl:LiBr, 50:37:14 mol-% LiCl:LiF:LiBr, etc.). The electrolyte may exhibit low (e.g., minimal) electronic conductance. For example, the electrolyte can have an electronic transference number (i.e., percentage of electrical (electronic and ionic) charge that is due to the transfer of electrons) of less than or equal to about 0.03% or 0.3%.

In some cases, the negative electrode and the positive electrode of an electrochemical energy storage device are in the liquid state at an operating temperature of the energy storage device. To maintain the electrodes in the liquid states, the battery cell may be heated to any suitable temperature. In some examples, the battery cell is heated to and/or maintained at a temperature of about 100° C., 150° C., 200° C., 250° C., 300° C., 350° C., 400° C., 450° C., 475° C., 500° C., 550° C., 600° C., 650° C. or about 700° C. The battery cell may be heated to and/or maintained at a temperature of at least about 100° C., 150° C., 200° C., 250° C., 300° C., 350° C., 400° C., 450° C., 475° C., 500° C., 550° C., 600° C., 650° C., 700° C., 800° C. or 900° C. In such a case, one or more of the negative electrode, electrolyte and positive electrode can be in a liquid (or molten) state. In some situations, the battery cell is heated to between about 200° C. and 600° C., 500° C. and 550° C. or 450° C. and 575° C.

In some implementations, the electrochemical cell or energy storage device may be at least partially or fully self-heated. For example, a battery may be sufficiently insulated, charged, discharged and/or conditioned at sufficient rates, and/or cycled a sufficient percentage of the time to allow the system to generate sufficient heat through inefficiencies of the cycling operation that cells are maintained at a given operating temperature (e.g., a cell operating temperature above the freezing point of at least one of the liquid components) without the need for additional energy to be supplied to the system to maintain the operating temperature.

Electrochemical cells of the disclosure may be adapted to cycle between charged (or energy storage) modes and discharged modes. In some examples, an electrochemical cell can be fully charged, partially charged or partially discharged, or fully discharged. State of charge or discharge may be directly related to the voltage of a cell. For example, the state of charge or discharge may refer to the voltage of the cell with respect to another voltage, such as, for example, cell voltage after charging or cell voltage upon commencement of discharging.

In some implementations, during a charging mode of an electrochemical energy storage device, electrical current received from an external power source (e.g., a generator or an electrical grid) may cause metal atoms in the metal positive electrode to release one or more electrons, dissolving into the electrolyte as a positively charged ion (i.e., cation). Simultaneously, cations of the same species can migrate through the electrolyte and may accept electrons at the negative electrode, causing the cations to transition to a neutral metal species, thereby adding to the mass of the negative electrode. The removal of the active metal species from the positive electrode and the addition of the active metal to the negative electrode stores electrochemical energy. In some cases, the removal of a metal from the positive electrode and the addition of its cation to the electrolyte can store electrochemical energy. In some cases, electrochemical energy can be stored through a combination of removal of the active metal species from the positive electrode and its addition to the negative electrode, and the removal of one or more metals (e.g., different metals) from the positive electrode and their addition to the electrolyte (e.g., as cations). During an energy discharge mode, an electrical load is coupled to the electrodes and the previously added metal species in the negative electrode can be released from the metal negative electrode, pass through the electrolyte as ions, and deposit as a neutral species in the positive electrode (and in some cases alloy with the positive electrode material), with the flow of ions accompanied by the external and matching flow of electrons through the external circuit/load. In some cases, one or more cations of positive electrode material previously released into the electrolyte can deposit as neutral species in the positive electrode (and in some cases alloy with the positive electrode material), with the flow of ions accompanied by the external and matching flow of electrons through the external circuit/load. This electrochemically facilitated metal alloying reaction discharges the previously stored electrochemical energy to the electrical load.

In a charged state, the negative electrode can include negative electrode material and the positive electrode can include positive electrode material. During discharging (e.g., when the battery is coupled to a load), the negative electrode material yields one or more electrons, and cations of the negative electrode material. In some implementations, the cations migrate through the electrolyte to the positive electrode material and react with the positive electrode material (e.g., to form an alloy). In some implementations, ions of the positive metal species (e.g., cations of the positive electrode material) accept electrons at the positive electrode and deposit as a metal on the positive electrode. During charging, in some implementations, the alloy at the positive electrode disassociates to yield cations of the negative electrode material, which migrate through the electrolyte to the negative electrode. In some implementations, one or more metal species at the positive electrode disassociates to yield cations of the negative electrode material in the electrolyte. In some examples, ions can migrate through an electrolyte from an anode to a cathode, or vice versa. In some cases, ions can migrate through an electrolyte in a push-pop fashion in which an entering ion of one type ejects an ion of the same type from the electrolyte. For example, during discharge, an alkali metal anode and an alkali metal chloride electrolyte can contribute an alkali metal cation to a cathode by a process in which an alkali metal cation formed at the anode interacts with the electrolyte to eject an alkali metal cation from the electrolyte into the cathode. The alkali metal cation formed at the anode in such a case may not necessarily migrate through the electrolyte to the cathode. The cation can be formed at an interface between the anode and the electrolyte, and accepted at an interface of the cathode and the electrolyte.

Cells may have voltages. Charge cutoff voltage (CCV) may refer to the voltage at which a cell is fully or substantially fully charged, such as a voltage cutoff limit used in a battery when cycled in a constant current mode. Open circuit voltage (OCV) may refer to the voltage of a cell (e.g., fully or partially charged) when it is disconnected from any circuit or external load (i.e., when no current is flowing through the cell). Voltage or cell voltage, as used herein, may refer to the voltage of a cell (e.g., at any state of charge or charging/discharging condition). In some cases, voltage or cell voltage may be the open circuit voltage. In some cases, the voltage or cell voltage can be the voltage during charging or during discharging. Voltages of the present disclosure may be taken or represented with respect to reference voltages, such as ground (0 volt (V)), or the voltage of the opposite electrode in an electrochemical cell.

The present disclosure provides Type 1 and Type 2 cells, which can vary based on, and be defined by, the composition of the active components (e.g., negative electrode, electrolyte and positive electrode), and based on the mode of operation of the cells (e.g., low voltage mode versus high voltage mode). A cell can comprise materials that are configured for use in Type 2 mode of operation. A cell can comprise materials that are configured for use in Type 1 mode of operation. In some cases, a cell can be operated in both a high voltage (Type 2) operating mode and the low voltage (Type 1) operating mode. For example, a cell with positive and negative electrode materials that are ordinarily configured for use in a Type 1 mode can be operated in a Type 2 mode of operation. A cell can be cycled between Type 1 and Type 2 modes of operation. A cell can be initially charged (or discharged) under Type 1 mode to a given voltage (e.g., 0.5 V to 1 V), and subsequently charged (then discharged) under Type 2 mode to a higher voltage (e.g., 1.5 V to 2.5 V, or 1.5 V to 3 V). In some cases, cells operated under Type 2 mode can operate at a voltage between electrodes that can exceed those of cells operated under Type 1 mode. In some cases, Type 2 cell chemistries can operate at a voltage between electrodes that can exceed those of Type 1 cell chemistries operated under Type 1 mode. Type 2 cells can be operated in Type 2 mode.

In an example Type 1 cell, upon discharging, cations formed at the negative electrode can migrate into the electrolyte. Concurrently, the electrolyte can provide a cation of the same species (e.g., the cation of the negative electrode material) to the positive electrode, which can reduce from a cation to a neutrally charged metallic species, and alloy with the positive electrode. In a discharged state, the negative electrode can be depleted (e.g., partially or fully) of the negative electrode material (e.g., Li, Na, K, Mg, Ca). During charging, the alloy at the positive electrode can disassociate to yield cations of the negative electrode material (e.g., $Li^+$, $Na^+$, $K^+$, $Mg^{2+}$, $Ca^{2+}$), which migrates into the electrolyte. The electrolyte can then provide cations (e.g., the cation of the negative electrode material) to the negative electrode, where the cations accept one or more electrons from an external circuit and are converted back to a neutral metal species, which replenishes the negative electrode to provide a cell in a charged state. A Type 1 cell can operate in a push-pop fashion, in which the entry of a cation into the electrolyte results in the discharge of the same cation from the electrolyte.

In an example Type 2 cell, in a discharged state the electrolyte comprises cations of the negative electrode material (e.g., $Li^+$, $Na^+$, $K^+$, $Mg^{2+}$, $Ca^{2+}$), and the positive electrode comprises positive electrode material (e.g., Sb, Pb, Sn, Zn, Hg). During charging, a cation of the negative electrode material from the electrolyte accepts one or more electrons (e.g., from a negative current collector) to form the negative electrode comprising the negative electrode material. In some examples, the negative electrode material is liquid and wets into a foam (or porous) structure of the negative current collector. In some examples, negative current collector may not comprise foam (or porous) structure. In some examples, the negative current collector may comprise a metal, such as, for example, tungsten (e.g., to avoid corrosion from Zn), tungsten carbide or molybdenum negative collector not comprising Fe—Ni foam. Concurrently, positive electrode material from the positive electrode sheds electrons (e.g., to a positive current collector) and dissolves into the electrolyte as cations of the positive electrode material (e.g., $Sb^{3+}$, $Pb^{2+}$, $Sn^{2+}$, $Zn^{2+}$, $Hg^{2+}$). The concentration of the cations of the positive electrode material can vary in vertical proximity within the electrolyte (e.g., as a function of distance above the positive electrode material) based on the atomic weight and diffusion dynamics of the cation material in the electrolyte. In some examples, the cations of the positive electrode material are concentrated in the electrolyte near the positive electrode.

Although electrochemical cells of the present disclosure have been described, in some examples, as operating in a Type 1 mode or Type 2 mode, other modes of operation are possible. Type 1 mode and Type 2 mode are provided as examples and are not intended to limit the various modes of operation of electrochemical cells disclosed herein.

In some cases, an electrochemical cell comprises a liquid metal negative electrode (e.g., sodium (Na) or lithium (Li)), a solid ion-conducting electrolyte (e.g., 13"-alumina ceramic), and a liquid or semi-solid positive electrode (e.g., a solid matrix or particle bed impregnated with a liquid or molten electrolyte). Such a cell can be a high temperature battery. One or more such cells can be provided in an electrochemical energy storage device. The negative electrode may comprise an alkali or alkaline earth metal, such as, for example, lithium, sodium, potassium, magnesium, calcium, or any combination thereof. The positive electrode and/or electrolyte may comprise a liquid chalcogen or a molten chalcogen-halogen compound (e.g., elemental, ionic or other form of sulfur (S), selenium (Se) or tellurium (Te)), a molten salt comprising a transition metal halide (e.g., halides comprising Ni, Fe, Cr, Mn, Co or V, such as, for example, $NiCl_3$ or $FeCl_3$), a solid transition metal (e.g., particles of Ni, Fe, Cr, Mn, Co or V), a liquid or molten alkali halometallate (e.g., comprising Al, Zn or Sn) and/or other (e.g., supporting) compounds (e.g., NaCl, NaF, NaBr, NaI, KCl, LiCl or other alkali halides, bromide salts, elemental zinc, zinc-chalcogen or zinc-halogen compounds, or metallic main-group metals or oxygen scavengers such as, for example, aluminum or transition metal-aluminum alloys), or any combination thereof. The solid ion-conducting electrolyte may comprise a beta alumina (e.g., β"-alumina) ceramic capable of conducting sodium ions at elevated or high temperature. In some instances, the solid ion-conducting electrolyte operates above about 100° C., 150° C., 200° C., 250° C., 300° C. or 350° C.

Any aspects of the disclosure described in relation to cathodes can equally apply to anodes at least in some configurations. Similarly, one or more battery electrodes and/or the electrolyte may not be liquid in alternative configurations. In an example, the electrolyte can be a polymer, a gel or a paste. In a further example, at least one battery electrode can be a solid, a gel or a paste. Furthermore, in some examples, the electrodes and/or electrolyte may not include metal. Aspects of the disclosure are applicable to a variety of energy storage/transformation devices without being limited to liquid metal batteries.

Batteries and Housings

Electrochemical cells of the disclosure can include housings that may be suited for various uses and operations. A housing can include one cell or a plurality of cells. A housing can be configured to electrically couple the electrodes to a switch, which can be connected to the external power source and/or the electrical load. The cell housing may include, for example, an electrically conductive container that is electrically coupled to a first pole of the switch and/or another cell housing, and an electrically conductive container lid that is electrically coupled to a second pole of the switch and/or another cell housing. The cell can be arranged within a cavity of the container. A first one of the electrodes of the cell (e.g., positive electrode) can contact and be electrically coupled with an endwall of the container. A second one of the electrodes of the cell (e.g., negative electrode) can contact and be electrically coupled with a conductive feed-through or conductor (e.g., negative current lead) on the container lid (collectively referred to herein as "cell lid assembly," "lid assembly" or "cap assembly" herein). An electrically insulating seal (e.g., bonded ceramic ring) may electrically isolate negative potential portions of the cell from positive portions of the container (e.g., electrically insulate the negative current lead from the positive current lead). In an example, the negative current lead and the container lid (e.g., cell cap) can be electrically isolated from each other, where a dielectric sealant material can be placed between the negative current lead and the cell cap. As an alternative, a housing includes an electrically insulating sheath (e.g., alumina sheath) or corrosion resistant and electrically conductive sheath or crucible (e.g., graphite sheath or crucible). In some cases, a housing and/or container may be a battery housing and/or container.

A cell can have any cell and seal configuration disclosed herein. For instance, the active cell materials can be held within a sealed steel/stainless steel container with a high temperature seal on the cell lid. A negative current lead can pass through the cell lid (and be sealed to the cell lid by the dielectric high temperature seal), and connect with a porous negative current collector (e.g., metal foam) suspended in an electrolyte. In some cases, the cell can use a graphite sheath, coating, crucible, surface treatment or lining (or any combination thereof) on the inner wall of the cell crucible (e.g., container). In other cases, the cell may not use a graphite sheath, coating, crucible, surface treatment or lining on an inner wall of the cell crucible (e.g., container).

A cell may have a set of dimensions. In some cases, a cell can be greater than or equal to about 4 inches wide, 4 inches deep and 2.5 inches tall. In some cases, a cell can be greater than or equal to about 8 inches wide, 8 inches deep and 2.5 inches tall. In some examples, any given dimension (e.g., height, width or depth) of an electrochemical cell can be at least about 1, 2, 2.5, 3, 3.5, 4, 4.5, 5, 5.5, 6, 6.5, 7, 7.5, 8, 8.5, 9, 9.5, 10, 12, 14, 16, 18 or 20 inches. In an example, a cell (e.g., each cell) can have dimensions of greater than or equal to about 4 inches×4 inches×2.5 inches. In another example, a cell (e.g., each cell) can have dimensions of greater than or equal to about 8 inches×8 inches×2.5 inches. In some cases, a cell may have greater than or equal to about 50 Watt-hours of energy storage capacity. In some cases, a cell may have at least about 200 Watt-hours of energy storage capacity.

One or more electrochemical cells ("cells") may be arranged in groups. Examples of groups of electrochemical cells include modules, series strings, packs, cores, CEs and systems.

A module can comprise cells that are attached together in parallel by, for example, mechanically connecting the cell housing of one cell with the cell housing of an adjacent cell (e.g., cells that are connected together in an approximately horizontal packing plane). In some cases, the cells are connected to each other by joining features that are part of and/or connected to the cell body (e.g., tabs protruding from the main portion of the cell body). A module can include a plurality of cells in parallel. A module can comprise any number of cells, e.g., at least about 2, 3, 4, 5, 6, 7, 8, 9, 10, 11, 12, 13, 14, 15, 16, 17, 18, 19, 20 or more cells. In some cases, a module comprises at least about 4, 9, 12 or 16 cells. In some cases, a module is capable of storing greater than or equal to about 700 Watt-hours of energy and/or delivering at least about 175 Watts of power. In some cases, a module is capable of storing at least about 1080 Watt-hours of energy and/or delivering at least about 500 Watts of power. In some cases, a module is capable of storing at least about 1080 Watt-hours of energy and/or delivering at least about 200 Watts (e.g., greater than or equal to about 500 Watts) of power. In some cases, a module can include a single cell.

A series string can comprise cells that are attached together in series by, for example, mechanically connecting the terminal of one cell to the opposing polarity terminal of an adjacent cell (e.g., cells that are connected together in an approximately horizontal packing plane). In some cases, the cells are connected to each other by joining features that are part of and/or connected to the cell body (e.g., tabs protruding from the main portion of the cell body). A series string can include a plurality of cells in series. A series string can comprise any number of cells, e.g., at least about 2, 3, 4, 5, 6, 7, 8, 9, 10, 11, 12, 13, 14, 15, 16, 17, 18, 19, 20, 30, 40, 50, 60, 70, 80 or more cells. In some cases, a series string comprises at least about 4, 9, 12 or 16 cells. In some cases, a series string is capable of storing greater than or equal to about 700 Watt-hours of energy and/or delivering at least about 175 Watts of power. In some cases, a series string is capable of storing at least about 1080 Watt-hours of energy and/or delivering at least about 500 Watts of power. In some cases, a series string is capable of storing at least about 1080 Watt-hours of energy and/or delivering at least about 200 Watts (e.g., greater than or equal to about 500 Watts) of power. In some cases, a series string can include a single cell.

A pack can comprise modules or series strings that are attached through different electrical connections (e.g., vertically). A pack can comprise any number of modules or series strings, e.g., at least about 1, 2, 3, 4, 5, 6, 7, 8, 9, 10, 11, 12, 13, 14, 15, 16, 17, 18, 19, 20 or more modules or series strings. In some cases, a pack comprises at least about 3 modules or series strings. In some cases, a pack is capable of storing at least about 2 kilo-Watt-hours of energy and/or delivering at least about 0.4 kilo-Watts (e.g., at least about 0.5 kilo-Watts or 1.0 kilo-Watts) of power. In some cases, a pack is capable of storing at least about 3 kilo-Watt-hours of energy and/or delivering at least about 0.75 kilo-Watts (e.g., at least about 1.5 kilo-Watts) of power. In some cases, a pack comprises at least about 6 modules or series strings. In some cases, a pack is capable of storing greater than or equal to about 6 kilo-Watt-hours of energy and/or delivering at least about 1.5 kilo-Watts (e.g., greater than or equal to about 3 kilo-Watts) of power.

A core can comprise a plurality of modules or packs that are attached through different electrical connections (e.g., in series and/or parallel). A core can comprise any number of modules or packs, e.g., at least about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 45, 50 or more packs. In some cases, the core also comprises mechanical, electrical, and thermal systems that allow the core to efficiently store and return electrical energy in a controlled manner. In some cases, a core comprises at least about 12 packs. In some cases, a core is capable of storing at least about 25 kilo-Watt-hours of energy and/or delivering at least about 6.25 kilo-Watts of power. In some cases, a core comprises at least about 36 packs. In some cases, a core is capable of storing at least about 200 kilo-Watt-hours of energy and/or delivering at least about 40, 50, 60, 70, 80, 90 or 100 kilo-Watts or more of power.

A core enclosure (CE) can comprise a plurality of cores that are attached through different electrical connections (e.g., in series and/or parallel). A CE can comprise any number of cores, e.g., at least about 1, 2, 3, 4, 5, 6, 7, 8, 9, 10, 11, 12, 13, 14, 15, 16, 17, 18, 19, 20 or more cores. In some cases, the CE contains cores that are connected in parallel with appropriate by-pass electronic circuitry, thus enabling a core to be disconnected while continuing to allow the other cores to store and return energy. In some cases, a CE comprises at least 4 cores. In some cases, a CE is capable of storing at least about 100 kilo-Watt-hours of energy and/or delivering greater than or equal to about 25 kilo-Watts of power. In some cases, a CE comprises 4 cores. In some cases, a CE is capable of storing greater than or equal to about 100 kilo-Watt-hours of energy and/or delivering greater than or equal to about 25 kilo-Watts of power. In some cases, a CE is capable of storing greater than or equal to about 400 kilo-Watt-hours of energy and/or delivering at least about 80 kilo-Watts, e.g., greater than or equal to about 80, 100, 120, 140, 160, 180, 200, 250 or 300 kilo-Watts or more of power.

A system can comprise a plurality of cores or CEs that are attached through different electrical connections (e.g., in series and/or parallel). A system can comprise any number of cores or CEs, e.g., at least about 2, 3, 4, 5, 6, 7, 8, 9, 10, 11, 12, 13, 14, 15, 16, 17, 18, 19, 20 or more cores. In some cases, a system comprises 20 CEs. In some cases, a system is capable of storing greater than or equal to about 2 mega-Watt-hours of energy and/or delivering at least about 400 kilo-Watts (e.g., about or at least about 500 kilo-Watts or 1000 kilo-Watts) of power. In some cases, a system comprises 5 CEs. In some cases, a system is capable of storing greater than or equal to about 2 mega-Watt-hours of energy and/or delivering at least about 400 kilo-Watts, e.g., at least about 400, 500, 600, 700, 800, 900, 1000, 1200, 1500, 2000, 2500, 3000 or 5000 kilo-Watts or more of power.

A group of cells (e.g., a core, a CE, a system, etc.) with a given energy capacity and power capacity (e.g., a CE or a system capable of storing a given amount of energy) may be configured to deliver at least about 10%, 20%, 30%, 40%, 50%, 60%, 70%, 80%, 90% or 95%, or about 100% of a given (e.g., rated) power level. For example, a 1000 kilo-Watt (kW) system may be capable of also operating at 500 kW, but a 500 kW system may not be able to operate at 1000 kW. In some cases, a system with a given energy capacity and power capacity (e.g., a CE or a system capable of storing a given amount of energy) may be configured to deliver less than about 100%, 110%, 125%, 150%, 175% or 200% of a given (e.g., rated) power level, and the like. For example, the system may be configured to provide more than its rated power capacity for a period of time that is less than the time it may take to consume its energy capacity at the power level that is being provided (e.g., provide power that is greater than the rated power of the system for a period of time corresponding to less than about 1%, 10% or 50% of its rated energy capacity).

A battery can comprise one or more electrochemical cells connected in series and/or parallel. A battery can comprise any number of electrochemical cells, modules, series strings, packs, cores, CEs or systems. A battery may undergo at least one charge/discharge or discharge/charge cycle ("cycle").

A battery can comprise one or more (e.g., a plurality of) electrochemical cells. The cell(s) can include housings. Individual cells can be electrically coupled to one another in series and/or in parallel. In series connectivity, the positive terminal of a first cell is connected to a negative terminal of a second cell. In parallel connectivity, the positive terminal of a first cell can be connected to a positive terminal of a second, and/or additional, cell(s). Similarly, cell modules, series strings, packs, cores, CEs and systems can be connected in series and/or in parallel in the same manner as described for cells.

Reference will now be made to the figures, wherein like numerals refer to like parts throughout. It will be appreciated that the figures and features therein are not necessarily drawn to scale.

With reference to FIG. 1, an electrochemical cell (A) is a unit comprising an anode and a cathode. The cell may comprise an electrolyte and be sealed in a housing as described herein. In some cases, the electrochemical cells can be stacked (B) to form a battery (i.e., a compilation of one or more electrochemical cells). The cells can be arranged in parallel, in series, or both in parallel and in series (C). Further, as described in greater detail elsewhere herein, the cells can be arranged in groups (e.g., modules, series strings, packs, cores, CEs, systems, or any other group comprising one or more electrochemical cells). In some cases, such groups of electrochemical cells may allow a given number of cells to be controlled or regulated together at the group level (e.g., in concert with or instead of regulation/control of individual cells).

Electrochemical cells of the disclosure (e.g., Type 1 cell operated in Type 2 mode, Type 1 cell operated in Type 1 mode, or Type 2 cell) may be capable of storing, receiving input of ("taking in") and/or discharging a suitably large amount of energy (e.g., substantially large amounts of energy). In some instances, a cell is capable of storing, taking in and/or discharging greater than or equal to about 1 watt-hour (Wh), 5 Wh, 25 Wh, 50 Wh, 100 Wh, 250 Wh, 500 Wh, 1 kilo-Watt-hour (kWh), 1.5 kWh, 2 kWh, 3 kWh, 5 kWh, 10 kWh, 15 kWh, 20 kWh, 30 kWh, 40 kWh or 50 kWh. It is recognized that the amount of energy stored in an electrochemical cell and/or battery may be less than the amount of energy taken into the electrochemical cell and/or battery (e.g., due to inefficiencies and losses). A cell can have such energy storage capacities upon operating at any of the current densities herein. A cell can be operated without a substantial decrease in capacity.

A cell can be capable of providing a current at a current density of at least about 10 milli-amperes per square centimeter ($mA/cm^2$), 20 $mA/cm^2$, 30 $mA/cm^2$, 40 $mA/cm^2$, 50 $mA/cm^2$, 60 $mA/cm^2$, 70 $mA/cm^2$, 80 $mA/cm^2$, 90 $mA/cm^2$, 100 $mA/cm^2$, 200 $mA/cm^2$, 300 $mA/cm^2$, 400 $mA/cm^2$, 500 $mA/cm^2$, 600 $mA/cm^2$, 700 $mA/cm^2$, 800 $mA/cm^2$, 900 $mA/cm^2$, 1 $A/cm^2$, 2 $A/cm^2$, 3 $A/cm^2$, 4 $A/cm^2$, 5 $A/cm^2$ or 10 $A/cm^2$, where the current density is determined based on the effective cross-sectional area of the electrolyte and where the cross-sectional area is the area that is orthogonal to the net flow direction of ions through the electrolyte during charge or discharging processes. In some instances, a cell can be capable of operating at a direct current (DC) efficiency of at least about 10%, 20%, 30%, 35%, 40%, 45%, 50%, 55%, 60%, 65%, 70%, 75%, 80%, 90%, 95%, and the like. In some instances, a cell can be capable of operating at a charge efficiency (e.g., Coulombic charge efficiency) of at least about 10%, 20%, 30%, 40%, 50%, 60%, 70%, 80%, 85%, 90%, 95%, 98%, 99%, 99.5%, 99.9%, 99.95%, 99.99%, and the like.

In a charged state, electrochemical cells of the disclosure (e.g., Type 1 cell operated in Type 2 mode, Type 1 cell operated in Type 1 mode, or Type 2 cell) can have (or can operate at) a voltage of at least about 0 V, 0.1 V, 0.2 V, 0.3 V, 0.4 V, 0.5 V, 0.6 V, 0.7 V, 0.8 V, 0.9 V, 1.0 V, 1.1 V, 1.2 V, 1.3 V, 1.4 V, 1.5 V, 1.6 V, 1.7 V, 1.8 V, 1.9 V, 2.0 V, 2.1 V, 2.2 V, 2.3 V, 2.4 V, 2.5 V, 2.6 V, 2.7 V, 2.8 V, 2.9 V or 3.0 V. In some cases, a cell can have an open circuit voltage (OCV) of at least about 0.2 V, 0.3 V, 0.4 V, 0.5 V, 0.6 V, 0.7 V, 0.8 V, 0.9 V, 1.0 V, 1.1 V, 1.2 V, 1.3 V, 1.4 V, 1.5 V, 1.6 V, 1.7 V, 1.8 V, 1.9 V, 2.0 V, 2.1 V, 2.2 V, 2.3 V, 2.4 V, 2.5 V, 2.6 V, 2.7 V, 2.8 V, 2.9 V or 3.0 V. In an example, a cell has an open circuit voltage greater than about 0.5 V, 1 V, 2 V or 3 V. In some cases, a charge cutoff voltage (CCV) of a cell is from greater than or equal to about 0.5 V to 1.5 V, 1 V to 3 V, 1.5 V to 2.5 V, 1.5 V to 3 V or 2 V to 3 V in a charged state. In some cases, a charge cutoff voltage (CCV) of a cell is at least about 0.5 V, 0.6 V, 0.7 V, 0.8 V, 0.9 V, 1.0 V, 1.1 V, 1.2 V, 1.3 V, 1.4 V, 1.5 V, 1.6 V, 1.7 V, 1.8 V, 1.9 V, 2.0 V, 2.1 V, 2.2 V, 2.3 V, 2.4 V, 2.5 V, 2.6 V, 2.7 V, 2.8 V, 2.9 V or 3.0 V. In some cases, a voltage of a cell (e.g., operating voltage) is between about 0.5 V and 1.5 V, 1 V and 2 V, 1 V and 2.5 V, 1.5 V and 2.0 V, 1 V and 3 V, 1.5 V and 2.5 V, 1.5 V and 3 V or 2 V and 3 V in a charged state. A cell can provide such voltage(s) (e.g., voltage, OCV and/or CCV) upon operating at up to and exceeding about 10 cycles, 20 cycles, 30 cycles, 40 cycles, 50 cycles, 100 cycles, 200 cycles, 300 cycles, 400 cycles, 500 cycles, 600 cycles, 700 cycles, 800 cycles, 900 cycles, 1,000 cycles, 2,000 cycles, 3,000 cycles, 4,000 cycles, 5,000 cycles, 10,000 cycles, 20,000 cycles, 50,000 cycles, 100,000 cycles or 1,000,000 or more cycles (also "charge/discharge cycles" herein).

Electrochemical cells of the disclosure (e.g., Type 1 cell operated in Type 2 mode, Type 1 cell operated in Type 1 mode, or Type 2 cell) may be capable of storing, receiving input of ("taking in") and/or discharging a suitably large amount of charge (e.g., substantially large amounts of charge). In some instances, a cell is capable of storing, taking in and/or discharging greater than or equal to about 0.3 ampere-hour (Ah), 0.5 Ah, 1 Ah, 2 Ah, 5 Ah, 10 Ah, 20 Ah, 30 Ah, 40 Ah, 50 Ah, 60 Ah, 70 Ah, 80 Ah, 90 Ah, 100 Ah, 200 Ah, 300 Ah, 400 Ah, 500 Ah, 600 Ah, 700 Ah, 800 Ah, 900 Ah, 1 kilo-ampere-hour (kAh), 2 kAh, 5 kAh, 10 kAh, 15 kAh, 20 kAh, 30 kAh, 40 kAh, 50 kAh, 60 kAh, 70 kAh, 80 kAh, 90 kAh, 100 kAh, 200 kAh, 300 kAh, 400 kAh or 500 kAh. It is recognized that the amount of charge stored in an electrochemical cell and/or battery may be less than the amount of charge taken into the electrochemical cell and/or battery (e.g., due to inefficiencies and losses).

An electrochemical cell of the present disclosure can have a response time of any suitable value (e.g., suitable for responding to disturbances in the power grid). In some instances, the response time is less than or equal to about 100 milliseconds (ms), 50 ms, 10 ms, 6 ms, 5 ms, 1 ms, 0.05 ms, 0.01 ms, 0.005 ms, 0.001 ms, and the like.

A compilation or array of cells (e.g., battery) can include any suitable number of cells, such as at least about 2, 5, 10, 50, 100, 500, 1000, 5000, 10000, and the like. In some examples, a battery includes at least about 1, 2, 3, 4, 5, 6, 7, 8, 9, 10, 15, 20, 30, 40, 50, 60, 70, 80, 90, 100, 200, 300, 400, 500, 600, 700, 800, 900, 1000, 2000, 5000, 10,000, 20,000, 50,000, 100,000, 500,000 or 1,000,000 cells.

Batteries of the disclosure may be capable of storing and/or taking in a suitably large amount of energy (e.g., a substantially large amount of energy) for use with a power grid (i.e., a grid-scale battery) or other loads or uses. In some instances, a battery is capable of storing, taking in and/or discharging greater than or equal to about 1 watt-hour (Wh), 5 Wh, 25 Wh, 50 Wh, 100 Wh, 250 Wh, 500 Wh, 1 kilo-Watt-hour (kWh), 1.5 kWh, 2 kWh, 3 kWh, 5 kWh, 10 kWh, 15 kWh, 20 kWh, 25 kWh, 30 kWh, 40 kWh, 50 kWh, 100 kWh, 500 kWh, 1 mega-Watt-hour (MWh), 1.5 MWh, 2 MWh, 3 MWh, 4 MWh, 5 MWh, 10 MWh, 25 MWh, 50 MWh or 100 MWh.

Batteries of the disclosure may be capable of storing and/or taking in a suitably large amount of charge (e.g., a substantially large amount of charge) for use with a power grid (i.e., a grid-scale battery) or other loads or uses. In some instances, a battery is capable of storing, taking in and/or discharging greater than or equal to about 0.3 ampere-hour (Ah), 0.5 Ah, 1 Ah, 2 Ah, 5 Ah, 10 Ah, 20 Ah, 30 Ah, 40 Ah, 50 Ah, 60 Ah, 70 Ah, 80 Ah, 90 Ah, 100 Ah, 200 Ah, 300 Ah, 400 Ah, 500 Ah, 600 Ah, 700 Ah, 800 Ah, 900 Ah, 1 kilo-ampere-hour (kAh), 2 kAh, 5 kAh, 10 kAh, 15 kAh, 20 kAh, 30 kAh, 40 kAh, 50 kAh, 60 kAh, 70 kAh, 80 kAh, 90 kAh, 100 kAh, 200 kAh, 300 kAh, 400 kAh, 500 kAh, 600 kAh, 700 kAh, 800 kAh, 900 kAh, 1 mega-ampere-hour (MAh), 10 MAh, 20 MAh, 50 MAh, 100 MAh, 200 MAh, 300 MAh, 400 MAh, 500 MAh, 600 MAh, 700 MAh, 800 MAh, 900 MAh or 1,000 MAh.

The battery can be any suitable size (e.g., have a suitable energy storage capacity). In an example, a battery comprises a plurality of electrochemical cells connected in series. The battery can be capable of storing at least about 10 kWh of energy and can have an operating temperature of, for example, at least about 250° C. Each of the electrochemical cells can have at least one liquid metal electrode. In an example, the battery is capable of storing at least about 30 kWh or 100 kWh of energy. In another example, a group of cells is capable of storing at least about 10 kWh of energy.

In some instances, the cells and cell housings are stackable. Any suitable number of cells can be stacked. Cells can be stacked side-by-side, on top of each other, or both. In some instances, at least about 3, 6, 10, 50, 100 or 500 cells are stacked. In some cases, a stack of 100 cells is capable of storing and/or taking in at least about 50 kWh of energy. A first stack of cells (e.g., 10 cells) can be electrically connected to a second stack of cells (e.g., another 10 cells) to increase the number of cells in electrical communication (e.g., 20 in this instance). In some instances, the energy storage device comprises a stack of 1 to 10, 11 to 50, 51 to 100 or more electrochemical cells.

An electrochemical energy storage device can include one or more individual electrochemical cells. An electrochemical cell can be housed in a container, which can include a container lid (e.g., cell cap) and seal component. The device can include at least 1, 2, 3, 4, 5, 6, 7, 8, 9, 10, 20, 30, 40, 50, 100, 200, 300, 400, 500, 1000, 10,000, 100,000 or 1,000,000 cells. The container lid may utilize, for example, a seal (e.g., annular dielectric gasket) to electrically isolate the container from the container lid. Such a component may be constructed from an electrically insulating material, such as, for example, glass, oxide ceramics, nitride ceramics, chalcogenides, or any combination thereof. The seal may be made hermetic by one or more methods.

Figure 2:
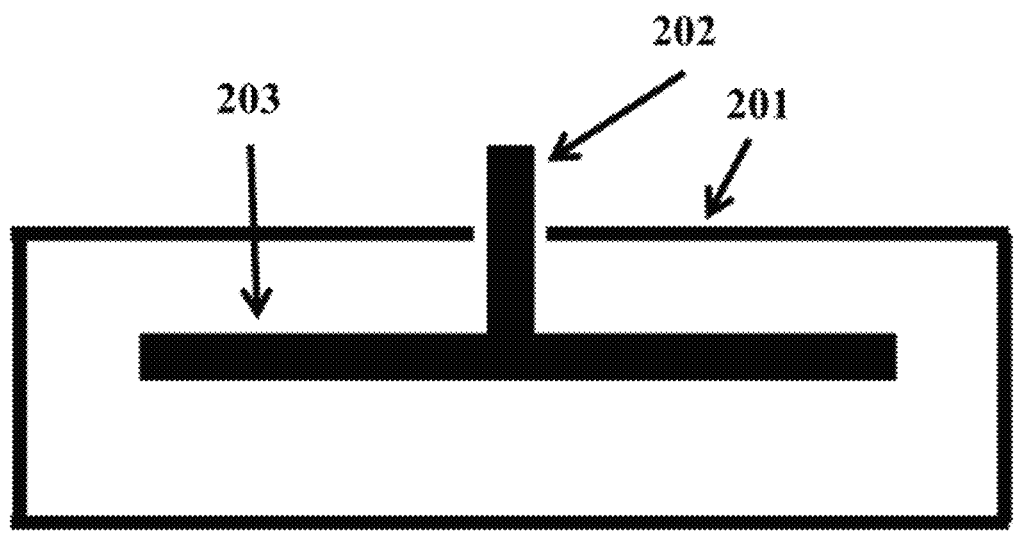
FIG. 2 is a schematic cross-sectional illustration of a housing having a conductor in electrical communication with a current collector passing through an aperture in the housing.

FIG. 2 schematically illustrates a battery that comprises an electrically conductive housing 201 and a conductor 202 in electrical communication with a current collector 203. The battery of FIG. 2 can be a cell of an energy storage device. The conductor can be electrically isolated from the housing and can protrude through the housing through an aperture in the housing such that the conductor of a first cell is in electrical communication with the housing of a second cell when the first and second cells are stacked.

In some cases, a cell comprises a negative current collector, a negative electrode, an electrolyte, a positive electrode and a positive current collector. The negative electrode can be part of the negative current collector. As an alternative, the negative electrode is separate from, but otherwise kept in electrical communication with, the negative current collector. The positive electrode can be part of the positive current collector. As an alternative, the positive electrode can be separate from, but otherwise kept in electrical communication with, the positive current collector.

A cell can comprise an electrically conductive housing and a conductor in electrical communication with a current collector. The conductor protrudes through the housing through an aperture in the housing and may be electrically isolated from the housing.

A cell housing may comprise an electrically conductive container and a conductor in electrical communication with a current collector. The conductor may protrude through the housing and/or container through an aperture in the container and may be electrically isolated from the container. The conductor of a first housing may contact the container of a second housing when the first and second housings are stacked.

In some instances, the area of the aperture through which the conductor protrudes from the housing and/or container is small relative to the area of the housing and/or container. The ratio of the area of the aperture to the area of the container and/or housing may be less than or equal to about 0.5, 0.4, 0.3, 0.2, 0.15, 0.1, 0.05, 0.01, 0.005 or 0.001 (e.g., less than about 0.1).

The housing can be capable of enclosing a cell that is capable of storing, taking in and/or discharging any suitable amount of energy, as described in greater detail elsewhere herein. For example, the housing can be capable of enclosing a cell that is capable of storing, taking in and/or discharging less than about 100 Wh, equal to about 100 Wh, more than about 100 Wh or at least about 10 Wh or 25 Wh of energy.

Figure 3:
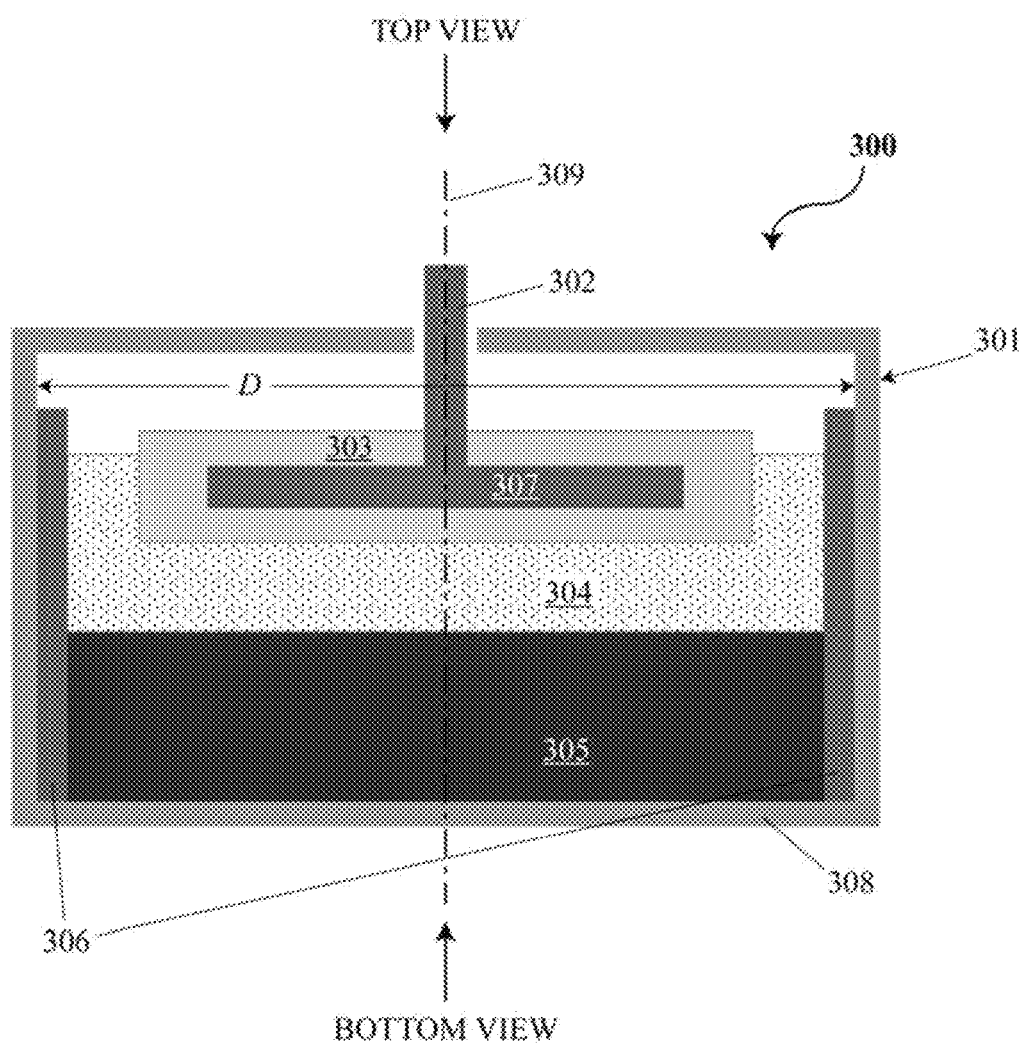
FIG. 3 is a cross-sectional side view of an electrochemical cell or battery.

FIG. 3 is a cross-sectional side view of an electrochemical cell or battery 300 comprising a housing 301, an electrically conductive feed-through (i.e., conductor, such as a conductor rod) 302 that passes through an aperture in the housing and is in electrical communication with a liquid metal negative electrode 303, a liquid metal positive electrode 305, and a liquid salt electrolyte 304 between the liquid metal electrodes 303, 305. The cell or battery 300 can be configured for use with cell chemistries operated under a low voltage mode ("Type 1 mode") or high voltage mode ("Type 2 mode"), as disclosed elsewhere herein. The conductor 302 may be electrically isolated from the housing 301 (e.g., using electrically insulating seals). The housing 301 can also include a first (e.g., negative) current collector or lead 307 and a second (e.g., positive) current collector 308. The negative current collector 307 may be constructed from an electrically conductive material such as, for example, nickel-iron (Ni—Fe) foam, perforated steel disk, sheets of corrugated steel, sheets of expanded metal mesh, etc. The negative current collector 307 may comprise foam material 303 that behaves like a sponge, and the negative electrode liquid metal soaks into the foam. The positive current collector 308 may be configured as part of the housing 301; for example, the bottom end wall of the housing may be configured as the positive current collector 308, as illustrated in FIG. 3. The liquid metal negative electrode 303 is in contact with the liquid salt electrolyte 304. The liquid salt electrolyte is also in contact with the positive liquid metal electrode 305. The positive liquid metal electrode 305 can be in electrical communication with the housing 301 along the side walls and/or along the bottom end wall of the housing.

The housing 301 can be constructed from an electrically conductive material such as, for example, steel, iron, stainless steel, low carbon steel, graphite, nickel, nickel based alloys, titanium, aluminum, molybdenum, tungsten, or conductive compounds such as nitrides (e.g., silicon carbide or titanium carbide), or a combination thereof (e.g., alloy).

The housing 301 can comprise a housing (or container) interior 306. The housing interior 306 may include, but is not limited to, a sheath (e.g., a graphite sheath), a coating, a crucible (e.g., a graphite crucible), a surface treatment, a lining, or any combination thereof. In one example, the housing interior 306 is a sheath. In another example, the housing interior 306 is a crucible. In yet another example, the housing interior 306 is a coating or surface treatment. The housing interior 306 may be thermally conductive, thermally insulating, electrically conductive, electrically insulating, or any combination thereof. For example, the housing interior (e.g., sheath, crucible and/or coating) 306 can be constructed from a material such as, for example, graphite, carbide (e.g., SiC, TiC), nitride (e.g., TiN, BN), alumina, titania, silica, magnesia, boron nitride, a mixed oxide (e.g., any combination of calcium oxide, aluminum oxide, silicon oxide, lithium oxide, magnesium oxide, etc.), or any combination thereof. In some cases, the housing interior 306 may be provided for protection of the housing (e.g., for protecting the stainless steel material of the housing from corrosion). In some cases, the housing interior can be anti-wetting to the liquid metal positive electrode. In some cases, the housing interior can be anti-wetting to the liquid electrolyte. For example, the housing interior 306 can be used to limit or prevent corrosion of the container and/or to limit or prevent wetting of the cathode material up the side wall, and may be constructed from an electrically conductive material, such as steel, stainless steel, tungsten, molybdenum, nickel, nickel-based alloys, graphite, titanium, or titanium nitride.

Viewed from a top or bottom direction, as indicated respectively by "TOP VIEW" and "BOTTOM VIEW" in FIG. 3, the cross-sectional geometry of the cell or battery 300 can be circular, elliptical, square, rectangular, polygonal, curved, symmetric, asymmetric or any other compound shape based on design requirements for the battery. In an example, the cell or battery 300 is axially symmetric with a circular or square cross-section. Components of cell or battery 300 (e.g., component in FIG. 3) may be arranged within the cell or battery in an axially symmetric fashion. In some cases, one or more components may be arranged asymmetrically, such as, for example, off the center of the axis 309.

In some cases, a cell can include one or more alloyed products that are liquid, semi-liquid (or semi-solid), or solid. The alloyed products can be immiscible (or, in some cases, soluble) with the negative electrode, positive electrode and/or electrolyte. The alloyed products can form from electrochemical processes during charging or discharging of a cell.

An alloyed product can include an element constituent of a negative electrode, positive electrode and/or electrolyte. An alloyed product can have a different density than the negative electrode, positive electrode or electrolyte, or a density that is similar or substantially the same. The location of the alloyed product can be a function of the density of the alloyed product compared to the densities of the negative electrode, electrolyte and positive electrode. The alloyed product can be situated in the negative electrode, positive electrode or electrolyte, or at a location (e.g., interface) between the negative electrode and the electrolyte or between the positive electrode and the electrolyte, or any combination thereof. In an example, an alloyed product is an intermetallic between the positive electrode and the electrolyte (see, for example, FIG. 4). In some cases, some electrolyte can seep in between the intermetallic and the positive electrode. In other examples, the alloyed product can be at other locations within the cell and be formed of a material of different stoichiometries/compositions, depending on the chemistry, temperature, and/or charge state of the cell.

Figure 4:
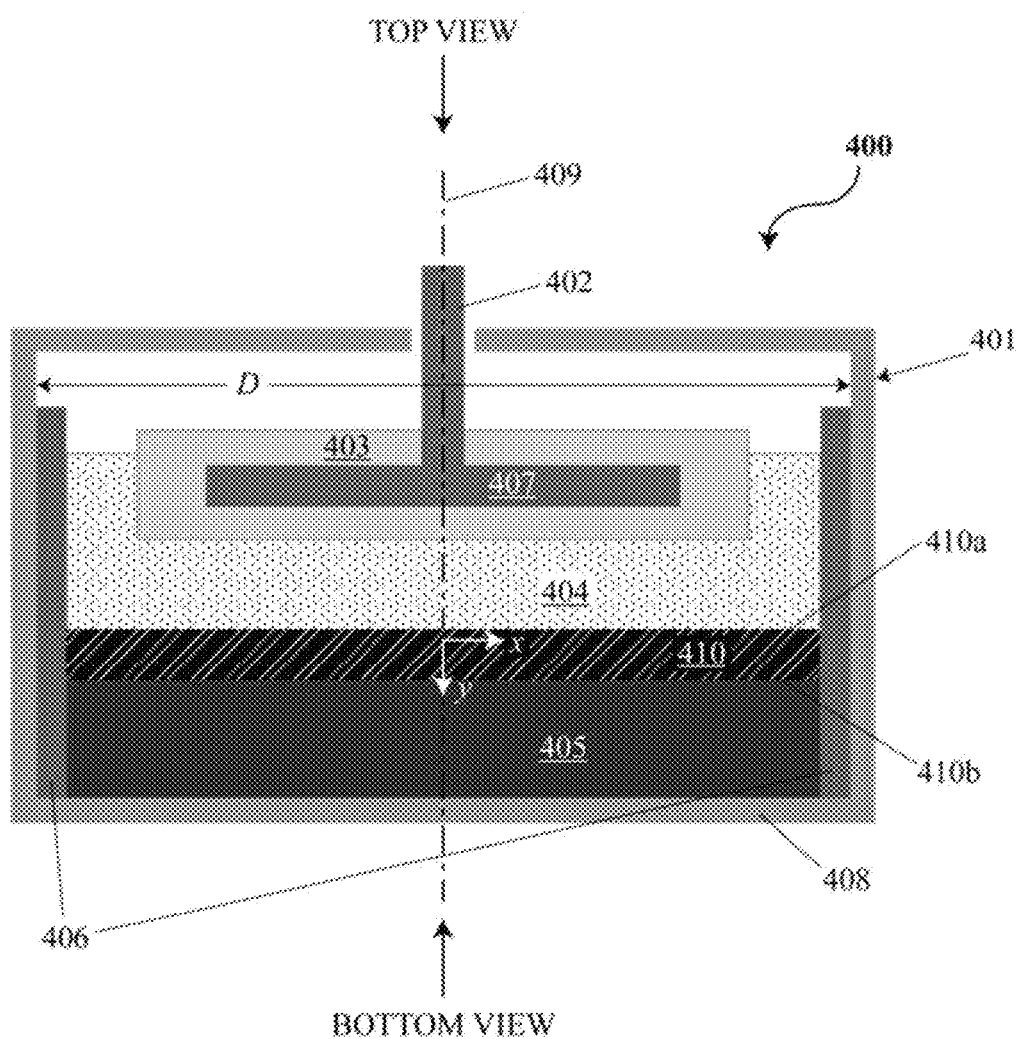
FIG. 4 is a cross-sectional side view of an electrochemical cell or battery with an intermetallic layer.

FIG. 4 is a cross-sectional side view of an electrochemical cell or battery 400 with an intermetallic layer 410. The intermetallic layer 410 can include a mutual reaction compound of a material originating from the negative electrode 403 and positive electrode material 405. For example, a negative liquid metal electrode 403 can comprise an alkali or alkaline earth metal (e.g., Na, Li, K, Mg, or Ca), the positive liquid metal electrode 405 can comprise one or more of transition metal, d-block (e.g., Group 12), Group IIIA, IVA, VA or VIA elements (e.g., lead and/or antimony and/or bismuth), and the intermetallic layer 410 can comprise a mutual reaction compound or product thereof (e.g., alkali plumbide, antimonide or bismuthide, e.g., $Na_3Pb$, $Li_3Sb$, $K_3Sb$, $Mg_3Sb_2$, $Ca_3Sb_2$, or $Ca_3Bi_2$). An upper interface 410a of the intermetallic layer 410 is in contact with the electrolyte 404, and a lower interface 410b of the intermetallic layer 410 is in contact with the positive electrode 405. The mutual reaction compound may be formed during discharging at an interface between a positive liquid metal electrode (liquid metal cathode in this configuration) 405 and a liquid salt electrolyte 404. The mutual reaction compound (or product) can be solid or semi-solid. In an example, the intermetallic layer 410 can form at the interface between the liquid metal cathode 405 and the liquid salt electrolyte 404. In some cases, the intermetallic layer 410 may exhibit liquid properties (e.g., the intermetallic may be semi-solid, or it may be of a higher viscosity or density than one or more adjacent phases/materials).

The cell 400 comprises a first current collector 407 and a second current collector 408. The first current collector 407 is in contact with the negative electrode 403, and the second current collector 408 is in contact with the positive electrode 405. The first current collector 407 is in contact with an electrically conductive feed-through 402. A housing 401 of the cell 400 can include a thermally and/or electrically insulating sheath 406. In an example, the negative liquid metal electrode 403 includes magnesium (Mg), the positive liquid metal electrode 405 includes antimony (Sb), and the intermetallic layer 410 includes Mg and Sb ($Mg_xSb$, where 'x' is a number greater than zero), such as, for example, magnesium antimonide ($Mg_3Sb_2$). Cells with a Mg∥Sb chemistry may contain magnesium ions within the electrolyte as well as other salts (e.g., $MgCl_2$, NaCl, KCl, or a combination thereof). In some cases, in a discharged state, the cell is deficient in Mg in the negative electrode and the positive electrode comprises and alloy of Mg—Sb. In such cases, during charging, Mg is supplied from the positive electrode, passes through the electrolyte as a positive ion, and deposits onto the negative current collector as Mg. In some examples, the cell has an operating temperature of at least about 300° C., 350° C., 400° C., 450° C., 475° C., 500° C., 550° C., 600° C., 650° C., 700° C. or 750° C., and in some cases between about 650° C. and 750° C. In a charged state, all or substantially all the components of the cell can be in a liquid state. Alternative chemistries exist, including Ca-Mg∥Bi comprising a calcium halide constituent in the electrolyte (e.g., $CaF_2$, KF, LiF, $CaCl_2$, KCl, LiCl, $CaBr_2$, KBr, LiBr, or combinations thereof) and operating, for example, above about 500° C., Ca-Mg∥Sb-Pb comprising a calcium halide constituent in the electrolyte (e.g., $CaF_2$, KF, LiF, $CaCl_2$, KCl, LiCl, $CaBr_2$, KBr, LiBr, or combinations thereof) and operating, for example, above about 500° C., Li∥Pb-Sb cells comprising a lithium-ion containing halide electrolyte (e.g., LiF, LiCl, LiBr, or combinations thereof) and operating, for example, between about 350° C. and about 550° C., and Na∥Pb cells comprising a sodium halide as part of the electrolyte (e.g., NaCl, NaBr, NaI, NaF, LiCl, LiF, LiBr, LiI, KCl, KBr, KF, KI, CaCl$_2$, CaF$_2$, CaBr$_2$, CaI$_2$, or combinations thereof) and operating, for example, above about 300° C. In some cases, the product of the discharge reaction may be an intermetallic compound (e.g., Mg$_3$Sb$_2$ for the Mg||Sb cell chemistry, Li$_3$Sb for the Li||Pb-Sb chemistry, Ca$_3$Bi$_2$ for the Ca-Mg||Bi chemistry, or Ca$_3$Sb$_2$ for the Ca-Mg||Pb-Sb chemistry), where the intermetallic layer may develop as a distinct solid phase by, for example, growing and expanding horizontally along a direction x and/or growing or expanding vertically along a direction y at the interface between the positive electrode and the electrolyte. The growth may be axially symmetrical or asymmetrical with respect to an axis of symmetry 409 located at the center of the cell or battery 400. In some cases, the intermetallic layer is observed under Type 1 mode of operation but not Type 2 mode of operation. For example, the intermetallic layer (e.g., the intermetallic layer in FIG. 4) may not form during operation of a Type 2 cell.

Figure 5:
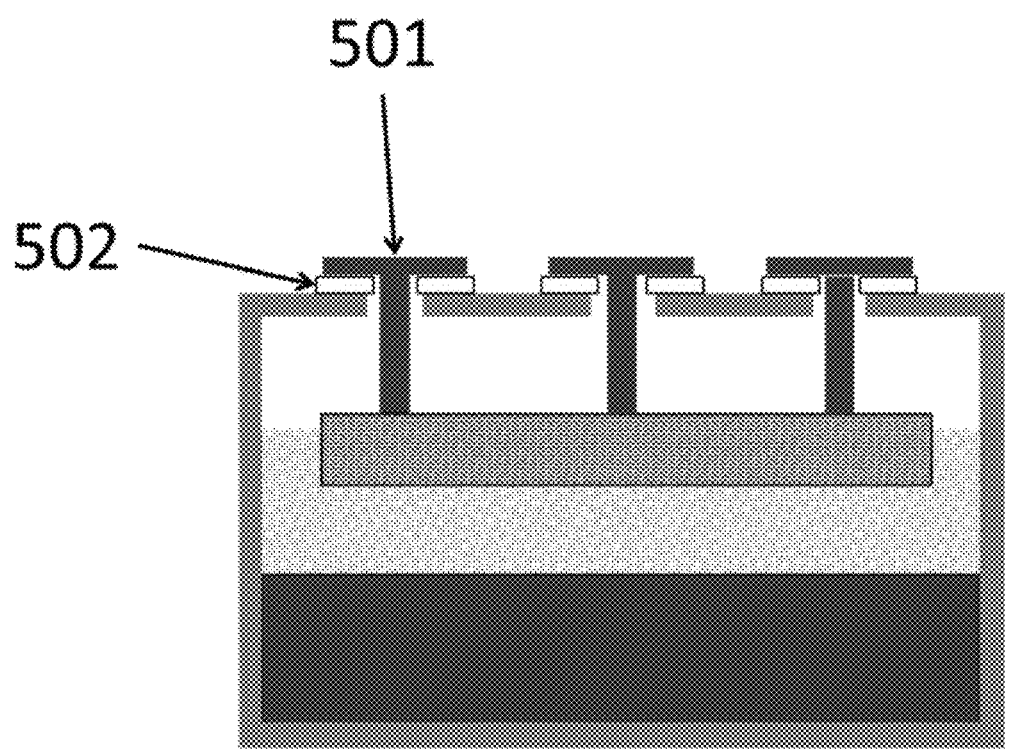
FIG. 5 is a schematic cross-sectional illustration of an electrochemical cell having feed-throughs that are electrically insulated from a housing with dielectric seal components.

Cell lid assemblies can use adhesive seals to achieve a gas tight and electrically insulating seal. As seen in FIG. 5, a conductive feed-through 501 can be electrically isolated from the housing and the housing can be sealed by an adhesive sealing material 502 disposed between the feed-through and the housing. The adhesive sealing material can include any sealant material capable of adhering to the components of the cell lid assembly that are to be sealed.

The seal can retain the reactive material (e.g., vapors of the reactive material) in the device. For example, the seal can retain the reactive metal vapors and/or molten salt vapors in the device. In some cases, the seal surrounds an electrically conductive feed-through (and can electrically isolate the feed-through from the housing of the device), a thermocouple or a voltage sensor.

A person of skill in the art will recognize that the battery housing components may be constructed from materials other than the examples provided above. One or more of the electrically conductive battery housing components, for example, may be constructed from metals other than steel and/or from one or more electrically conductive composites. In another example, one or more of the electrically insulating components may be constructed from dielectrics other than the aforementioned glass, mica and vermiculite. The present invention therefore is not limited to any particular battery housing materials.

Power Conversion System

Energy storage devices or systems (e.g., batteries) of the present disclosure can be electrically coupled to a load (e.g., an external load) and/or to a power source (e.g., an external power source) with the aid of systems comprising power electronics. Energy storage devices or systems (e.g., batteries) of the present disclosure can be electrically coupled to a load (e.g., an electronic device, another energy storage device or a power grid (also "electric power grid", "electrical grid" or "grid" herein)) and/or to an external power source (e.g., a generator, an electrical power grid or another energy storage device) with the aid of systems comprising power electronics. In some cases, such energy storage devices or systems, including circuitry, operate under direct current (DC) mode, and the load or external power source operate under alternating current (AC) mode. Provided herein are power conversion systems (e.g., power conditioning systems) comprising power electronics that can convert, for example, DC power to AC power, or vice versa. This can enable energy storage devices and systems of the present disclosure operating using DC power to charge from and/or discharge to an external load or power source (e.g., power grid) that operates using AC power. Any aspects of the disclosure described in relation to a load may equally apply to an external load at least in some configurations, and vice versa. Any aspects of the disclosure described in relation to a power source may equally apply to an external power source at least in some configurations, and vice versa.

A power conversion system (PCS) herein may be, for example, configured to connect an energy storage system or device, such as, for example, a high temperature battery (e.g., a liquid metal battery), to the grid using a power conditioning system (e.g., an inverter) with given characteristics. Examples of such characteristics may include specific performance characteristics, such as, for example, active/real power (P) and reactive power (Q) control capabilities (also "P & Q" control capabilities herein), response time, current, voltage, phase, frequency, fault protection, information exchange protocols, etc. The high temperature battery may comprise a positive and/or negative electrode that is connected to the grid using the power conditioning system. Any aspects of the disclosure described in relation to batteries (e.g., high temperature batteries) herein may equally apply to other energy storage devices or systems at least in some configurations.

Figure 6:
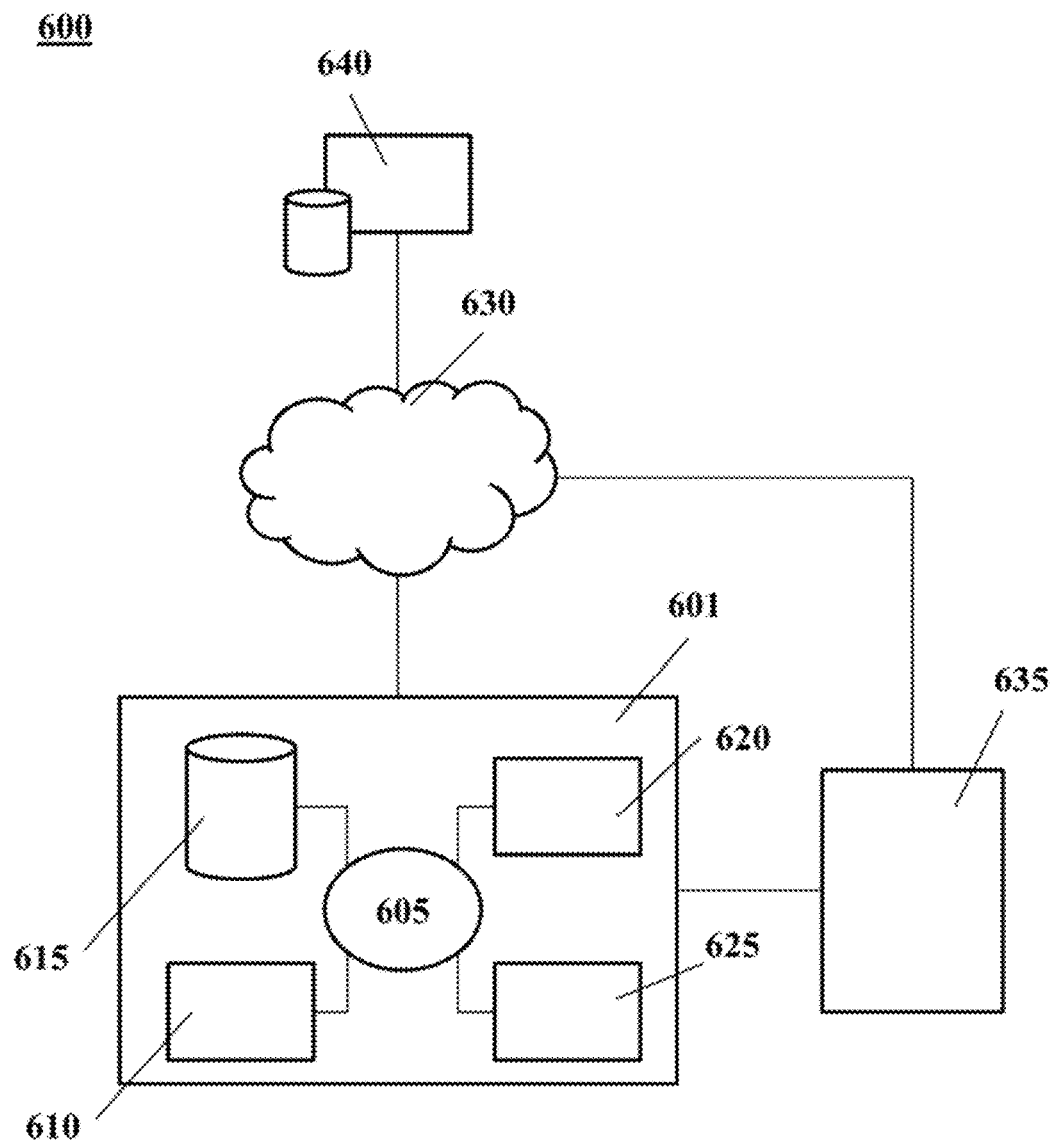
FIG. 6 shows an example of a computer system programmed or otherwise configured to monitor, control and/or regulate one or more process parameters of an energy storage device.

The power conversion system (PCS) may be provided as a building block of, for example, system 600 and/or as part of energy storage system 635 in FIG. 6 (e.g., as a liquid metal battery building block). For example, the PCS may be provided as part of an energy storage system or by a supplier for energy storage systems, and may satisfy one or more given requirements or characteristics (e.g., specifications) such as, for example, described elsewhere herein.

Figure 9:
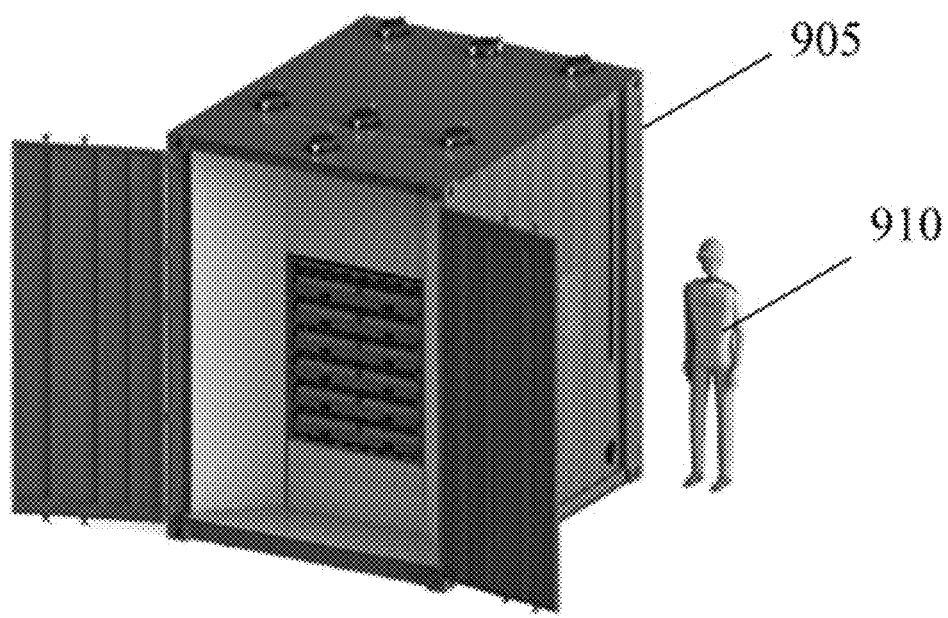
FIG. 9 shows an example of a system comprising an energy storage system.

FIG. 9 shows an example of a system 900 comprising an energy storage system. The system 900 may comprise or be housed in a container or enclosure 905. For example, the energy storage system may comprise or be housed in a suitable container or enclosure. The container may have a given size. The system 900 may have a size relative to a person (e.g., an adult man) 910 as shown in FIG. 9. The system 900 may be at least about 1, 2, 3, 4, 5, 6, 7, 8, 9, 10, 15, 20, 25, 30, 40, 50, 60, 70, 80, 90, 100, 120, 140, 160, 180, 200, 250, 300, 350, 400, 450, 500, 550, 600, 650, 700, 750, 800, 850, 900 or 1,000 times larger than shown in FIG. 9. The system 900 may have a different size, weight, dimensions, layout or other characteristics depending on system requirements or characteristics (e.g., specifications). The size of the container 905 may increase with total number of electrochemical cells in the system 900. The size of the container 905 may increase with the size of the energy storage system. The energy storage system may include an energy storage device.

System specifications (e.g., for the system 900 in FIG. 9) may include specifications for self-heated operation, size and appearance, energy, power, thermal, safety, cell configuration, power and controls electronics and software, or any combination thereof.

The system 900 may be configured for self-heated operation. Specifications for the self-heated operation may include substantially no heating (e.g., no heating) required during continuous cycling (e.g., charging and discharging at a given rate or set of rates). In an example, the system is configured for self-heated operation with no heating required during continuous cycling comprising charging and discharging at a nominal rate of at least about C/5 (e.g., at C/5 nominal rate).

The system 900 may have a given size and/or appearance. Specifications for the size and/or appearance may include, for example, ISO 6346 standard container and/or custom length. The system 900 may comprise or be in communication with power electronics (e.g., a PCS or a portion thereof), a battery management system (BMS), a human machine interface (HMI), or any combination thereof. The power electronics, BMS and HMI (or portions or a subset thereof) may or may not be integrated within the same container. In an example, the system comprises integrated power electronics, BMS and HMI (e.g., integrated with the battery). For example, a 1-10 kWh system may have the energy storage system and a small PCS incorporated into a footprint as shown in FIG. 9. In another example, at least a portion of the power electronics, BMS and HMI may be provided separately from the energy storage system. When provided separately, the power electronics, BMS and/or HMI may be provided adjacent to the energy storage as part of a larger container (e.g., see FIG. 10) or as one or more separate, free-standing units. When provided separately, the power electronics, BMS and/or HMI may be housed in separate container(s).

The system 900 may have given energy specifications. The system may have a given capacity (e.g., energy capacity available for discharge or energy storage capacity). The amount of discharged energy may be as described elsewhere herein. The system may be capable of discharging the energy (e.g., as DC energy) at a given discharge rate. The discharge rate may be as described elsewhere herein. In an example, the system has a nominal C/5 capacity with 70 Ah cells (discharge energy DC) of about 26 kWh. The system (e.g., the energy storage system such as, for example, a core) may have a given DC-DC round-trip efficiency (e.g., the system may be capable of discharging such DC energies at a given DC-DC round-trip efficiency). The round-trip DC-DC efficiency (also "direct current (DC) efficiency" herein) may be provided for a given charge/discharge rate. For example, the system may have a round-trip DC-DC efficiency (also "DC-DC round-trip efficiency" herein) of at least about 30%, 40%, 45%, 50%, 55%, 60%, 65%, 70%, 75%, 80%, 85%, 90%, 95% or 99% at a given charge/discharge rate. The charge/discharge rate may include a single charge and discharge rate. The charge/discharge rate may include a charge rate that differs from the discharge rate. The charge/discharge rate(s) may be as described elsewhere herein. In an example, the system (e.g., the energy storage system) has a DC-DC round-trip efficiency at C/5 rate of about 60%.

The system 900 may have given power specifications. Such power specifications may be as described elsewhere herein (e.g., in relation to system 1000 of FIG. 10).

The system 900 may have given thermal specifications. One or more electrochemical cells and/or batteries of the system may be heated to and/or maintained at a given temperature. The temperature may be as described elsewhere herein (e.g., in relation to operating temperature of battery cells). The system may be heated up (e.g., from about 20° C., or from about 25° C., 20° C., 15° C., 10° C., 5° C., 0° C., −5° C., −10° C., −15° C., −20° C., −25° C. or −30° C.) to the operating temperature in less than or equal to about 5 hours (h), 10 h, 15 h, 20 h, 25 h, 30 h, 35 h, 40 h, 45 h, 50 h, 55 h, 60 h, 65 h, 70 h, 75 h, 80 h, 85 h, 90 h or 100 h (e.g., between about 10 h and 40 h, 20 h and 40 h, or 30 h and 100 h). The system may be cooled down from the operating temperature to a freezing point of at least one of the liquid components (e.g., salt freeze temperature) in less than or equal to about 20 h, 15 h, 10 h, 9 h, 8 h, 7 h, 6 h, 5 h, 4 h, 3 h, 2 h, 1 h, 0.5 h, 0.25 h, 0.2 h or 0.1 h (e.g., between about 1 h and 10 h, 2 h and 6 h, or 4 h and 20 h). The system may be cooled down from the operating temperature to a temperature of about 50° C. or to a temperature at which at least one electrode of the cell is in a solid state in less than or equal to about 200 h, 190 h, 180 h, 170 h, 160 h, 150 h, 140 h, 130 h, 120 h, 110 h, 100 h, 90 h, 95 h, 90 h, 85 h, 80 h, 75 h, 70 h, 65 h, 60 h, 55 h, 50 h, 45 h, 40 h, 35 h, 30 h, 25 h, 20 h, 15 h, 10 h or 5 h (e.g., between about 10 h and 100 h, 50 h and 200 h, or 50 h and 100 h). The system may have active cooling ability. Such cooling ability may provide at least about 0.1 kW, 0.2 kW, 0.5 kW, 1 kW, 2 kW, 3 kW, 4 kW, 5 kW, 6 kW, 7 kW, 8 kW, 9 kW, 10 kW, 15 kW, 20 kW, 25 kW, 30 kW, 35 kW, 40 kW, 45 kW, 50 kW, 55 kW, 60 kW, 70 kW, 75 kW, 80 kW, 85 kW, 90 kW, 100 kW, 120 kW, 140 kW, 160 kW, 180 kW or 200 kW (e.g., between about 2 kW and 6 kW, 20 kW and 60 kW, 40 kW and 120 kW, 20 kW and 200 kW, or 100 kW and 200 kW). The cooling ability may decrease the cool-down times herein by at least about 1%, 2%, 4%, 6%, 8%, 10%, 15%, 20%, 25%, 30%, 35%, 40%, 45%, 50% or more when compared to a cool-down time in the absence of active cooling. The heat-up and/or cool-down times may depend on the operating temperature, size and/or configuration of the energy storage system (e.g., number of cells, interconnection of the cells, etc.), thermal management configuration of the system (e.g., thermal management of the energy storage system, including, for example, the active cooling capability), and/or other factors. In an example, the system (e.g., the cells of the energy storage system) may be heated to and/or maintained at a nominal operating temperature of about 475° C. Such a system may have a heat-up time (e.g., maximum heat-up time) from about 20° C. to the operating temperature of less than or equal to about 32 hours, a cool-down time (e.g., maximum cool-down time) from the operating temperature (e.g., 475° C.) to salt freeze (e.g., at about 445° C.) of less than or equal to about 4 hours, a cool-down time (e.g., maximum cool-down time) from the operating temperature (e.g., 475° C.) to about 50° C. of less than or equal to about 52 hours, and/or an active cooling capability during operation of greater than or equal to about 4 kW. The system 900 may include modular heating and/or cooling.

The system 900 may have given safety specifications. A temperature of touch-accessible surfaces may be less than or equal to about 100° C., 90° C., 80° C., 70° C., 60° C., 50° C., 40° C., 30° C., 25° C. or 20° C. An isolation resistance at temperature (e.g., at operating temperature) between at least a portion (e.g., all) voltage domains may be at greater than or equal to about 50 kilo-Ohms (kΩ), 100 kΩ, 150 kΩ, 200 kΩ, 250 kΩ or 300 kΩ. In some cases, different isolation resistances may be specified between subsets of voltage domains. A BMS (e.g., an integrated BMS) may provide fault monitoring. The fault monitoring may be as described elsewhere herein. In an example, safety specifications include a maximum temperature for touch-accessible surfaces of about 60°, a minimum isolation resistance at temperature between all voltage domains of about 100 kΩ and/or fault monitoring through integrated BMS.

The system 900 may have given cell configuration specifications. For example, electrical configuration, lowest replaceable unit (e.g., in terms of number of cells), total number of cells and/or cell footprint may be specified. The lowest (or smallest) replaceable unit in the system may comprise less than or equal to about 1,000, 500, 200, 150, 100, 50, 40, 30, 20, 15, 10 or 5 cells. The total number of cells (e.g., of the energy storage system) may be as described elsewhere herein. The cell footprint may be as described elsewhere herein (e.g., in relation to cell dimensions). In an example, cell configuration may include a lowest replaceable unit of 15 cells, 540 cells total and/or a cell footprint of about 4×4 inches. In another example, cell footprint may be about 8×8 inches.

The system 900 may have given power and controls electronics and software specifications. For example, the system may be capable of operating (e.g., continuously) at a power level greater than or equal to a C/5, C/4, C/3, C/2, C, 2C, 3C or 4C nominal power level. The system may have a discharge voltage (e.g., DC voltage) capability of less than or equal to about 1,500V, 1,400 V, 1,300 V, 1,200 V, 1,100 V, 1,000 V, 900 V, 800 V, 700 V, 600 V, 500 V, 400 V, 300 V, 200 V, 100 V, 90 V, 80 V, 70 V, 60 V, 50 V, 40 V, 30 V, 20 V, 15 V, 10 V, 5 V, 4 V, 3 V, 2 V or 1 V. The system may have a discharge voltage (e.g., DC voltage) capability of at least about 1 V, 2 V, 3 V, 4 V, 5 V, 10 V, 15 V, 20 V, 30 V, 40 V, 50 V, 60 V, 70 V, 80 V, 90 V, 100 V, 200 V, 300 V, 400 V, 500 V, 600 V, 700 V, 800 V, 900 V, 1,000 V, 1,100 V, 1,200 V, 1,300 V, 1,400 V or 1,500 V. The system may have a charge voltage (e.g., DC voltage) capability of less than or equal to about 200V, 180V, 160V, 140V, 120V, 110V, 100 V, 90 V, 80 V, 70 V, 60 V, 50 V, 40 V, 30 V, 20 V, 10 V, 5 V, 4 V, 3 V, 2 V or 1 V. The system may have a charge voltage (e.g., DC voltage) capability of greater than about 0.5 V, 1 V, 2 V, 3 V, 4 V, 5 V, 10 V, 20 V, 30 V, 40 V, 50 V, 60 V, 70 V, 80 V, 90 V, 100 V, 110 V or 120 V (e.g., between about 50 V and 110 V, or 50 V and 120 V). The system may have a busbar loss (e.g., at maximum rated current) of less than or equal to about 20 V, 15 V, 10 V, 8 V, 6 V, 5 V, 4 V, 3 V, 2 V, 1 V or less. The system may have a busbar loss of between about 1 V and 5 V, 3 V and 10 V, or 3 V and 20 V. In an example, the system has one or more of the following specifications: ability to handle C/2 nominal power levels continuously, discharge voltage capability less than or equal to about 14.4 V, charge voltage capability of about 54 V and maximum busbar loss at maximum rated current of about 3.5 V.

The system 900 may have any combination of the aforementioned (and/or other) specifications. In an example, a system 900 is configured for self-heated operation with no heating required during continuous cycling comprising charging and discharging at C/5 nominal rate. In this example, the system 900 comprises an ISO 6346 standard container, custom length, and/or integrated power electronics, BMS and HMI. Its energy specifications include nominal C/5 capacity with 70 Ah cells (discharge energy DC) of 26 kWh, and/or a DC-DC round-trip efficiency (e.g., core DC-DC round-trip efficiency) at C/5 rate of about 60%. Its power specifications include nominal DC power draw from the energy storage device/system (e.g., from the core) at C/5 discharge of 5.5 kW, and/or nominal DC power delivered to the energy storage device/system (e.g., to the core) for C/5 charge of 7.1 kW. Its thermal specifications include a nominal (e.g., operating) temperature of 475° C., a maximum heat-up time from 20° C. to operating temperature of about 32 hours, a maximum cool-down time from about 475° C. to salt freeze at about 445° C. of about 4 h, a maximum cool-down time from about 475° C. to about 50° C. of about 52 h, and/or active cooling capability during operation of about 4 kW. Its safety specifications include maximum temperature for touch accessible surfaces of about 60° C., minimum isolation resistance at temperature between all voltage domains of about 100 kΩ, and/or fault monitoring through integrated BMS. Its cell configuration specifications may include a lowest replaceable unit of 15 cells, a total number of cells of 540, and/or a cell footprint of about 4×4 inches. Its power and controls electronics and software specifications include capability to handle C/2 nominal power levels continuously, discharge voltage capability of less than or equal to about 14.4 V, charge voltage capability of about 54 V, and/or maximum busbar loss at maximum rated current of about 3.5 V. A core as described in relation to FIG. 9 may refer to a group of cells comprising a plurality of modules or packs, or to any energy storage device/system comprising, for example, any group of cells (e.g., any group of cells described herein).

The PCS (also "power unit" herein) may comprise (or may be) a bi-directional power conversion system. A power conversion system may be referred to herein as a converter. The PCS can comprise an inverter (e.g., a bi-directional inverter). In some instances, the PCS may be referred to herein as an "inverter," and vice versa. The PCS may comprise one or more inverter modules (e.g., each inverter module comprising at least one inverter). An individual inverter module may control at least a portion of the energy storage system or device. Inverter modules (e.g., two or more inverter modules) may be interconnected (e.g., to provide higher power handling capability). One or more (e.g., specific) inverter modules may be (e.g., selectively) de-energized while balance of PCS system remains operational. A bi-directional inverter may be capable of operating as a DC to AC inverter and/or as an AC to DC rectifier.

The PCS may convert direct current (DC) power of (e.g., from) a DC source (e.g., energy storage device) to alternating current (AC) power of (e.g., to or from) an external load or power source (e.g., power grid). This can be used to feed the power (e.g., from the energy storage device) to a three-phase grid, for example. For example, a bi-directional inverter may convert DC power from the energy storage device to AC power usable by an external load or power source. The PCS may also convert the AC power (e.g., from a three-phase grid) into DC power in order to charge the energy storage device (e.g., battery). For example, the bi-directional inverter may convert AC power from the external load or power source to DC power usable by the energy storage device. The PCS may further convert DC power of (e.g., from) the energy storage device to higher or lower DC power of (e.g., consumed or supplied by) the external load or power source. For example, the bi-directional inverter may convert DC power from the external load or power source to DC power usable by the energy storage device. The DC power from the external load or power source may be greater than or less than the DC power usable by the energy storage device. In another example, the bi-directional inverter may convert DC power from the energy storage device to DC power usable by the external load or power source. The DC power usable by the external load or power source may be greater than or less than the DC power from the energy storage device (e.g., the inverter may convert DC power from the energy storage device to higher DC power to be supplied to the grid).

The PCS may be configured for an energy storage device for use in grid-scale applications, such as a battery. The battery can be a high temperature battery. The battery can be a liquid metal battery (LMB), as described elsewhere herein. The energy storage device may be used, for example, as a stationary storage system having given lifespan, safety, flexibility and/or other characteristics. The energy storage device (e.g., stationary storage system) may have a given lifespan. The lifespan may be at least about 1 year, 2 years, 3 years, 4 years, 5 years, 6 years, 7 years, 8 years, 9 years, 10 years, 12 years, 14 years, 16 years, 18 years, 20 years, 25 years, 30 years or more. Such lifespan may be achieved as a result of, for example, fade rate, maintenance and/or other characteristics of the energy storage device. The energy storage device (e.g., stationary storage system) may have a given fade rate. For example, the fade rate (e.g., capacity fade rate) may be less than or equal to about 0.002%/cycle, 0.0015%/cycle, 0.001%/cycle, 0.0005%/cycle, 0.0004%/cycle, 0.0003%/cycle, 0.0002%/cycle, 0.0001%/cycle or 0.00005%/cycle (e.g., at about 100% depth of discharge). The energy storage device (e.g., stationary storage system) may not require substantial maintenance (e.g., minimal maintenance may be required). The energy storage device (e.g., stationary storage system) may have given safety features or characteristics. For example, active ingredients may be held in a container (e.g., a sealed stainless steel cell can) which may provide a temperature tolerance range between battery operating temperature and melting temperature (or other temperature limit) of the container (e.g., steel) of at least about 600° C., 700° C., 800° C., 900° C., 1000° C., 1100° C. or 1200° C. The energy storage device (e.g., stationary storage system) may be and/or comprise active ingredients that are substantially solid and/or substantially inactive below a given temperature (e.g., at room temperature). The energy storage device (e.g., stationary storage system) may be operationally flexible. For example, the energy storage device may have a DC to DC round-trip efficiency of at least about 30%, 40%, 45%, 50%, 55%, 60%, 65%, 70%, 75%, 80%, 85%, 90%, 95% or 99%. The DC to DC round-trip efficiencies may as described elsewhere herein (e.g., in relation to the system 900 and/or at a given charge/discharge rate). The energy storage device (e.g., stationary storage system) may have a given response rate (e.g., a near instantaneous response rate). The response rate may depend on power electronics (e.g., the power electronics may be rate-limiting). For example, a system (e.g., system 1000 in FIG. 10) comprising the energy storage device and the power electronics (e.g., PCS) may have a response rate limited by the power electronics (e.g., the battery may respond fast and the system may therefore respond as fast as the inverter allows). The response rate (e.g., of the combined system) may be, for example, less than or equal to about every 1 second (s), 500 milliseconds (ms), 100 ms, 60 ms, 50 ms, 10 ms, 1 ms, 0.05 ms, 0.01 ms, and the like. The battery may be capable of responding at least about 2, 3, 4, 5, 6, 7, 8, 9 or 10 times faster than the inverter (e.g., a response time of the battery or energy storage device may be at least about 2, 3, 4, 5, 6, 7, 8, 9 or 10 times shorter than a response time of the PCS). The battery may be capable of responding between about 2 and 10, 2 and 5, or 5 and 10 times faster than the inverter. The energy storage device (e.g., stationary storage system) may support a broad range of grid storage applications (e.g., power and/or energy). In an example, the energy storage device may be used, for example, as a stationary storage system that simultaneously (i) has long lifespan (e.g., demonstrated fade rate can be less than about 0.002%/cycle (e.g., about 0.0002%/cycle) at 100% depth of discharge which may allow the batteries to last for multiple years (e.g., more than a decade) with negligible fade; minimal maintenance may be required; etc.), (ii) is safe (e.g., active ingredients may be held in a ⅛ inch thick sealed stainless steel cell can which may provide at least a 1000° C. temperature tolerance range between battery operating temperatures (e.g., about 500° C.) and melting temperature of steel (e.g., about 1500° C.); solid and completely inactive at room temperature; etc.), and (iii) is operationally flexible (e.g., with 80% DC to DC round-trip efficiency and near instantaneous response rates (depending on power electronics); can support a broad range of grid storage applications, including both power and energy).

A PCS may have different functionality (e.g., scope). The PCS can be configured to include P (active/real power) and Q (reactive power) control. The P and Q control can include, for example, accepting P and Q commands (e.g., a signal on a scale from 1 to 0) from a remote control unit such as, for example, from a grid operator (e.g., an independent system operator (ISO)). The system can accept a P command and/or a Q command at a given frequency (e.g., at least about 100 Hz, 200 Hz, 300 Hz, 400 Hz, 500 Hz, 600 Hz, 700 Hz, 800 Hz, 900 Hz, 1 kilo-Hertz (kHz), 2 kHz, 5 kHz, 10 kHz, 20 kHz, 50 kHz or 100 kHz). Pulse width modulation (PWM) may be implemented, for example, to control switching components within the inverter. The PCS may include a single-phase or multi-phase (e.g., single-phase or multi-phase sinusoidal) inverter. The PCS may include a single-phase or multi-phase (e.g., three-phase sinusoidal) inverter that may operate in a current-controlled mode and/or a voltage-controlled mode (e.g., the control modes may be selectable). For example, the PCS may include a single-phase or multi-phase pulse width modulated inverter that operates in current-controlled mode or voltage-controlled mode. The PCS can be configured to receive and/or provide three-phase power. The PCS may include a three-phase sinusoidal inverter that may operate in a current-controlled mode and/or a voltage-controlled mode (e.g., the control modes may be selectable). The three-phase sinusoidal inverter may be configured for P and Q control and/or PWM. The three-phase output can be sinusoidal with low total harmonic distortion (THD) (e.g., about ±3% or better). The PCS can include one or more insulated-gate bipolar transistors (IGBTs) (e.g., as power switching devices). An IGBT module can comprise one or more IGBTs. The PCS can include one or more IGBT modules (e.g., separate inverter modules may each comprise multiple IGBTs). The PCS may comprise at least 1, 2, 5, 10, 15, 20, 25, 50, 75, 100, 125, 150, 175, 200, 250, 300 or more IGBTs. The IGBTs may be arranged as at least 1, 2, 5, 10, 15, 20, 25, 50, 75, 100 or more IGBT modules. In some cases, "IGBT" may refer to an individual IGBT or to a module of IGBTs. The IGBT modules may be electrically connected in parallel. The PCS may comprise one or more (e.g., multiple) inverter modules. The one or more inverter modules (e.g., each such inverter module) may comprise or be in communication with one or more (e.g., multiple) IGBT modules.

The PCS can include DC capacitor(s) and/or inductor(s) as part of the IGBT modules on the DC side (e.g., to reduce ripple current in, for example, the DC source). In an example, the PCS can use one or more IGBTs as power switching devices, and utilize DC capacitor(s) and inductor(s) mounted as part of the IGBT modules on the DC side to reduce the ripple current. The PCS can use PWM technique to control the converter (e.g., the bi-directional inverter) output based on the real power (P) and reactive power (Q) command (e.g., from grid operator). PWM may be implemented using, for example, capacitors and inductors. In some cases, PWM may be used in concert with or be replaced by an alternative smoothing or signal processing technique (e.g., space vector pulse width modulation (SVPWM), $3^{rd}$ harmonic injection or other techniques). The inverter can include an insulated-gate bipolar transistor that includes a DC capacitor and/or a DC inductor. The inverter can further include one or more other electronic filters (e.g., the inverter can include an IGBT that includes a DC capacitor and a DC inductor along with other electronic filters). The inverter can include one or more solid state switching and/or filtering devices (e.g., to provide power conversion). The four quadrant (P and Q enabled) bi-directional grid tied PCS (e.g., inverter) can be used, for example, to effectively and efficiently charge and discharge high temperature batteries (e.g., liquid metal batteries).

The PCS can have extensive protection and fault diagnostics. The PCS can include one or more fusing or protection devices (e.g., control or disconnect switch, or control or disconnect switch coupled to pre-charging circuitry) to disrupt current flow under fault conditions (e.g., if IGBT blows out, if an inverter module goes, or if current spikes). In an example, a control or disconnect switch can be used. In some instances, pre-charging circuitry (or pre-charging circuit) may be used to avoid a spark upon closing the switch. In some instances, a pre-charging circuit may draw power from the grid for activation. In some instances, the pre-charging circuit may draw power from the energy storage system for activation.

The PCS may comply with one or more industry codes and/or standards. The PCS may comply with Institute of Electrical and Electronic Engineers (IEEE) codes and/or standards, such as, for example, IEEE 519, IEEE 1547, 1547.2 and/or 1547.3. The PCS may comply with Underwriters Laboratories (UL) codes and/or standards, such as, for example, UL 1741.

The PCS may be configured to provide AC voltage and AC frequency protection and ride through. A PCS system (also "PCS" herein) configured to provide AC voltage and AC frequency protection may comprise circuitry and/or software that enables it to be exposed to voltage and frequency signals that are outside the normal operating limits without impacting the functionality of the PCS (e.g., damaging the PCS). AC voltage and AC frequency ride through may include circuitry and/or software that enables the PCS to continue to operate for a given period (e.g., some period) after the AC voltage and/or AC frequency goes outside a given (e.g., normal) operating limit. The PCS may continue to operate for some relatively short time period before the system shuts off. Ride through conditions provided by the PCS system may vary (e.g., no specific AC voltage and AC frequency ride through specifications may be provided).

When the PCS is in grid tied mode, the PCS can be able to charge and discharge batteries remotely with P (real power) commands and concurrently inject or absorb reactive power based on Q (reactive power) commands ("PQ mode operation"). During grid tied operation, a PQ operation (also "PQ mode operation" herein) can be performed when the grid is ON (i.e., grid voltage is present). During grid tied operation the PCS can maintain synchronization with grid voltage and frequency. During standalone operation, the PCS can maintain 480 Volt AC (VAC) or 208 VAC and 50 or 60 Hz when the grid is OFF or grid is disconnected.

The PCS may operate in grid tied mode (e.g., accept P and Q commands at, for example, 100 Hz). The PCS may operate in standalone mode (e.g., maintain target voltage and frequency values). The PCS may be configured for local human machine interface (HMI) operation. The PCS may be configured for supervisory control and data acquisition (SCADA) remote operation. The PCS may be configured to sense and/or monitor temperature (e.g., of the PCS, of one or more portions or peripherals of the PCS, or of one or more components controlled by the PCS) using, for example, resistance temperature detectors (RTDs) or thermocouples (TCs). The PCS may be configured to sense and monitor of one or more components (e.g., all critical components), including, for example, coolant/air, IGBTs, chokes, flow meters, temperature switches, or any combination thereof. The PCS may provide accurate measurement of efficiency (e.g., about ±1.0% accuracy or better). The HMI display may provide a given (e.g., specified) level of accuracy (e.g., about ±3% accuracy or better), including, for example, grid voltage, total system AC current, total system apparent power (e.g., in kilovolt-amperes (kVA)), total system apparent power reactive (e.g., in kilovolt-amperes reactive (kVAR)), power factor (PF), total system power (e.g., in kW), inverter current, DC bus voltage, battery DC voltage and DC current, stop/run status, fault/no fault status, or any combination thereof.

The PCS may provide fault protection. The fault protection may include over-temperature (e.g., temperature greater than a given value or specification) detection for various components (e.g., IGBTs, AC line filters including, for example, current and/or voltage conditioning filters, etc.). The fault protection may include AC and/or DC side short circuit protection. The fault protection may include AC/DC ground fault detection and protection. The fault protection may include over-voltage (e.g., voltage greater than a given value or specification) protection, under-voltage (e.g., voltage less than a given value or specification) protection and/or over-current protection (e.g., current greater than a given value or specification). The fault protection may include over-frequency/under-frequency protection. Fault protection may include electrical isolation. Such fault protection may be implemented using, for example, fuse or disconnect switch (e.g., for AC and/or DC side short circuit protection), ground fault detectors (e.g., for AC/DC ground fault detection and protection), voltage sensor and disconnect switch (e.g., for over-voltage and/or under-voltage protection), current sensor coupled with circuit breaker or fuse (e.g., for over-current protection), detector and disconnect switch (e.g., for over-frequency/under-frequency protection if operating at a given frequency), disconnect (e.g., for electrical isolation such as, for example, in the event of earthquake), or any combination of such components or portions thereof.

The PCS may be configured to exchange information (e.g., internally and externally from the PCS). Information exchange may include information exchange by controller area network (CAN) bus/protocol, Modbus transmission control protocol/internet protocol (Modbus TCP/IP), serial communication and/or between a control board (e.g., LMB control board, control board of system 600 in FIG. 6, etc.) and the PCS (e.g., from PCS to control board). The PCS may be programmed to communicate or interact (e.g., internally with the bi-directional inverter). Systems of the disclosure (e.g., SCADA controller, a battery management system (BMS) and/or any portion of the system 600) may be programmed to communicate or interact with the PCS. Such communications or interactions may include information exchange and/or knowledge of one or more of: a full command list (e.g., list of available commands for the inverter), electrical wiring diagram (e.g., for the inverter), a state diagram (e.g., for the inverter), and full data points list with register/address. Information relating to the inverter may be provided by inverter manufacturer. In some cases, such information may be configured (e.g., set), calculated, derived or customized. Information exchange may include ability to read data points from the PCS at a rate greater than or equal to about 100 Hz, 200 Hz, 300 Hz, 400 Hz, 500 Hz, 600 Hz, 700 Hz, 800 Hz, 900 Hz, 1 kilo-Hertz (kHz), 2 kHz, 5 kHz, 10 kHz, 20 kHz, 50 kHz or 100 kHz (e.g., greater than 100 Hz). PCS communications may be implemented over a wired or wireless link.

The PCS may provide battery pack monitoring and/or protection. The battery pack monitoring and/or protection may include DC voltage monitoring and/or protection (e.g., monitoring may involve real time analog reading). The battery pack monitoring and/or protection may include DC current monitoring and/or protection (e.g., monitoring may involve real time analog and/or digital reading). The battery pack monitoring and/or protection may include limiting the real power (P) command based on direct current voltage (DCV) signals/monitoring. Any aspects of the disclosure described in relation to a battery pack may equally apply to any group of cells (e.g., modules, series strings, packs, cores, CEs, systems, or any other group comprising one or more electrochemical cells) at least in some configurations.

The PCS may provide internal user (e.g., customer) panel access to real time signals, such as, for example, DC voltage and DC current (e.g., direct analog output from the system via meter-grade potential transformers (PTs) and/or current transformers (CTs)) and/or AC voltages and currents (e.g., direct analog out via meter-grade PTs and/or CTs). The measurements (e.g., customer measurements) may require a dedicated set of meter-grade transducers.

The PCS may have given response characteristics. The response may include a step response from $-P_{max}$ to $P_{max}$ in less than or equal to about 1 s, 500 milliseconds (ms), 100 ms, 60 ms, 50 ms, 10 ms, 1 ms, 0.05 ms or 0.01 ms (e.g., in less than about 50 ms). The response may include step a response from $-Q_{max}$ to $Q_{max}$ in less than or equal to about 1 s, 500 milliseconds (ms), 100 ms, 60 ms, 50 ms, 10 ms, 1 ms, 0.05 ms or 0.01 ms (e.g., in less than about 50 milliseconds ms). For maximum apparent/complex power (S), the response may include limit Q command or P command (selectable P or Q priority).

Characteristics (e.g., general requirements) of the PCS system may include, for example, rated input, rated output, converter type, mechanical characteristics, electrical characteristics, and operating environment and cooling.

The rated input/output power characteristics may include, for example, power, grid frequency, voltage (e.g., AC voltage), current (e.g., AC current), or any combination thereof. The input and/or output power may be, for example, between about 1 kW and 1 MW, 1 kW and 50 kW, 1 kW and 100 kW, 50 kW and 500 kW, 100 kW and 500 kW, or 100 kW and 1 MW. The input and/or output power may be at least about 1 kW, 5 kW, 10 kW, 15 kW, 20 kW, 30 kW, 35 kW, 40 kW, 50 kW, 60 kW, 70 kW, 80 kW, 90 kW, 100 kW, 200 kW, 300 kW, 400 kW, 500 kW, 600 kW, 700 kW, 800 kW, 900 kW or 1 MW. The power input and/or output may be less than or equal to about 1 MW, 900 kW, 800 kW, 700 kW, 600 kW, 500 kW, 400 kW, 300 kW, 200 kW, 100 kW, 90 kW, 80 kW, 70 kW, 60 kW, 50 kW, 40 kW, 30 kW, 25 kW, 20 kW, 15 kW, 10 kW, 5 kW or 1 kW. The input and/or output grid frequency may be between about 5 Hz and 60 Hz, 5 Hz and 20 Hz, 20 Hz and 40 Hz, 40 Hz and 60 Hz, or 10 Hz and 50 Hz. The input and/or output grid frequency may be at least about 5 Hz, 10 Hz, 15 Hz, 20 Hz, 25 Hz, 30 Hz, 35 Hz, 40 Hz, 45 Hz, 50 Hz, 55 Hz or 60 Hz. The input and/or output grid frequency may be less than or equal to about 60 Hz, 55 Hz, 50 Hz, 45 Hz, 40 Hz, 35 Hz, 30 Hz, 25 Hz, 20 Hz, 15 Hz, 10 Hz or 5 Hz. In some cases, such rated grid frequencies values may be allowed to vary by up to about ±5 Hz. The input and/or output voltage (e.g., AC voltage) may be low (e.g., between about 0 VAC and 1,000 VAC), medium (e.g., between about 1,000 VAC and 50 kilo-Volt AC (kVAC)) or high (e.g., between about 50 kVAC and 200 kVAC) AC transmission/distribution voltages. The input and/or output voltage (e.g., AC voltage) may be between about 1 V and 2 kilo-Volt (kV), 1 V and 500 V, 1 V and 480 V, 1 V and 208 V, 480 V and 1 kV, 500 V and 2 kV, 1 kV and 2 kV, 1 kV and 115 kV, 115 kV and 165 kV, 100 kV and 500 kV, 500 kV and 1,200 kV, or 5 kV and 1,500 kV. The input and/or output voltage (e.g., AC voltage) may be at least about 1 V, 2 V, 5 V, 10 V, 25 V, 50 V, 75 V, 100 V, 150 V, 200 V, 250 V, 300 V, 400 V, 500 V, 600 V, 700 V, 800 V, 900 V, 1 kV, 1.5 kV, 2 kV, 5 kV, 10 kV, 25 kV, 50 kV, 75 kV, 100 kV, 115 kV, 165 kV, 200 kV, 300 kV, 400 kV, 500 kV, 600 kV, 700 kV, 800 kV, 900 kV, 1,000 kV, 1,100 kV, 1,200 kV, 1,300 kV, 1,400 kV or 1,500 kV. The input and/or output voltage (e.g., AC voltage) may be less than about 1,500 kV, 1,400 kV, 1,300 kV, 1,200 kV, 1,100 kV, 1,000 kV, 900 kV, 800 kV, 700 kV, 600 kV, 500 kV, 400 kV, 300 kV, 200 kV, 165 kV, 115 kV, 100 kV, 75 kV, 50 kV, 25 kV, 10 kV, 5 kV, 2 kV, 1.5 kV, 1 kV, 900 V, 800 V, 700 V, 600 V, 500 V, 400 V, 300 V, 200 V, 100 V, 75 V, 50 V, 25 V, 10 V, 5 V, 2 V or 1 V. Such AC voltages may be three-phase voltages. In some cases, such rated voltage values may be allowed to vary by up to about ±10%. The input and/or output current (e.g., nominal AC current) may be between about 1 A and 5 kilo-Ampere (kA), 1 A and 100 A, 100 A and 500 A, 100 A and 1 kA, 500 A and 2 kA, 1 kA and 2 kA, 2 kA and 5 kA, or 1 kA and 5 kA. The input and/or output current (e.g., nominal AC current) may be at least about 1 A, 5 A, 10 A, 25 A, 50 A, 100 A, 250 A, 500 A, 750 A, 1 kA, 1.5 kA, 2 kA, 2.5 kA, 3 kA, 3.5 kA, 4 kA, 4.5 kA or 5 kA. The input and/or output current (e.g., nominal AC current) may be less than or equal to about 5 kA, 4.5 kA, 4 kA, 3.5 kA, 3 kA, 2.5 kA, 2 kA, 1.5 kA, 1 kA, 750 A, 500 A, 250 A, 100 A, 50 A, 25 A, 10 A, 5 A or 1 A. In an example, the rated input/output characteristics include 25 kW, grid frequency of 60 Hz, 480 V or 208 V, 3 phase AC voltage, a nominal AC current of 18 A, or any combination thereof. In some implementations, the systems herein may be coupled to a high-voltage direct current interconnection such as a high voltage DC transmission grid. In such cases, rated input/output power characteristics may be accordingly adapted from AC values (e.g., input and/or output AC voltage may be adapted to input and/or output DC voltage such as, for example, DC distribution voltage).

In some implementations, the PCS may bring the energy storage device in electrical communication with the external load or power source such that a terminal voltage of the energy storage device (e.g., battery terminal voltage (DC) leading to the PCS) does not exceed about 100 V. The external load or power source may be a power grid, and the system (e.g., the system 900 in FIG. 9) may take in energy from the power grid or output energy to the power grid. For example, a system with a battery and a bi-directional converter may be configured to deliver or accept energy from the grid such that a terminal voltage on the energy storage device (e.g., input or output DC voltage on the battery) does not exceed about 40 V, 50 V, 60 V, 70 V, 80 V, 90 V, 100 V, 110 V or 120 V. Such voltages may in some cases be advantageous even though the energy storage device may be capable of terminal voltages ranging between about 60 VDC and 1,500 VDC. The PCS (e.g., the bi-directional inverter) may be configured to accept a voltage of, for example, less than or equal to about 100 V from the energy storage device, or deliver a voltage of, for example, less than or equal to about 100 V to the energy storage device (e.g., the inverter voltage may have a predefined limit, such as, for example, about 100 V, and the inverter may accept or deliver up to about 100 V). The power conversion system may be configured to output a voltage (e.g., AC voltage) of, for example, up to about 100 V, 200 V, 300 V, 400 V, 500 V, 600 V, 700 V, 800 V, 900 V, 1,000 V, 1,100 V, 1,200 V, 1,300 V, 1,400 V or 1,500 V to the external load or power source. This voltage may be further stepped up or down using transformers. The power conversion system may be configured to output a voltage as described elsewhere herein (e.g., in relation to rated input/output power characteristics of the PCS). The power conversion system may be configured to output a voltage enabling it to connect to low (e.g., between about 0 VAC and 1,000 VAC), medium (e.g., between about 1,000 VAC and 50 kVAC) or high voltage (e.g., between about 50 kVAC and 200 kVAC) AC transmission/distribution systems. For example, the transformer may allow the bi-directional inverter to be connected to low, medium or high voltage AC transmission/distribution systems. The system may output one or more of such voltages, for example, when the energy storage device comprises a group of electrochemical cells with a combined output voltage of between about 50 V and 100 V (e.g., a 50-100 V series string of cells may provide power instead of a large number of cells such as, for example, 1,000 cells being required to get to a given output AC voltage such as, for example, 1,000 V). The power conversion system may convert DC power from the energy storage device to AC power usable by the external load or power source. The AC power may be at a voltage at least about 1, 2, 3, 4, 5, 6, 7, 8, 9, 10, 11, 12, 13, 14, 15, 16, 17, 18, 19 or 20 times greater than the DC power. The PCS may comprise a transformer on the AC side of the PCS (e.g., the PCS may comprise a low voltage inverter and a transformer on the AC side in order to achieve higher output voltage to the grid; a DC chopper on the DC side may chop up DC signal from the battery and then send it to the PCS). The DC power from the energy storage device may be filtered (e.g., noise on the DC side may be chopped at a frequency that can be filtered).

The converter type may include, for example, nonpunch-through IGBT (NPT-IGBT), pulse width modulation (PWM) or space vector pulse width modulation (SVPWM), $3^{rd}$ harmonic injection, or any combination thereof.

The mechanical characteristics may include, for example, dimensions, mounting, weight and/or enclosure. Actual dimensions of the PCS may be configured to fit given space requirements ranging from 6 ft×6 ft space to standard ISO container dimensions (e.g., fit in 6 ft by 6 ft space). The PCS may have a footprint of less than or equal to about 36 square feet (sq ft), 100 sq ft, 200 sq ft, 500 sq ft, 1,000 sq ft, 2,500 sq ft, 5,000 sq ft, 10,000 sq ft, 15,000 sq ft or 20,000 sq ft.

The electrical characteristics may include, for example, output current and voltage distortion, efficiency, AC/DC disconnects, UPS internal and/or bus termination (e.g., AC, DC and other requirements). Examples of electrical characteristics are provided in TABLE 1.

TABLE 1

| | |
|---|---|
| Rated output voltage (standalone) | 480 VAC or 208 VAC ± 10% |
| Rated output frequency (standalone) | 60 Hz ± 5 Hz |
| Operational DC voltage | 10 VDC to 1,500 VDC |
| Number of phases/wires | 3 phase/3-wire + Ground |
| Overload capacity | 150% for ≥30 seconds |
| Real power regulation | ±1% of rated power |
| Reactive power regulation | ±1% of rated power |

The PCS can have operational DC voltage characteristic(s) with suitable value(s). A PCS system may have a minimum operational DC voltage of less than or equal to about 10 VDC, 12 VDC, 15 VDC, 20 VDC, 25 VDC, 30 VDC, 40 VDC, 50 VDC, 60 VDC, 70 VDC, 80 VDC, 90 VDC, 100 VDC, 120 VDC, 140 VDC, 150 VDC, 170 VDC, 200 VDC, 250 VDC, 300 VDC, 400 VDC, 500 VDC, 600 VDC, 700 VDC, 800 VDC, 900 VDC or 1,000 VDC. A PCS system may have a maximum operational DC voltage of greater than or equal to about 20 VDC, 25 VDC, 30 VDC, 40 VDC, 50 VDC, 60 VDC, 70 VDC, 80 VDC, 90 VDC, 100 VDC, 120 VDC, 140 VDC, 150 VDC, 170 VDC, 200 VDC, 250 VDC, 300 VDC, 400 VDC, 500 VDC, 600 VDC, 700 VDC, 800 VDC, 900 VDC, 1,000 VDC, 1,500 VDC or 2,000 VDC. A PCS system may have an minimum operational DC voltage between about 10 VDC and 1,500 VDC, 100 VDC and 1,000 VDC, 500 VDC and 1,500 VDC, 500 VDC and 100 VDC, 500 VDC and 60 VDC, or 10 VDC and 60 VDC.

The PCS can have operational DC current characteristic(s) with suitable value(s). For example, a PCS system can have a maximum DC current rating of greater than or equal to about 5 A, 10 A, 20 A, 50 A, 100 A, 200 A, 500 A, 1,000 A, 1,500 A, 2,000 A, 3,000 A or 5,000 A.

The PCS system can have a suitable maximum operational AC input or output power capability. For example, a PCS system can have a maximum AC input or output power capability of less than or equal to about 1 kW, 5 kW, 20 kW, 30 kW, 35 kW, 40 kW, 50 kW, 60 kW, 70 kW, 80 kW, 90 kW, 100 kW, 200 kW, 300 kW, 400 kW, 500 kW, 600 kW, 700 kW, 800 kW, 900 kW, 1 MW, 2 MW, 3 MW, 4 MW, 5 MW or 10 MW.

The output current and voltage distortion can be, for example, <5% total harmonic distortion (THD) at full load and/or <10% at 25% load. In some examples, output current or voltage distortion may be less than or equal to about 1%, 2%, 5%, 10%, 15% or 20% of total harmonic distortion (THD). Such distortions may be provided at full or partial (e.g., about 25%) load. The efficiency can be, for example, >95% at full load and full voltage and/or >90% at 25% load. The efficiency can be measured in each direction individually. In some examples, efficiency may be greater than or equal to about 80%, 85%, 90%, 91%, 92%, 93%, 94%, 95%, 96%, 97%, 98%, 99% or 99.5%. Such efficiencies may be provided at full or partial (e.g., about 25%) load.

The AC/DC disconnects can comprise, for example, internal main AC circuit breaker (e.g., low voltage power circuit breaker with a molded case), and/or DC disconnect or DC breaker. Both automatic with manual operation may be employed (e.g., automatic and/or manual operation may be used). The system (e.g., energy storage system) may comprise an uninterruptible power supply (UPS) subsystem capable of (i) powering controls in "black start" mode, (ii) providing 3 kVA of power for 45 minutes and/or (iii) providing power for a customer panel at 120V and up to 20 A (e.g., 20 V, 1 A isolated and fused). AC bus termination characteristics can include, for example, cable entry points that are on the top or bottom of an enclosure (e.g., battery system enclosure), cable entry AC power lines provided through the bottom of the enclosure, AC termination located at the top of the inverter, and/or the connection types may be field-configurable. DC bus termination characteristics can include, for example, DC bus entry made at the top or bottom of the enclosure (e.g., battery enclosure or battery system enclosure). Other bus termination characteristics (e.g., requirements) can include, for example, that all bus terminations are accessible, and/or that AC and DC bus connections are provided on opposite ends of the system. Design margin for all components and temperatures may be rated at 110% of full power or full temperature value.

The PCS may meet one or more (e.g., all) performance specifications when the environment is within specified ranges. The PCS may be configured for continuous operation within a given time period. The PCS may be configured for operation without de-rating. The specified environmental ranges may include one or more of ambient temperature range of about −20° F. to about 113° F. (about −30° C. to about 45° C.), storage temperature range of about −30° F. to about 150° F. and altitude of about 250 feet to about 1000 feet above sea level (ASL) (or about 7500 feet as specified on some units). The PCS may have suitable operating environment and cooling characteristics.

Figure 10:
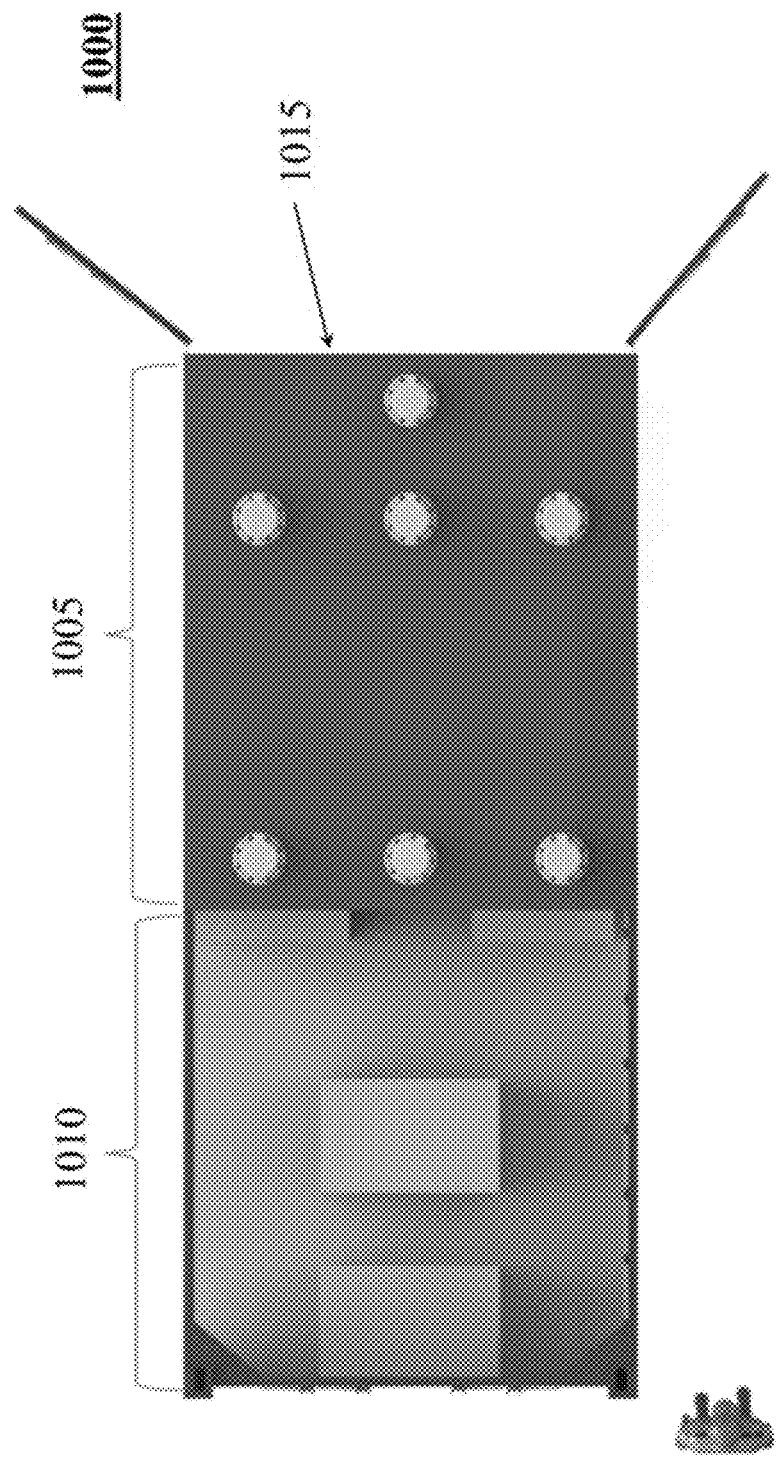
FIG. 10 shows example layout of a system comprising an energy storage system and a power conversion system.

FIG. 10 shows example layout of a system 1000 comprising an energy storage system and a power conversion system. The energy storage system may be as described elsewhere herein (e.g., in relation to the system 900 in FIG. 9). The system 1000 may include, for example, a 26 kWh energy storage system (e.g., having a size as shown, for example, in FIG. 9) and suitable PCS, BMS, SCADA and/or other related systems and components. For example, the system 1000 may comprise the energy storage device/system of FIG. 9 (e.g., with or without container 905). A component may be integrated with at least one other component (e.g., a human machine interface may be integrated with the energy storage device, or provided separately).

The system 1000 may comprise or be housed in a container 1015. The container 1015 may comprise one or more portions (e.g., the container 1015 may comprise a two-part container, a single container with two regions, or two separate containers joined together), and/or one or more sub-containers (e.g., the container 1015 may comprise two internal containers). The container 1015 may comprise a first portion or region 1005 and a second portion or region 1010. The first portion or region 1005 may comprise a hot zone (e.g., cells and insulation). The first portion or region 1005 may comprise, for example, the system 900 (e.g., including the container 905). The second portion or region 1010 may comprise (e.g., may comprise space earmarked for) PCS, BMS and SCADA. The PCS, BMS, SCADA and/or other components in second portion or region 1010 may or may not comprise separate containers. In some implementations, at least a portion of the components (or a portion of a component) in the first portion or region 1005 may be provided as part of the second portion or region 1010. For example, a BMS may be provided primarily as part of the second portion or region 1010 with a minority portion provided as part of the first portion or region 1005.

A cut-out view of an example 20 foot (ft) long container 1015 viewed from the top (from above) is shown in FIG. 10. The area or region 1005 may be reserved for batteries and hot zone components (e.g., LMBs and hot zone components). The area or region 1010 may house the PCS, BMS(s), SCADA and switchgear. For example, the first portion or region (e.g., about one half of the 20 ft shipping container) may be earmarked for the energy storage portion (e.g., energy storage portion comprising liquid metal cells arranged as modules, strings, etc.) and the second portion or region (e.g., the other half) may be earmarked for BMS, switch gear and PCS.

Mounting may include, for example, mounting brackets and bolts to floor (e.g., indoor facility installed and/or container mountable). The PCS may have a suitable total weight. The PCS may comprise an enclosure. The enclosure may be rated according to National Electrical Manufacturers Association (NEMA) or other standards (e.g., NEMA 1-rated or better). The enclosure may comprise, for example, a single cabinet containing complete bidirectional unit, AC output filter, AC breaker, DC disconnect and/or HMI. In some instances, such as, for example, multi-MWh-size systems, at least a portion of the system (e.g., the PCS) may be housed separately. For example, the PCS for multi-MWh systems may be housed in standalone custom enclosures (e.g., see FIG. 12).

The total size of the system 1000 and/or the container 1015 may depend on the sizes of its portions (e.g., of the first portion or region 1005 and the second portion or region 1010). Further, the individual sizes and proportions of the first and second portions/regions may change. In some examples, at least about 10%, 20%, 30%, 40%, 50%, 60%, 70%, 80% or 90% of the system 1000 and/or the container 1015 may be taken up by the first portion or region. In some examples less than or equal to about 90%, 80%, 70%, 60%, 50%, 40%, 30%, 20% or 10% of the system 1000 and/or the container 1015 may be taken up by the first portion or region. In some examples, the first portion or region may take up between about 40% and 60%, 30% and 70%, or 20% and 90% of system 1000 and/or the container 1015. In an example, the size of the container 1015 (or of a portion thereof) may increase with total number of electrochemical cells in the system and/or with the size of the energy storage device/system. In another example, the size of the container 1015 (or of a portion thereof) may not increase with total number of electrochemical cells and/or with the size of the energy storage device/system if, for example, system specifications are such that a PCS of a smaller size is needed. In yet another example, depending on configuration (e.g., interconnection) of the energy storage device/system (e.g., of an energy storage device/system having a given total number of electrochemical cells), a different PCS may be needed. Different PCSs (e.g., with differing complexities and/or capabilities) may have different sizes, thus affecting the size of the system 1000 and/or the container 1015. Further, the PCS may have a given size, but may be distributed within the container 1015. Such configuration may allow, for example, space to be conserved and/or may address heat management or other requirements. The size of a given PCS may depend on its configuration (e.g., layout or component performance). For example, ventilation or wiring from a first (e.g., centralized) PCS coupled to a given energy storage device/system may differ from ventilation or wiring from a second (e.g., distributed) PCS having substantially the same power conversion capability as the first PCS and coupled to the same energy storage device/system. A given energy storage device/system may have different sizes or layouts, as described in greater detail elsewhere herein (e.g., interconnection of a given number of electrochemical cells may differ and may place different requirements on the PCS and/or the system 1000 as a whole).

System specifications (e.g., for the system 1000 in FIG. 10) may include specifications for an energy storage device/system. Such specifications may be as described elsewhere herein (e.g., in relation to the system 900 in FIG. 9). System specifications (e.g., for the system 1000 in FIG. 10) may include specifications for a power conversion system. Such specifications may be described elsewhere herein.

The system 1000 (e.g., including the energy storage device/system) may be charged and/or discharged at a given rate. The system 1000 may comprise, for example, the energy storage device/system of FIG. 9. The energy storage device/system may have the charge/discharge characteristics and/or specifications as described in relation to system 1000. The charge and/or discharge rate may be specified in terms of the capacity of an energy storage device or system (e.g., an electrochemical cell and/or battery) or in terms of power (e.g., in W, kW, MW, VA, kVA or MVA). The charge/discharge rate may be controlled using power. For example, for a grid-tied system, the charge/discharge may be controlled using power. The power may be specified in terms of real power (measured in, for example, W, kW or MW) and/or apparent power (measured in, for example, VA, kVA or MVA). The power may be as described elsewhere herein (e.g., in relation to power specifications for system 1000). The specified or controlled power may be converted to an applicable C rate.

A charge or discharge "C rate," as used herein, may be the rate needed to transfer an amount of charge equal to the capacity (e.g., in Ampere-hours (Ah)) of the electrochemical cell and/or battery in 1 hour. Thus, for example, at a rate of C/5, transferring a charge equal to the capacity of the electrochemical cell and/or battery may take 5 hours. The charge or discharge rate may or may not take into account inefficiencies and losses. The charge rate may or may not be the same as the discharge rate. The charge and/or discharge rate may be greater than or equal to about C/48, C/24, C/12, C/10, C/9, C/8, C/7, C/6, C/5, C/4, C/3, C/2, C, 2C, 3C or 4C. The charge and/or discharge rate may be less than about 4C, 3C, 2C, C, C/2, C/3, C/4, C/5, C/6, C/7, C/8, C/9, C/10, C/12, C/24 or C/48. The charge and/or discharge rate may be between about C/10 and C, C/8 and C/2, or C/6 and C/4. In an example, the charge and/or discharge rate is about C/5. In some cases, a given charge/discharge rate may be selected to specify system requirements or characteristics (e.g., specifications are provided at a C/5 rate). Such a system may be operable at any charge and/or discharge rate(s) herein (e.g., the system may be continuously operable at a C/2 rate). In some cases, different charge and/or discharge rate(s) may be used for electrochemical cells and/or batteries with different capacities.

The system 1000 may have given power specifications. For example, the system may draw power from an external power source (e.g., from the grid) at a given rate or deliver power to an external load (e.g., to the grid) at a given rate. The system 1000 may comprise, for example, the energy storage device/system of FIG. 9. The energy storage device/system may have the power characteristics and/or specifications as described in relation to system 1000. The draw and delivery rates may or may not be the same. The power draw or delivery rate may be at least about 0.5 kW, 1 kW, 5 kW, 20 kW, 30 kW, 35 kW, 40 kW, 50 kW, 60 kW, 70 kW, 80 kW, 90 kW, 100 kW, 200 kW, 300 kW, 400 kW, 500 kW, 600 kW, 700 kW, 800 kW, 900 kW, 1 mega-Watt (MW), 2 MW, 3 MW, 4 MW or 5 MW. The power draw or delivery rate may less than or equal to about 1 kW, 5 kW, 20 kW, 30 kW, 35 kW, 40 kW, 50 kW, 60 kW, 70 kW, 80 kW, 90 kW, 100 kW, 200 kW, 300 kW, 400 kW, 500 kW, 600 kW, 700 kW, 800 kW, 900 kW, 1 MW, 2 MW, 3 MW, 4 MW, 5 MW or 10 MW. The power draw or delivery rate may be between about 1 kW and 10 kW, 1 kW and 100 kW, 10 kW and 200 kW, 100 kW and 1 MW, 500 kW and 1 MW, 1 MW and 5 MW, or 1 MW and 10 MW. In an example, the power draw or delivery rate is between about 3 kW and 9 kW. The power draw or delivery rate may be at least about 0.5 kVA, 1 kVA, 5 kVA, 20 kVA, 30 kVA, 35 kVA, 40 kVA, 50 kVA, 60 kVA, 70 kVA, 80 kVA, 90 kVA, 100 kVA, 200 kVA, 300 kVA, 400 kVA, 500 kVA, 600 kVA, 700 kVA, 800 kVA, 900 kVA, 1 megavolt-ampere (MVA), 2 MVA, 3 MVA, 4 MVA or 5 MVA. The power draw or delivery rate may less than or equal to about 1 kVA, 5 kVA, 20 kVA, 30 kVA, 35 kVA, 40 kVA, 50 kVA, 60 kVA, 70 kVA, 80 kVA, 90 kVA, 100 kVA, 200 kVA, 300 kVA, 400 kVA, 500 kVA, 600 kVA, 700 kVA, 800 kVA, 900 kVA, 1 MVA, 2 MVA, 3 MVA, 4 MVA, 5 MVA or 10 MVA. The power draw or delivery rate may be between about 1 kVA and 10 kVA, 1 kVA and 100 kVA, 10 kVA and 200 kVA, 100 kVA and 1 MVA, 500 kVA and 1 MVA, 1 MVA and 5 MVA, or 1 MVA and 10 MVA. In an example, the power draw or delivery rate is between about 3 kVA and 9 kVA. The system may have such power specifications at a given charge or discharge rate. The charge and discharge rates may be as described elsewhere herein.

In an example, in a system comprising the energy storage device/system of FIG. 9 (e.g., with a nominal C/5 capacity with 70 Ah cells (discharge energy DC) of about 26 kWh and a DC-DC round-trip efficiency at C/5 rate of about 60%), a nominal DC power draw from the energy storage device/system (e.g., core) at C/5 discharge may be about 5.5 kW, and a nominal DC power delivered to the energy storage device/system (e.g., core) for C/5 charge may be about 7.1 kW.

The system 1000 may be configured for self-heated operation. Specifications for the self-heated operation may include substantially no heating (e.g., no heating) required during continuous cycling (e.g., charging and discharging at a given rate or set of rates). In an example, the system is configured for self-heated operation with no heating required during continuous cycling comprising charging and discharging at a nominal rate of at least about C/5 (e.g., at C/5 nominal rate).

The system 1000 may have given thermal specifications. Such thermal specifications (or characteristics) may be as described elsewhere herein (e.g., in relation to the system 900). For example, the system 1000 may have one or more (e.g., majority of) the thermal characteristics and/or specifications of the energy storage device/system of FIG. 9. The heat-up and/or cool-down times may depend on the operating temperature, size and/or configuration of the energy storage device/system (e.g., number of cells, interconnection of the cells, etc.), thermal management configuration of the system (e.g., thermal management of the energy storage device/system and/or the power conversion system, including, for example, active cooling capability), and/or other factors.

Figure 11:
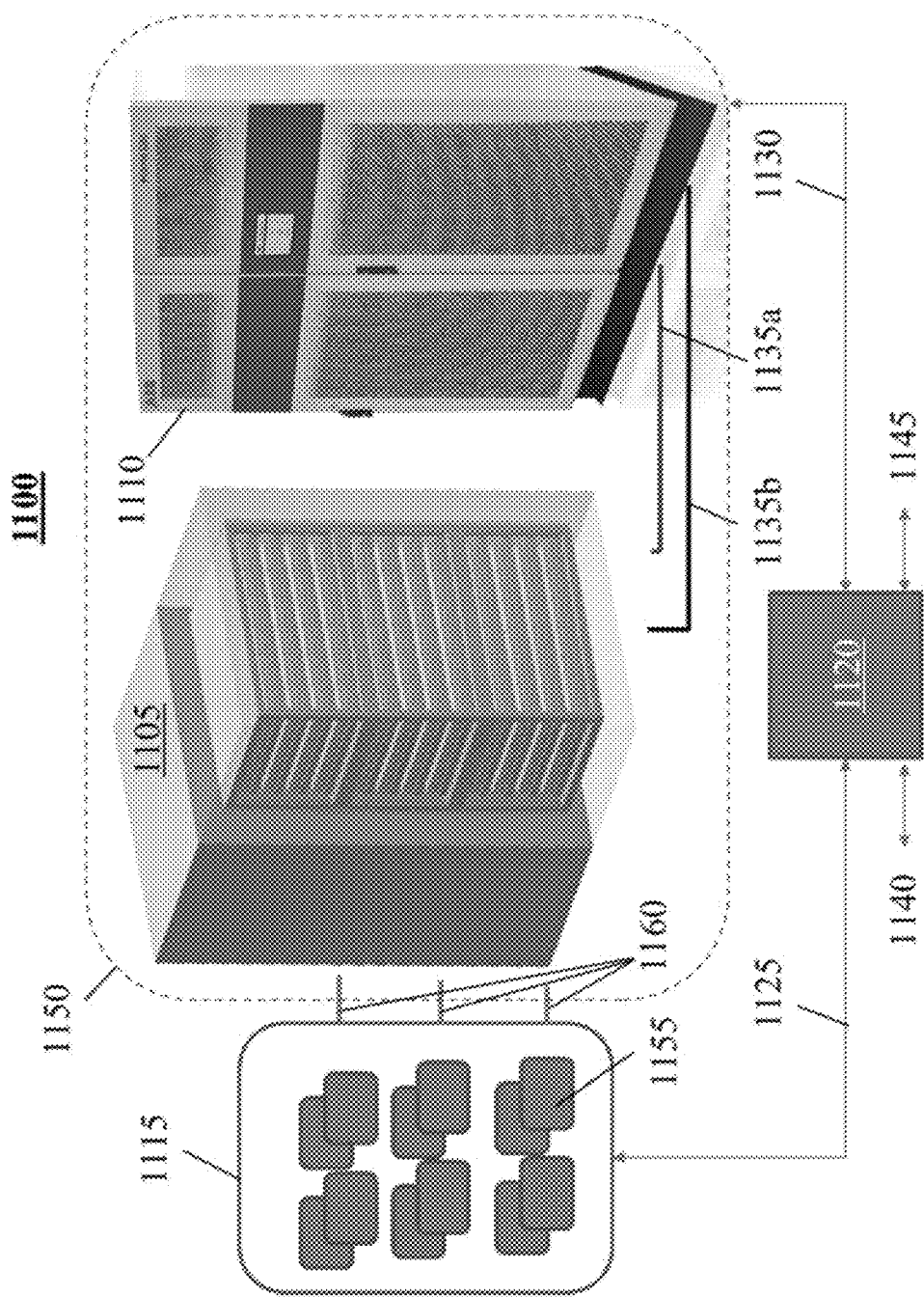
FIG. 11 shows an example of a system comprising a power conversion system connected to an energy storage system.

FIG. 11 shows an example of a system 1100 comprising a power conversion system 1110 connected to an energy storage device/system 1105. The system 1100 may comprise, for example, a 150 kWh energy storage device/system. The energy storage device/system 1105 may comprise a battery (e.g., LMB in rack(s)). The energy storage device/system 1105 may comprise, for example, two portions (e.g., two battery cell towers), one of which is shown in FIG. 11 with a transparent cover to show the cell configuration. The energy storage device/system (e.g., battery) may be configured as described elsewhere herein (e.g., groups of cells may be suitably interconnected). The system 1100 may further comprise an inverter (or PCS) 1110. In some implementations, the battery 1105 and the inverter 1110 may be housed in the same container or box 1150. For example, the configuration (e.g., overall architecture) may be similar to FIG. 10. The energy storage device/system 1105 may be, for example, as described in relation to FIG. 9. The battery 1105 may be in communication with the PCS/inverter 1110 via a power line with positive polarity 1135*a* and negative polarity 1135*b*.

The system 1100 may comprise a controller 1120. The controller 1120 may be in electronic communication with the PCS/inverter 1110 through communication line 1130. The controller 1120 may be in electronic communication with a BMS 1115 through communication line 1125. The controller 1120 may further communicate with an interface 1140 (e.g., a secure user/operator interface) and/or a user/utility/customer signal 1145. The BMS 1115 may comprise, one or more management and/or control units (e.g., a plurality of cell management controllers) 1155. The BMS may be in electronic communication with the energy storage device/system 1105 through one or more communication lines 1160. The communication between the BMS and the energy storage device/system may be modular and/or hierarchical (e.g., cell management controllers may communicate with given cells or groups of cells). The system 1100 may be implemented as (or with the aid of) a computer control system (e.g., see FIG. 6). In some examples, the BMS 1115 and the controller 1120 may be implemented at the server or controller 601.

Figure 12:
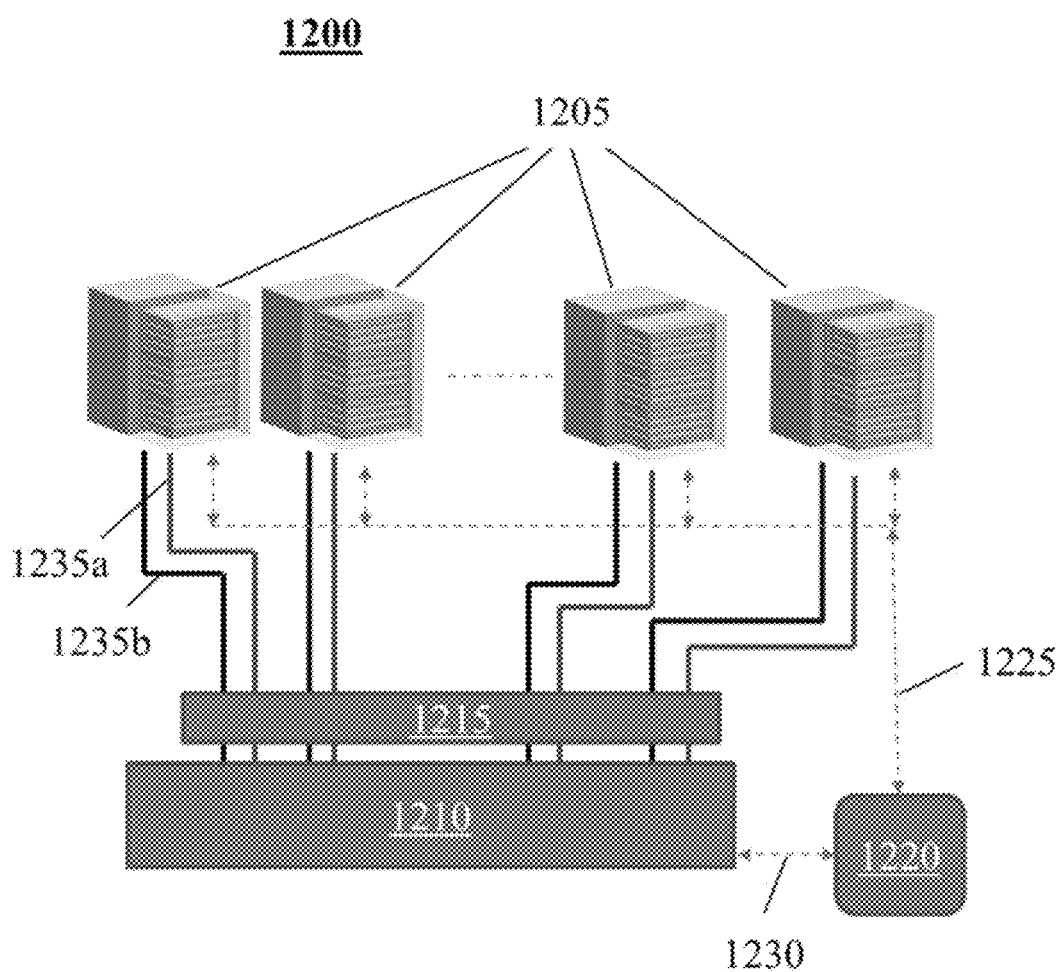
FIG. 12 shows an example of a system comprising a power conversion system connected to multiple energy storage systems.

FIG. 12 shows an example of a system 1200 comprising a power conversion system connected to multiple energy storage systems 1205. Each energy storage system 1205 may comprise or be an energy storage device (e.g., a battery). The system 1200 may include one or more (e.g., a plurality) of energy storage devices/systems. The system 1200 may include at least 2, 3, 4, 5, 10, 15, 20, 25, 50, 75 or 100 energy storage devices/systems. The system 1200 in FIG. 12 can comprise, for example, 7 energy storage devices/systems of about 150 kWh each, and a total energy storage capacity of 1 MWh. The system 1200 may be a scale-up from the system 1100. The configuration may scale from, for example, a 150 kWh configuration (e.g., see FIG. 11). The one or more (e.g., 7) energy storage devices/systems 1205 may each be connected to bypass switch gear (e.g., automated bypass switchgear) 1215 and from there to a PCS line up (e.g., 1-2 MVA PCS line up) 1210. The PCS line up may comprise multiple banks of inverters. The banks of inverters may be connected to a bus (e.g., a single bus). The bus may be connected to DC power from the energy storage systems. Individual energy storage devices/systems (e.g., batteries) 1205, the bypass switchgear 1215 and the PCS line up 1210 may be in electronic communication via power lines with positive polarity 1235*a* and negative polarity 1235*b*. The bypass switchgear 1215 may allow individual energy storage devices/systems 1205 to be shut down (e.g., the leftmost battery 1205 in FIG. 12 may be selectively shut down). In this configuration, on fault, a given energy storage device/system (e.g., battery) can advantageously be de-energized and/or cooled down while balance of system remains operational. In this instance, system available capacity may become de-rated.

The system 1200 may comprise a controller (e.g., site controller) 1220. The controller 1220 may be located anywhere in the system 1200. For example, the controller may be located as a standalone system (e.g., a standalone control room) or may be part of one or more other components/systems of the system 1200. The controller 1220 may be in electronic communication with the PCS line up 1210 through communication line 1230. The controller 1220 may be in electronic communication with the energy storage devices/systems 1205 (e.g., via one or more BMSs, not shown) through communication line 1125. For example, as shown in FIG. 12, a communication line 1225 may be split into individual communication lines to individual energy storage devices/systems 1205.

A suitable site for the system 1200 may include one or more spaces around components. For example, suitable space(s) between the energy storage device/systems 1205 may be provided. The one or more (e.g., 7) energy storage device/systems 1205 may be suitably arranged (e.g., within a space/area with a length of about 53 ft and a width of about 8 ft). The PCS line up 1210 may be housed in a separate container (e.g., a 20 ft long and 8 ft wide container).

The system 1200 may have given thermal specifications. Such thermal specifications (or characteristics) may be as described elsewhere herein (e.g., in relation to the system 900). The system may include modular heating and/or cooling. For example, a given energy storage device/system (e.g., battery) 1205 may be cooled while others remain hot and operational.

An energy storage device may form or be provided within an energy storage system. It will be appreciated that a PCS and/or one or more other components of the systems 1000, 1100 and 1200 (e.g., a BMS) may in some instances be provided as or considered part of the energy storage system. In such instances, it will be appreciated that the energy storage system may include other components/systems in addition to the energy storage device. Further, one or more energy storage devices/systems (e.g., the energy devices/systems 1205) may in some cases be provided as or considered as a single energy storage system.

Interconnections

Wired or wire-less (e.g., direct metal-to-metal) interconnections may be formed between individual electrochemical cells and/or between groups of electrochemical cells (e.g., modules, series strings, packs, cores, CEs, systems, or any other group comprising one or more electrochemical cells). In some cases, groups of cells may be joined via one or more cell-to-cell interconnections. In some cases, groups of cells may be joined via a group-level interconnection. The group-level interconnection may further comprise one or more interconnections with one or more individual cells of the group. The interconnections may be structural and/or electrical. Cells and/or groups of cells may be assembled (or stacked) horizontally or vertically. Such assembled cells and/or groups of cells may be arranged in series or parallel configurations. Further, groups of cells may be supported by various frames. The frames may provide structural support and/or participate or aid in forming the interconnections (e.g., frames on groups of cells may mate or be connected). Groups of cells utilized for assembly purposes may or may not be the same as groups of cells utilized for regulation/control purposes.

An interconnect may refer to any electrical connection other than a direct metal-to-metal joint. Interconnects can include wires or bent sheet metal components designed to pass current. Interconnects may be compliant (e.g., flexible). A wire may refer to any cord, strip, or elongated electrical conduit. Wires can be flexible. As used herein, a braided metal strip is a wire. In some cases, a busbar is a wire.

In some implementations, electrochemical cells or groups thereof are connected using interconnects. In some instances, an interconnect is a wire. In some implementations, direct connection of cells to each other (e.g., by brazing) can be used to connect cells or groups of cells, in some cases reducing or eliminating the use of wires to connect electrochemical cells. For example, a positive current collector of a first electrochemical cell can be direct metal-to-metal joined (e.g., brazed or welded) to a negative current collector of a second electrochemical cell. In some instances, the negative current collector comprises a negative current lead or conductor. In some instances, the first and second electrochemical cells are not connected by wires. In another example, the conductor can protrude through an electrically conductive housing of the first cell through an aperture in the electrically conductive housing and can be electrically isolated from the electrically conductive housing with a seal. A plurality of electrochemical cells can be stacked in series with the conductor of the first cell in electrical contact with the electrically conductive housing of a second cell. A plurality of non-gaseous spacers can be disposed between the electrochemical cells. In some cases, the electrically conductive housings are part of a current conducting pathway (e.g., as in a parallel connection of cells). In some implementations, one or more busbars and/or interconnects can be used to create a connection between any two groups of cells.

A battery can comprise electrochemical cells connected in series and in parallel. For example, electrochemical cell modules may be connected in series, or electrochemical cell series strings may be connected in parallel. The number of electrochemical cell modules (or parallel-connected modules) that are connected in series can be any suitable number, such as, for example, greater than or equal to 3, 5, 6, 10, 12, 15, 16, 20, 32, 48, 54, 64, 108, 128, 216 or 256. In an example, the number of electrochemical cell modules (or parallel-connected modules) that are connected in series is 3 (e.g., for a battery comprising a pack), 6 (e.g., for a battery comprising a pack), or 216 (e.g., for a battery comprising a core).

Figure 7:
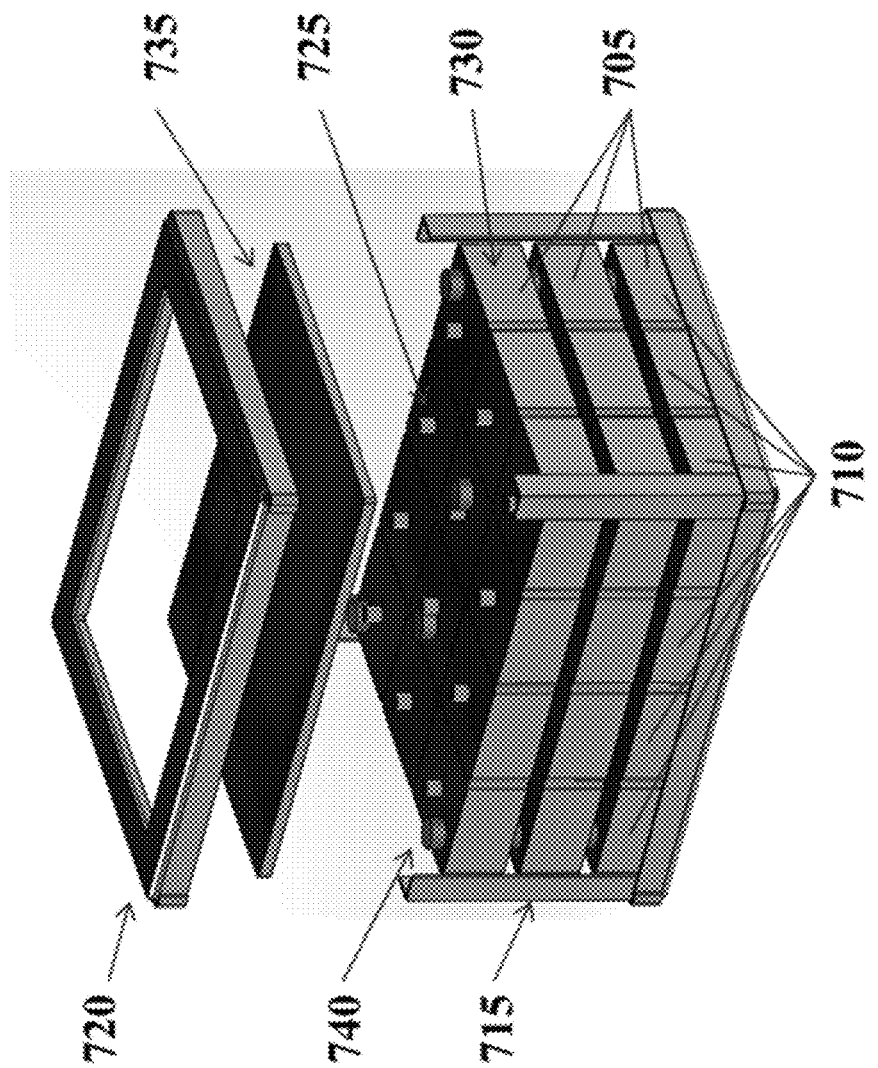
FIG. 7 shows an example of a cell pack.

FIG. 7 shows an example of a cell pack 700 comprising 3 modules 705. Each of the modules comprises 12 cells 730 that are connected in parallel 710. The modules are held in place with cell pack framing (also "frame" herein) 715 that includes a top component of the frame 720. The cells are stacked directly on top of each other with the negative current terminal of one cell 725 contacted directly with the housing of another cell (e.g., the cell above it). The negative current terminals of the top layer of cells may have no housing of another cell directly above, and may instead be contacted (e.g., brazed to) a negative busbar 735.

Cell packs can be attached in series and parallel in various configurations to produce cores, CEs, or systems. The number and arrangement of various groups of electrochemical cells can be chosen to create the desired system voltage and energy storage capacity. The packs, cores, CEs, or systems can then be enclosed together in high temperature insulation to create a system that can heat itself using the energy created from cells charging and discharging.

Figure 8:
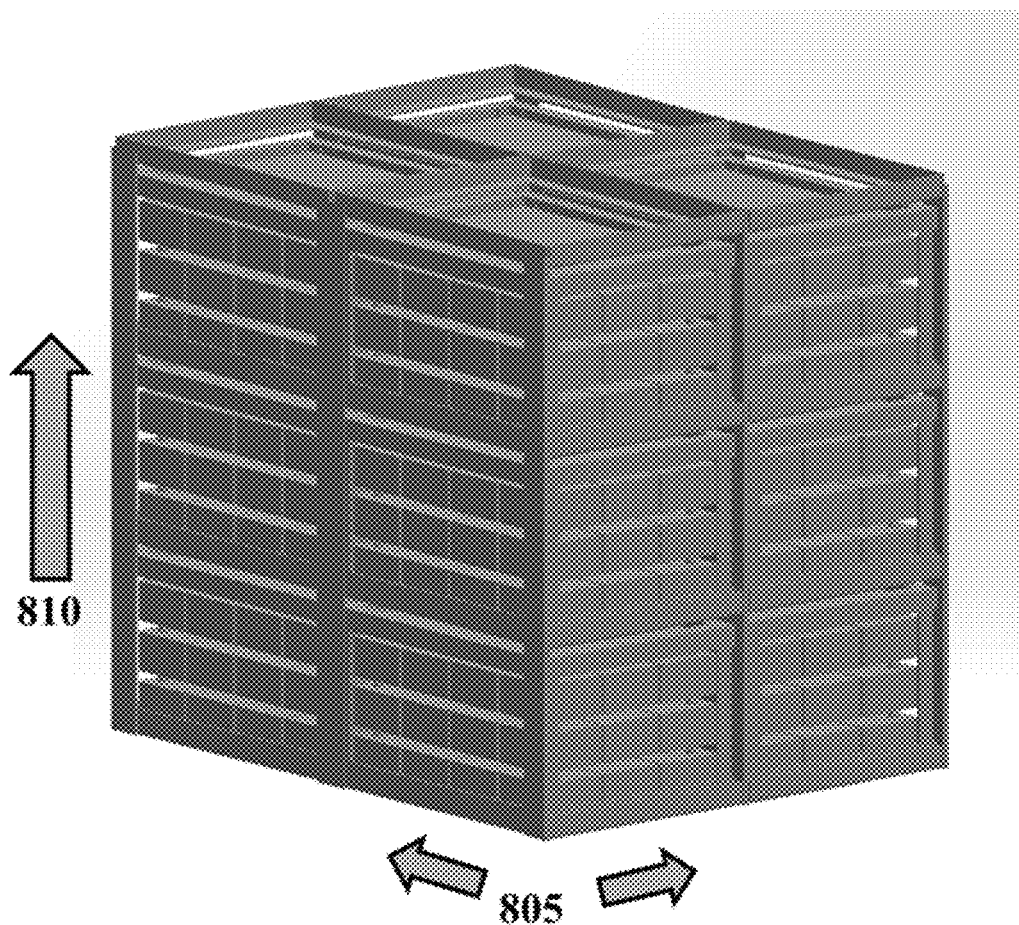
FIG. 8 shows an example of a stack of cell packs, also referred to as a core.

FIG. 8 is an example of how these packs can be configured, indicating that the cell packs in a given plane are connect to one another in parallel 805, while the packs connected directly atop one another are connected in series 810.

The packs themselves can be connected vertically and horizontally to one another through busbars (e.g., unlike the cell-to-cell connections within a pack which can generally be direct connections such as brazes or welds). In some cases, the busbar is flexible or comprises a flexible section (e.g., to accommodate non-isothermal expansion of the system throughout heat up and operation).

A busbar can be used to make an electrical connection with cells in a parallel string (e.g., a parallel string of cells, a parallel string of packs, etc.). In some examples, a busbar can be used to configure a set of cells or cell modules into a parallel string configuration by being electrically connected with the same terminal on all of the cells or cell modules (e.g., the negative terminals of all of the cells or cell modules, or the positive terminals of all of the cell or cell modules). For example, a positive busbar and/or a negative busbar may be used. The positive busbar can be connected to the housing and may or may not need to be flexible. In some cases, the positive busbar may not be used. The negative busbar can be joined to features in (or on) one or more of the cell bodies (e.g., the cell bodies of individual cells in a pack) to provide a strong electrical connection. In some cases, the negative busbar can be attached to conductive feed-throughs (e.g., negative current leads), which may require some compliance for thermal expansion. For example, a flexible connection between a relatively rigid busbar core and the feed-through may be achieved using a compliance feature between the feed-through and the busbar (e.g., a spiral pattern, such as spiral arm(s), that may be created by cutting away and/or removing material from a flat busbar in the desired pattern). In some cases, the busbar may be sufficiently compliant such that the compliance feature is not needed.

The busbar and/or interconnect components can comprise a conductive material. For example, the busbar and/or interconnect components can comprise (e.g., be made of) stainless steel, nickel, copper, aluminum-copper based alloy.

The battery can include a common single point connector. The single point connector can be used to electrically connect to an electrochemical cell or to a group of electrochemical cells (e.g., modules, series strings, packs, cores, CEs, or systems). Multiple wires (e.g., ends of the wires) can be connected to the common single point connector (i.e., several wires can be connected to a common connector, which can connect to other portions of the battery at a single point). The battery can include a plurality of wires having a first end and a second end. The first end can be connected to at least one of the electrochemical cells (e.g., directly or indirectly). In some cases, the first end can be connected to a common single point connector, and the common single point connector can be connected to at least one of the electrochemical cells (e.g., to a busbar that is in electrical communication with at least one of the electrochemical cells, to a cell body, to a feature in a cell body such as a tab protruding from the cell body, etc.). The second end can be connected, for example, to control circuitry (e.g., directly or indirectly) or to another common single point connector. In some cases, the second end can be connected to a common single point connector, and the common single point connector can be connected to control circuitry. For example, the single point connector on the second end (or the second end itself) can be connected to control circuitry located outside the thermally insulated zone containing cell packs, such as, for example, to a control system (e.g., to a control board). In some cases, the first ends of a set of wires can be connected to a single point connector, the second ends of a subset of the wires can be connected to another single point connector, and the remaining wire or wires (e.g., the remaining second ends of the wires) can be separately connected to another part of the battery (e.g., a control system).

In some cases, the single point connector forms an electrical connection with another plurality (group) of electrochemical cells (e.g., to connect together modules, series strings, packs, cores, CEs, or systems). For example, the first end of the wire can be connected (e.g., via a single point connector such as an adapter plate) to a busbar (e.g., a negative busbar) that is in electrical communication with at least one of the electrochemical cells in a group of electrochemical cells (e.g., in a pack).

An adapter plate can create a single point connection for multiple wires to a busbar in a module, series string, pack, core, or CE. The wires can be welded or brazed to the back of the adapter plate to facilitate single point separation of a large quantity of wires connecting to a busbar. Multiple wire connections may be created (e.g., to effectively monitor cells within a module). The connection point can be a potential point of failure and can add to the cost and complexity of assembly. In some implementations, a terminal that has the wires connected to it can be pre-fabricated. The plate can be bolted, welded or brazed wherever the connection is required. Wires connected in this manner can remain static through many uses and disconnections, thus reducing wire wear-tear and embrittlement effects. Thus, single point connectors can in some cases enable more facile module interchanges.

Any number of wires can be connected to a common single point connector. In some examples, greater than or equal to 1, 2, 3, 4, 5, 6, 7, 8, 9, 10, 11, 12, 13, 14, 15, 16, 17, 18, 19, 20, 22, 24, 26, 28, 30, 35 or 40 wires are connected to the single point connector.

The single point connector can be made of any conductive metal, such as, for example, nickel, stainless steel, copper-aluminum alloy, or of any other conductive material described herein. In some implementations, the single point connector can comprise a bent metal piece. The first ends of the wires can be passed through holes in the bent metal piece and/or welded to the bent metal piece. The wires can be any wire, including, but not limited to, American Wire Gauge (AWG) 18 wires or AWG 10 wires. In some cases, one or more wires may be used to sense voltage and therefore may be able to be thin (e.g., less than about 2 mm in diameter, or AWG 18). In some cases, one or more wires may be thicker (e.g., greater than about 2 mm in diameter, or AWG 18 gauge) and may be used to carry current to and from the cell or cell module. The sensing line(s) (e.g., voltage sense line(s)) may be provided separately from the current flow line(s). In some cases, first ends of the current carrying wires and the voltage sense wire may be connected to a single point connector that is connected to the cells or a busbar, while the other (second) ends of the wires are separately connected to the control system (e.g., the voltage sense wire is connected to a voltage input port on the control system and the current wires are connected to a single point connector which is connected to a current input/output port on the control system). This arrangement may enable voltage drop across the current flow lines to be separated from the operational characteristics sensed by the sensing lines. As previously described, the sensing and current flow paths may be in electronic communication with the control system.

Control Systems

Provided herein are computer systems (e.g., computer control systems) that are programmed to implement methods of the disclosure. FIG. 6 shows an example of a system 600 that is programmed or otherwise configured to monitor, control and/or regulate one or more process parameters of an energy storage system of the present disclosure. The system 600 can monitor the operation of an energy storage device. The system 600 can be programmed or otherwise configured to aid the energy storage device (and/or any portion(s) thereof, such as, for example, individual cells or groups of cells) in delivering and/or discharging a suitably large amount of energy to a load (e.g., an external load), and/or storing and/or receiving input of ("taking in") a suitably large amount of energy from an external power source. In some implementations, the system 600 may comprise a power conversion system configured to aid with the transfer of energy to and from the energy storage device.

The system 600 (also "control system" herein) includes a computer server ("server") or controller 601 that is programmed to implement methods disclosed herein. The server or controller 601 includes a central processing unit (CPU, also "processor" and "computer processor" herein) 605, which can be a single-core or multi-core processor, a plurality of processors for parallel processing, or other logic. The server or controller 601 also includes memory 610 (e.g., random-access memory, read-only memory, flash memory), electronic storage unit 615 (e.g., hard disk), communication interface 620 (e.g., network adapter) for communicating with one or more other systems, and peripheral devices 625, such as cache, other memory, data storage and/or electronic display adapters. The memory 610, storage unit 615, interface 620 and peripheral devices 625 are in communication with the CPU 605 through a communication bus (solid lines), such as a motherboard. The storage unit 615 can be a data storage unit (or data repository) for storing data. The server or controller 601 can be operatively coupled to a computer network ("network") 630 with the aid of the communication interface 620. The network 630 can be the Internet, an internet and/or extranet, or an intranet and/or extranet that is in communication with the Internet. The network 630 in some cases is a telecommunication and/or data network. The network 630 can include one or more computer servers, which can enable distributed computing, such as cloud computing. The network 630, in some cases with the aid of the server or controller 601, can implement a peer-to-peer network, which may enable devices coupled to the server or controller 601 to behave as a client or a server. The network 630 can enable remote control and/or access of the controller 601.

The server or controller 601 can be coupled to an energy storage system 635 either directly or through the network 630. For example, the server or controller 601 can be coupled to an energy storage device. The energy storage device can be provided within the energy storage system 635. The energy storage system 635 (e.g., a battery), may be charged and discharged by flowing electric current across negative and positive terminals of the battery, which can comprise parallel and/or series-connected cells. The direction and intensity of the flow of current may be controlled, for example, by power electronics (e.g., provided within the energy storage system 635 and/or the power conversion system). The energy storage system 635 may be operatively coupled to the system 600 through, for example, one or more electrical flow lines (e.g., wires), which can include sensing lines and current flow lines. The sensing lines can be configured to enable the control system to sense, for example, operating temperature and voltage of one or more cells of the energy storage device of the energy storage system 635. In some implementations, the sensing lines can be non-current carrying lines. In an example, at least a portion of the system 600 (e.g., the server or controller 601) may (e.g., selectively) electrically disconnect one or more (e.g., specific) energy storage modules or series strings of the energy storage device while balance of the energy storage device or system continues to operate.

The system 600 may comprise a board (e.g., electrical circuit board). The board (also "control board" herein) can have data acquisition capabilities. For example, the board can include a data acquisition board. The board may be able to store and/or process data (e.g., acquired data). For example, the board may be able to store and/or process the data rather than (or in addition to) converting inputs into digital signals.

The process parameters can include charging and discharging parameters. For example, the storage unit 615 can store process parameters and/or look-up tables of the energy storage device (and/or other portions of the energy storage system 635). The memory 610 or storage unit 615 can include an algorithm (implemented by way of software) for estimating or calculating one or more process parameters of the energy storage device. Measured parameter(s) (e.g., analog and/or digital signals corresponding to input/measurements from electrical, chemical or other sensors, such as, for example, ammeters, thermocouples, gas sensors, etc.) may be acquired and/or processed by the system 600. The inputs and/or measurements can be at least partially processed at the control system. The inputs and/or measurements (e.g., implementation) can be distributed across the control system (e.g., distributed between the server or controller 601 and the energy storage system 635). Examples of process parameters measured, processed and/or calculated include, for example, various voltage metrics, various current metrics, temperature, state of health (SOH), state of charge (SOC), coolant flow, efficiency, failure condition (e.g., cell breach), charge/discharge capacity, state of panels and access hatches (e.g., open or close), wind speed, seismic activity, and so on.

The system 600 may comprise a battery management system (BMS) that is operatively coupled to the energy storage system 635 (e.g., through a ballasting member including sensing lines and current flow lines). The BMS may be provided as part of the server or controller 601 and/or separately from the server or controller 601 (e.g., the BMS can be implemented at the server or controller 601). The BMS may be programmed or otherwise configured to implement various battery management functions (e.g., to regulate one or more process parameters of an energy storage device and a circuit coupled to the energy storage device).

The system 600 may comprise a supervisory control and data acquisition (SCADA) system and associated communication infrastructure (e.g., wiring). The SCADA controller may communicate with one or more controllers of the system 600. The SCADA controller may be provided as part of the server or controller 601 and/or separately from the server or controller 601. The SCADA controller may be provided with user-controlled input and/or market signal (e.g., electrical power grid) input. In some cases, the SCADA controller may determine or be instructed to determine (e.g., via control software) the operating mode (also "operation mode" herein) of the system 600 (or any portion thereof) with or without external user-controlled input or market input/signals. The SCADA controller and/or the controller 601 may communicate with power electronics or a PCS system. The power electronics may be provided within the system 600 (e.g., as part of a power conversion system). For example, the power electronics may be provided separately from the energy storage system 635. In some cases, a utility may connect to or be part of the system 600. For example, the utility may connect to the power electronics (e.g., a bi-directional inverter). In some examples of DC distribution systems, a bi-directional inverter may not only link a DC circuit to an AC system (e.g., energy storage device to a power grid), but can adjust its current commands and operation modes to balance power flow and regulate a voltage of the DC circuit. The DC circuit may provide current/voltage from the energy system to a load (e.g., a power grid or utility).

The server or controller 601 in some cases can include one or more additional data storage units that are external to the server 601, such as located on a remote server that is in communication with the server 601 through an intranet or the Internet. The server 601 can communicate with one or more remote computer systems through the network 630. In the illustrated example, the server 601 is in communication with a remote computer system 640. The remote computer system 640 can be, for example, a personal computers (e.g., portable PC), slate or tablet PC (e.g., Apple® iPad, Samsung® Galaxy Tab), telephone, Smart phone (e.g., Apple® iPhone, Android-enabled device, Blackberry®), or personal digital assistant.

In some situations, the system 600 includes a single server or controller 601. In other situations, the system 600 includes multiple servers or controllers in communication with one another through direction connection, an intranet and/or the Internet.

Methods as described herein can be implemented by way of machine (or computer processor) executable code (or software) stored on an electronic storage location of the server or controller 601, such as, for example, on the memory 610 or electronic storage unit 615. During use, the code can be executed by the processor 605. In some cases, the code can be retrieved from the storage unit 615 and stored on the memory 610 for ready access by the processor 605. In some situations, the electronic storage unit 615 can be precluded, and machine-executable instructions are stored on memory 610. Alternatively, the code can be executed on the second computer system 640.

The code can be pre-compiled and configured for use with a machine, have a processor adapted to execute the code, or can be compiled during runtime. The code can be supplied in a programming language that can be selected to enable the code to execute in a pre-compiled or as-compiled fashion.

Aspects of the systems and methods provided herein, such as the server or controller 601, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

Various parameters of an energy storage system can be presented to a user on a user interface (UI) of an electronic device of the user. Examples of UI's include, without limitation, a graphical user interface (GUI) and web-based user interface. The UI (e.g., GUI) can be provided on a display of an electronic device of the user. The display can be a capacitive or resistive touch display. Such displays can be used with other systems and methods of the disclosure.

Devices, systems and methods of the present disclosure may be combined with or modified by other devices, systems and/or methods, such as, for example, electrochemical cells, batteries and battery components described in U.S. Pat. No. 3,663,295 ("STORAGE BATTERY ELECTROLYTE"), U.S. Pat. No. 3,775,181 ("LITHIUM STORAGE CELLS WITH A FUSED ELECTROLYTE"), U.S. Pat. No. 8,268,471 ("HIGH-AMPERAGE ENERGY STORAGE DEVICE WITH LIQUID METAL NEGATIVE ELECTRODE AND METHODS"), U.S. Patent Publication No. 2011/0014503 ("ALKALINE EARTH METAL ION BATTERY"), U.S. Patent Publication No. 2011/0014505 ("LIQUID ELECTRODE BATTERY"), U.S. Patent Publication No. 2012/0104990 ("ALKALI METAL ION BATTERY WITH BIMETALLIC ELECTRODE"), and U.S. Patent Publication No. 2014/0099522 ("LOW-TEMPERATURE LIQUID METAL BATTERIES FOR GRID-SCALED STORAGE"), each of which is entirely incorporated herein by reference.

Energy storage devices of the disclosure may be used in grid-scale settings or standalone settings. Energy storage devices of the disclosure can be used as stationary systems or mobile systems. In some cases, energy storage devices of the disclosure can be used to power vehicles, such as scooters, motorcycles, cars, trucks, trains, helicopters, airplanes, and other mechanical devices, such as robots.

It is to be understood that the terminology used herein is used for the purpose of describing specific embodiments, and is not intended to limit the scope of the present invention. It should be noted that as used herein, the singular forms of "a", "an" and "the" include plural references unless the context clearly dictates otherwise. In addition, unless defined otherwise, all technical and scientific terms used herein have the same meaning as commonly understood by one of ordinary skill in the art to which this invention belongs.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents. It is intended that the following claims define the scope of the invention and that methods and structures within the scope of these claims and their equivalents be covered thereby.

What is claimed is:

1. A power system, comprising:
an energy storage device comprising at least one electrochemical cell having a negative electrode, a positive electrode and an electrolyte between the negative and positive electrodes, and wherein at least one of the negative electrode, positive electrode and electrolyte is in a liquid state at an operating temperature of the energy storage device of at least about 250° C.; and
a power conversion system in electrical communication with the energy storage device and an external load or power source, wherein the power conversion system brings the energy storage device in electrical communication with the external load or power source, and wherein the power conversion system includes a bi-directional inverter that converts (i) alternating current (AC) power from the external load or power source to direct current (DC) power usable by the energy storage device, (ii) DC power from the energy storage device to AC power usable by the external load or power source, (iii) DC power from the external load or power source to DC power usable by the energy storage device, or (iv) DC power from the energy storage device to DC power usable by the external load or power source, wherein the inverter includes (1) an insulated-gate bipolar transistor that includes a DC capacitor and/or a DC inductor or (2) solid state switching and filtering devices to provide power conversion.

2. A power system, comprising:
an energy storage device comprising at least one electrochemical cell having a negative electrode, a positive electrode and an electrolyte between the negative and positive electrodes, and wherein at least one of the negative electrode, positive electrode and electrolyte is in a liquid state at an operating temperature of the energy storage device of at least about 250° C.; and
a power conversion system in electrical communication with the energy storage device and an external load or power source, wherein the power conversion system brings the energy storage device in electrical communication with the external load or power source, wherein the power conversion system includes a bi-directional inverter that converts (i) alternating current (AC) power from the external load or power source to direct current (DC) power usable by the energy storage device, (ii) DC power from the energy storage device to AC power usable by the external load or power source, (iii) DC power from the external load or power source to DC power usable by the energy storage device, or (iv) DC power from the energy storage device to DC power usable by the external load or power source, wherein the power conversion system is configured to bring the energy storage device in electrical communication with the external load or power source in accordance with one or more performance characteristics of the energy storage device, and wherein the one or more performance characteristics are selected from the group consisting of active power (P) and reactive power (Q) control capabilities, response time, current, voltage, phase, frequency, fault protection and information exchange.

3. The system of claim 1, wherein the inverter is a single-phase or multi-phase pulse width modulated inverter that operates in a current-controlled mode or a voltage-controlled mode.

4. The system of claim 1, wherein the inverter includes an insulated-gate bipolar transistor that includes a DC capacitor and/or a DC inductor.

5. The system of claim 1, wherein the inverter includes solid state switching and filtering devices to provide power conversion.

6. The system of claim 1, wherein an inverter module is configured to be de-energized while balance of the power conversion system remains operational.

7. The system of claim 1, wherein a module or series string of the energy storage device is electrically disconnected while balance of the energy storage device continues to operate.

8. The system of claim 2, wherein the external load or power source is a power grid.

9. The system of claim 2, wherein a response time of the energy storage device is at least about 2 times shorter than a response time of the power conversion system.

10. The system of claim 2, wherein: in (iii), the DC power from the external load or power source is greater than or less than the DC power usable by the energy storage device; or, in (iv), the DC power usable by the external load or power source is greater than or less than the DC power from the energy storage device.

11. The system of claim 2, wherein the power conversion system has a response time of less than or equal to about 50 milliseconds.

12. A power system, comprising:
an energy storage device comprising at least one electrochemical cell having a negative electrode, a positive electrode and an electrolyte between the negative and positive electrodes, and wherein at least one of the negative electrode, positive electrode and electrolyte is in a liquid state at an operating temperature of the energy storage device of at least about 250° C.; and
a power conversion system in electrical communication with the energy storage device and an external load or power source, wherein the power conversion system includes a bi-directional inverter and a transformer on an AC side of the power conversion system, and wherein the power conversion system brings the energy storage device in electrical communication with the external load or power source such that a terminal voltage of the energy storage device does not exceed about 100 Volts (V).

13. The system of claim 12, wherein the external load or power source is a power grid, and wherein the system takes in energy from the power grid or outputs energy to the power grid.

14. The system of claim 12, wherein the power conversion system is configured to (i) accept a voltage of less than or equal to about 100 V from the energy storage device, or (ii) deliver a voltage of less than or equal to about 100 V to the energy storage device.

15. The system of claim 14, wherein the bi-directional inverter is configured to (i) accept a voltage of less than or equal to about 100 V from the energy storage device, or (ii) deliver a voltage of less than or equal to about 100 V to the energy storage device.

16. The system of claim 12, wherein the power conversion system is configured to output a voltage enabling it to connect to low, medium or high voltage AC transmission/distribution systems.

17. The system of claim 12, wherein the transformer allows the bi-directional inverter to be connected to low, medium or high voltage AC transmission/distribution systems.

18. The system of claim 2, wherein the inverter is a single-phase or multi-phase pulse width modulated inverter that operates in a current-controlled mode or a voltage-controlled mode.

19. The system of claim 2, wherein an inverter module is configured to be de-energized while balance of the power conversion system remains operational.

20. The system of claim 2, wherein a module or series string of the energy storage device is electrically disconnected while balance of the energy storage device continues to operate.

* * * * *